(12) United States Patent
Sharma et al.

(10) Patent No.: US 11,182,614 B2
(45) Date of Patent: Nov. 23, 2021

(54) METHODS AND APPARATUSES FOR DETERMINING AND/OR EVALUATING LOCALIZING MAPS OF IMAGE DISPLAY DEVICES

(71) Applicant: MAGIC LEAP, INC., Plantation, FL (US)

(72) Inventors: Divya Sharma, San Jose, CA (US); Ali Shahrokni, San Jose, CA (US); Anush Mohan, Mountain View, CA (US); Prateek Singhal, Mountain View, CA (US); Xuan Zhao, San Jose, CA (US); Sergiu Sima, Plantation, FL (US); Benjamin Langmann, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 71 days.

(21) Appl. No.: 16/520,582

(22) Filed: Jul. 24, 2019

(65) Prior Publication Data
US 2020/0034624 A1    Jan. 30, 2020

Related U.S. Application Data

(60) Provisional application No. 62/702,829, filed on Jul. 24, 2018.

(51) Int. Cl.
*G06K 9/00* (2006.01)
*G06T 19/00* (2011.01)
(Continued)

(52) U.S. Cl.
CPC ......... *G06K 9/00671* (2013.01); *G06F 1/163* (2013.01); *G06K 9/3233* (2013.01); *G06T 15/005* (2013.01); *G06T 19/006* (2013.01)

(58) Field of Classification Search
None
See application file for complete search history.

(56) References Cited

U.S. PATENT DOCUMENTS

| | | | | |
|---|---|---|---|---|
| 8,350,758 B1 * | 1/2013 | Parvizi | .................. | G01S 5/0252 342/452 |
| 8,379,021 B1 * | 2/2013 | Miller | .................... | G06T 15/60 345/426 |

(Continued)

FOREIGN PATENT DOCUMENTS

WO    WO 2016/077798    5/2016

OTHER PUBLICATIONS

PCT International Search Report and Written Opinion for International Appln. No. PCT/US2019/043154, Applicant Magic Leap, Inc., dated Oct. 22, 2019 (9 pages).

(Continued)

*Primary Examiner* — Martin Mushambo
(74) *Attorney, Agent, or Firm* — Vista IP Law Group, LLP

(57) ABSTRACT

An apparatus configured to be worn on a head of a user, includes: a screen configured to present graphics to the user; a camera system configured to view an environment in which the user is located; and a processing unit configured to determine a map based at least in part on output(s) from the camera system, wherein the map is configured for use by the processing unit to localize the user with respect to the environment; wherein the processing unit of the apparatus is also configured to obtain a metric indicating a likelihood of success to localize the user using the map, and wherein the processing unit is configured to obtain the metric by computing the metric or by receiving the metric.

32 Claims, 16 Drawing Sheets

(51) Int. Cl.
*G06F 1/16* (2006.01)
*G06T 15/00* (2011.01)
*G06K 9/32* (2006.01)

(56) References Cited

U.S. PATENT DOCUMENTS

| | | | |
|---|---|---|---|
| 1,026,246 A1 | 4/2019 | Miller et al. | |
| 1,040,861 A1 | 9/2019 | Abovitz et al. | |
| 10,455,351 B1* | 10/2019 | Kiemele | G06F 3/011 |
| 2002/0158872 A1* | 10/2002 | Randel | G06T 15/506 |
| | | | 345/426 |
| 2003/0169334 A1* | 9/2003 | Braithwaite | G06K 9/00604 |
| | | | 348/78 |
| 2006/0061583 A1* | 3/2006 | Spooner | G06T 15/20 |
| | | | 345/582 |
| 2008/0167807 A1* | 7/2008 | Chang | G06F 40/58 |
| | | | 701/532 |
| 2009/0004974 A1* | 1/2009 | Pyhalammi | G06F 9/44536 |
| | | | 455/67.11 |
| 2010/0026710 A1* | 2/2010 | Selvanandan | A63F 13/213 |
| | | | 345/619 |
| 2010/0138184 A1 | 6/2010 | Fernandez et al. | |
| 2010/0201682 A1* | 8/2010 | Quan | G06T 15/04 |
| | | | 345/419 |
| 2011/0055127 A1* | 3/2011 | Umblijs | G06Q 30/06 |
| | | | 706/12 |
| 2011/0299730 A1* | 12/2011 | Elinas | G06K 9/00791 |
| | | | 382/103 |
| 2012/0306850 A1* | 12/2012 | Balan | G06F 3/0304 |
| | | | 345/419 |
| 2013/0076767 A1* | 3/2013 | Papadopoulos | G06F 30/15 |
| | | | 345/522 |
| 2013/0314303 A1* | 11/2013 | Osterhout | G06F 3/005 |
| | | | 345/8 |
| 2013/0321464 A1* | 12/2013 | Lucas-Woodley | A63F 13/5255 |
| | | | 345/633 |
| 2014/0063055 A1* | 3/2014 | Osterhout | G06F 3/165 |
| | | | 345/633 |
| 2014/0210821 A1* | 7/2014 | Kapoor | G06T 15/08 |
| | | | 345/424 |
| 2014/0306866 A1 | 10/2014 | Miller et al. | |
| 2015/0145887 A1* | 5/2015 | Forutanpour | G02B 27/017 |
| | | | 345/633 |
| 2015/0193977 A1* | 7/2015 | Johnson | G06T 19/006 |
| | | | 345/419 |
| 2015/0205126 A1 | 7/2015 | Schowengerdt | |
| 2015/0302665 A1* | 10/2015 | Miller | A63F 13/57 |
| | | | 345/419 |
| 2015/0309316 A1* | 10/2015 | Osterhout | G06F 1/163 |
| | | | 345/8 |
| 2015/0363972 A1* | 12/2015 | Isaksson | G06T 3/40 |
| | | | 345/423 |
| 2016/0195659 A1 | 7/2016 | Vrcelj et al. | |
| 2016/0214016 A1* | 7/2016 | Stafford | A63F 13/5255 |
| 2016/0239969 A1* | 8/2016 | Davatzikos | G06T 7/0012 |
| 2017/0039450 A1* | 2/2017 | Zhou | G06F 16/583 |
| 2017/0076455 A1* | 3/2017 | Newman | G06T 7/74 |
| 2017/0146349 A1* | 5/2017 | Yang | G01C 21/005 |
| 2017/0236494 A1* | 8/2017 | Sommerlade | G06F 21/84 |
| | | | 345/660 |
| 2017/0263043 A1* | 9/2017 | Peterson | G06T 15/04 |
| 2017/0350708 A1* | 12/2017 | Khan | G01C 21/206 |
| 2018/0005443 A1* | 1/2018 | Poulos | G06F 3/017 |
| 2018/0141772 A1* | 5/2018 | Prankl | B65H 75/242 |
| 2018/0263449 A1* | 9/2018 | Rosskopf | A47L 9/2852 |
| 2019/0033058 A1* | 1/2019 | Tsurumi | G06F 3/0304 |
| 2019/0147115 A1* | 5/2019 | Liu | G06F 30/20 |
| | | | 703/1 |
| 2019/0373413 A1* | 12/2019 | Kong | H04W 4/023 |

OTHER PUBLICATIONS

Foxlin. "Generalized architecture for simultaneous localization, auto-calibration, and map-building." In: IROS. Oct. 4, 2002 (Apr. 2, 2002) Retrieved on Sep. 26, 2019 (Sep. 26, 2019) from http://citeseerx.ist.psu.edu/viewdoc/download?dOi=10.1.1.14.8155&rep=rep1&type=pdf entire document.

PCT International Preliminary Report on Patentability for International Appln. No. PCT/US2019/043154, Applicant Magic Leap, Inc., dated Jan. 26, 2021.

Extended European Search Report for EP Patent Appln. No. 19841887.3 dated Jul. 15, 2021.

Pirchheim Christian et al: "Handling pure camera rotation in keyframe-based SLAM", 2013 IEEE International Symposium on Mixed and Augmented Reality (ISMAR), IEEE, Oct. 1, 2013 (Oct. 1, 2013), pp. 229-238, XP032534730, DOI: 10.1109/ISMAR.2013.6671783.

* cited by examiner

METHODS AND APPARATUSES FOR DETERMINING AND/OR EVALUATING LOCALIZING MAPS OF IMAGE DISPLAY DEVICES

RELATED APPLICATION DATA

This application claims priority to, and the benefit of, U.S. Provisional Patent Application No. 62/702,829 filed on Jul. 24, 2018. The entire disclosure of the above application is expressly incorporated by reference herein.

INCORPORATION BY REFERENCE

The following applications are expressly incorporated by reference in their entireties:
U.S. patent application Ser. No. 14/205,126 filed on Mar. 11, 2014,
U.S. patent application Ser. No. 14/690,401 filed on Apr. 18, 2015, and
U.S. patent application Ser. No. 14/704,765 filed on May 5, 2015.

FIELD

The present disclosure relates to image display devices configured to be worn on users' heads, and methods and apparatus for determining and evaluating localizing maps for such image display devices.

BACKGROUND

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems may generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenario in a user's mind.

Various optical systems generate images, including color images, at various depths for displaying MR (VR and AR) scenarios. Some such optical systems are described in U.S. Utility patent application Ser. No. 14/555,585 filed on Nov. 27, 2014, the contents of which are hereby expressly and fully incorporated by reference in their entirety, as though set forth in full.

MR systems may employ wearable display devices (e.g., displays configured to be worn on heads, helmet-mounted displays, or smart glasses) that are at least loosely coupled to a user's head, and thus move when the user's head moves. If the user's head motions are detected by the display device, the data being displayed can be updated (e.g., "warped") to take the change in head pose (i.e., the orientation and/or location of user's head) into account.

As an example, if a user wearing a display device views a virtual representation of a virtual object on the display and walks around an area where the virtual object appears, the virtual object can be rendered for each viewpoint, giving the user the perception that they are walking around an object that occupies real space. If the display device is used to present multiple virtual objects, measurements of head pose can be used to render the scene to match the user's dynamically changing head pose and provide an increased sense of immersion.

Display devices (configured to be worn on users' heads) that enable AR provide concurrent viewing of both real and virtual objects. With an "optical see-through" display, a user can see through transparent (or semi-transparent) elements in a display system to view directly the light from real objects in an environment. The transparent element, often referred to as a "combiner," superimposes light from the display over the user's view of the real world, where light from by the display projects an image of virtual content over the see-through view of the real objects in the environment. A camera may be mounted onto the display device to capture images or videos of the scene being viewed by the user.

Current optical systems, such as those in MR systems, optically render virtual content. Content is "virtual" in that it does not correspond to real physical objects located in respective positions in space. Instead, virtual content only exist in the brains (e.g., the optical centers) of a user of the display device when stimulated by light beams directed to the eyes of the user.

In some cases, an image display device configured to be worn on a user's head may display virtual objects with respect to a real environment, and/or may allow a user to place and/or manipulate virtual objects with respect to the real environment. In such cases, the image display device may be configured to localize the user with respect to the real environment, so that virtual objects may be correctly displaced with respect to the real environment. Methods and apparatuses for determining and/or evaluating localizing maps of image display devices (e.g., MR devices, AR devices, VR devices, etc.) are disclosed herein. The localizing maps are configured for use by the image display devices for localization of users.

SUMMARY

An apparatus configured to be worn on a head of a user, includes: a screen configured to present graphics to the user; a camera system configured to view an environment in which the user is located; and a processing unit configured to determine a map based at least in part on output(s) from the camera system, wherein the map is configured for use by the processing unit to localize the user with respect to the environment; wherein the processing unit of the apparatus is also configured to determine a metric indicating a likelihood of success to localize the user using the map.

Optionally, the processing unit may be configured to determine the metric by computing the metric.

Optionally, the processing unit may be configured to determine the metric by receiving the metric.

Optionally, the processing unit is configured to determine the metric based on a co-visibility of a point of interest that is associated with different camera positions.

Optionally, the camera positions comprise a first camera position of a camera of the camera system, and a second camera position of the camera of the camera system.

Optionally, the camera positions comprise a first camera position of a first camera of the camera system, and a second camera position of a second camera position of the camera system.

Optionally, the metric indicates a number of reference points that are useable to localize the user with respect to the environment.

Optionally, the metric indicates the likelihood of success to localize the user in one or more viewing directions.

Optionally, the processing unit is configured to determine the metric based on a number of times a point of interest is detected from different camera positions.

Optionally, the processing unit is configured to determine the metric without determining any convex hull.

Optionally, the metric has a value that is based on directionality.

Optionally, the directionality is with respect to one or more vertical axes, and/or one or more horizontal axes.

Optionally, the directionality comprises a turn direction.

Optionally, the directionality comprises a tilt angle.

Optionally, the directionality comprises a roll angle.

Optionally, the metric has a first value associated with a first directionality, and a second value associated with a second directionality.

Optionally, the metric is for one of a plurality of cells, each of the cells representing a three dimensional space of a portion of the environment, and wherein the metric has a value that is based on a position within the one of the plurality of cells.

Optionally, the metric is for one of a plurality of cells, each of the cells representing a three dimensional space of a portion of the environment, wherein the metric has a first value associated with a first position within the one of the plurality of cells, and a second value associated with a second position within the one of the plurality of cells.

Optionally, the metric is for one of a plurality of cells, and each of the cells represents a three dimensional space of a portion of the environment.

Optionally, the processing unit is also configured to determine a total number of images from the camera system for the one of the plurality of cells.

Optionally, the total number of images is associated with a certain viewing direction for the cell.

Optionally, the total number of images is associated with multiple viewing directions for the cell.

Optionally, the camera system is configured to obtain multiple images, and wherein the processing unit is configured to determine the metric for one of the plurality of cells by: identifying a subset of the images that belong to a same range of viewing directions; determining respective scores for the images in the subset of the images; and summing the scores to obtain a total score.

Optionally, the processing unit is also configured to determine an average score by dividing the total score by a number of the images in the subset of the images.

Optionally, the average score is the metric.

Optionally, the average score represents an average expected number of co-visibility points for the range of viewing directions for the one of the plurality of cells.

Optionally, the processing unit is configured to determine the respective scores by accessing a co-visibility graph that associates reference points with the multiple images.

Optionally, the co-visibility graph indicates which of the reference points is visible in which of the multiple images.

Optionally, the processing unit is configured to determine each of the respective scores by determining a number of reference point(s) that is detected in the corresponding one of the images in the subset of images.

Optionally, the processing unit is also configured to determine an area score indicating a degree of coverage by the map.

Optionally, the area score is based on a spatial distribution of data points of the map.

Optionally, at least one of the cells has a footprint area that is 2 m by 2 m.

Optionally, the at least one of the cells also has a pre-determined height.

Optionally, the processing unit is configured to determine the metric by: obtaining a plurality of images from the camera system; and determining co-visibility values, wherein each of the co-visibility values indicating a number of reference points detected in a corresponding one of the plurality of images.

Optionally, the camera system comprises a plurality of cameras.

Optionally, the plurality of images comprises a first subset of images generated by the plurality of cameras when the camera system is at a first position.

Optionally, the plurality of images comprises a second subset of images generated by the plurality of cameras when the camera system is at a second position.

Optionally, the plurality of cameras comprises a first forward facing camera.

Optionally, the plurality of cameras comprises a second forward facing camera.

Optionally, the plurality of cameras comprises a first side facing camera.

Optionally, the plurality of cameras comprises a second side facing camera.

Optionally, the processing unit is configured to determine a desired viewing direction of the camera system for improving a value of the metric.

Optionally, the processing unit is configured to generate the graphics based on the determined desired viewing direction, the graphics configured to instruct the user to change a current viewing direction of the camera system to the desired viewing direction.

Optionally, the camera system is configured to obtain an image of the environment after the desired viewing direction of the camera system has been achieved.

Optionally, the processing unit is configured to update the map based on the image.

Optionally, the processing unit is configured to update the metric based on the updated map.

Optionally, the processing unit is configured to determine the metric before using the map to localize the user with respect to the environment.

Optionally, the processing unit is configured to determine the metric before allowing the apparatus to share content with another apparatus.

Optionally, the processing unit is configured to determine the metric during a map construction session in which the processing unit determines the map.

Optionally, the processing unit is configured to determine the metric retroactively by accessing the map that was previously determined from a non-transitory medium.

Optionally, the processing unit is configured to perform a sanitization to remove or to disregard data that would otherwise provide an undesirable contribution for the map if the data is used to determine the map.

Optionally, the data comprises an image from the camera system, and wherein the processing unit is configured to perform the sanitization by removing or disregarding the image.

Optionally, camera system comprises a plurality of cameras, wherein the data comprises a set of images generated by the respective cameras, and wherein the processing unit is configured to perform the sanitization by removing or disregarding the set of images.

Optionally, the data comprises an identification of a reference point in an image from the camera system, and wherein the processing unit is configured to perform the sanitization by disregarding the identification of the reference point.

Optionally, the data represents a ray or a line that is associated with an image from the camera system and a reference point, and wherein the processing unit is configured to perform the sanitization by disregarding the ray or the line that is associated with the image.

Optionally, the processing unit is configured to perform the sanitization as a part of a local optimization.

Optionally, the processing unit is configured to perform a bundle adjustment to adjust one or more rays associated with one or more images from the camera system, wherein the processing unit is configured to perform the bundle adjustment after performing the sanitization to remove the data.

Optionally, the processing unit is configured to perform the bundle adjustment as a part of a global optimization.

Optionally, the processing unit is configured to perform the global optimization based on images from the camera system and three-dimensional reference points, Optionally, the processing unit is configured to perform the global optimization also based on a relative orientation between cameras of the camera system.

Optionally, the processing unit is configured to determine a score for an image obtained from the camera system.

Optionally, the score is a constraint score.

Optionally, the score indicates how well the image is constrained.

Optionally, the processing unit is configured to determine the score based on a Jacobian of reference points measurements.

Optionally, the processing unit is configured to determine the score based on an information matrix that is a diagonal matrix.

Optionally, the processing unit is configured to determine the score based on a number of reference points detected in the image.

Optionally, the processing unit is configured to perform data sanitization based on the score.

Optionally, the processing unit is configured to remove a constraint of the image, or to remove the image, when performing the data sanitization.

Optionally, the processing unit is configured to remove the constraint of the image, or to remove the image, when the score is below a threshold.

Optionally, the processing unit is configured to determine the map by: determining multiple map segments; and connecting the map segments.

Optionally, the processing unit is configured to determine a first map segment of the map segments by obtaining images from the camera system, and linking the images, wherein the images are generated in sequence by the camera system.

Optionally, the processing unit is configured to determine respective scores of the images.

Optionally, the processing unit is configured to: obtain an additional image from the camera system, determine a score for the additional image, and start a second map segment of the map segments in response to the score of the additional image from the camera system meeting a criterion.

Optionally, the processing unit is configured to start the second map segment when the score indicates that the image has a degree of constraint with respect to the first map segment that is below a threshold.

Optionally, the output(s) comprises one or more images from the camera system.

An apparatus configured to be worn on a head of a user, includes: a screen configured to present graphics to the user; a camera system configured to view an environment in which the user is located; and a processing unit configured to determine a map based at least in part on output(s) from the camera system, wherein the map is configured for use by the processing unit to localize the user with respect to the environment; wherein the processing unit of the apparatus is also configured to obtain a metric indicating a likelihood of success to localize the user using the map, and wherein the processing unit is configured to obtain the metric by computing the metric or by receiving the metric.

An apparatus configured to be worn on a head of a user, includes: a screen configured to present graphics to the user; a camera system configured to view an environment in which the user is located; and a processing unit configured to determine a map based at least in part on output(s) from the camera system, wherein the map is configured for use by the processing unit to localize the user with respect to the environment; wherein the processing unit is configured to determine a score for an image obtained from the camera system, the score indicating how well the image is constrained with respect to a map segment for forming the map.

Optionally, the processing unit may be configured to determine the score by computing the score.

Optionally, the processing unit may be configured to determine the score by receiving the score.

Optionally, the processing unit is configured to determine the score based on a Jacobian of reference points measurements.

Optionally, the processing unit is configured to determine the score based on an information matrix that is a diagonal matrix.

Optionally, the processing unit is configured to determine the score based on a number of reference points detected in the image.

Optionally, the processing unit is configured to perform data sanitization based on the score.

Optionally, the processing unit is configured to remove a constraint of the image, or to remove the image, when performing the data sanitization.

Optionally, the processing unit is configured to remove the constraint of the image, or to remove the image, when the score is below a threshold.

Optionally, the processing unit is configured to perform a sanitization to remove or to disregard data that would otherwise provide an undesirable contribution for the map if the data is used to determine the map.

Optionally, the data comprises the image from the camera system, and wherein the processing unit is configured to perform the sanitization by removing or disregarding the image.

Optionally, the camera system comprises a plurality of cameras, wherein the data comprises a set of images generated by the respective cameras, and wherein the processing unit is configured to perform the sanitization by removing or disregarding the set of images.

Optionally, the data comprises an identification of a reference point in the image from the camera system, and wherein the processing unit is configured to perform the sanitization by disregarding the identification of the reference point.

Optionally, the data represents a ray or a line that is associated with the image from the camera system and a reference point, and wherein the processing unit is configured to perform the sanitization by disregarding the ray or the line that is associated with the image.

Optionally, the processing unit is configured to perform the sanitization as a part of a local optimization.

Optionally, the processing unit is configured to perform a bundle adjustment to adjust one or more rays associated with one or more images from the camera system, wherein the processing unit is configured to perform the bundle adjustment after performing the sanitization, wherein the image for which the score is determined is one of the one or more images, or is different from the one or more images.

Optionally, the processing unit is configured to perform the bundle adjustment as a part of a global optimization.

Optionally, the processing unit is configured to perform the global optimization based on the one or more images from the camera system and three-dimensional reference points, Optionally, the processing unit is configured to perform the global optimization also based on a relative orientation between cameras of the camera system.

Optionally, the processing unit is configured to determine the map by: determining multiple map segments, wherein the multiple map segment comprise the map segment; and connecting the map segments; wherein the portion of the map comprises one of the map segments.

Optionally, the camera system is configured to provide additional images, the additional images generated by the camera system before the image for which the score is determined is generated, wherein the processing unit is configured to determine a first map segment of the map segments by linking the additional images, and wherein the additional images are generated in sequence by the camera system.

Optionally, the processing unit is configured to determine respective scores of the additional images.

Optionally, the processing unit is configured to start a second map segment of the map segments in response to the score of the image from the camera system meeting a criterion.

Optionally, the processing unit is configured to start the second map segment when the score indicates that the image has a degree of constraint with respect to the first map segment that is below a threshold.

Optionally, the processing unit of the apparatus is also configured to determine a metric indicating a likelihood of success to localize the user using the map.

Optionally, the processing unit is configured to determine the metric based on a co-visibility of a point of interest that is associated with different camera positions.

Optionally, the camera positions comprise a first camera position of a camera of the camera system, and a second camera position of the camera of the camera system.

Optionally, the camera positions comprise a first camera position of a first camera of the camera system, and a second camera position of a second camera position of the camera system.

Optionally, the metric indicates a number of reference points that are useable to localize the user with respect to the environment.

Optionally, the metric indicates the likelihood of success to localize the user in one or more viewing directions.

Optionally, the processing unit is configured to determine the metric based on a number of times a point of interest is detected from different camera positions.

Optionally, the processing unit is configured to determine the metric without determining any convex hull.

Optionally, the metric has a value that is based on directionality.

Optionally, the directionality is with respect to one or more vertical axes, and/or one or more horizontal axes.

Optionally, the directionality comprises a turn direction.

Optionally, the directionality comprises a tilt angle.

Optionally, the directionality comprises a roll angle.

Optionally, the metric has a first value associated with a first directionality, and a second value associated with a second directionality.

Optionally, the metric is for one of a plurality of cells, each of the cells representing a three dimensional space of a portion of the environment, and wherein the metric has a value that is based on a position within the one of the plurality of cells.

Optionally, the metric is for one of a plurality of cells, each of the cells representing a three dimensional space of a portion of the environment, wherein the metric has a first value associated with a first position within the one of the plurality of cells, and a second value associated with a second position within the one of the plurality of cells.

Optionally, the metric is for one of a plurality of cells, and each of the cells represents a three dimensional space of a portion of the environment.

Optionally, the processing unit is also configured to determine a total number of images from the camera system for the one of the plurality of cells.

Optionally, the total number of images is associated with a certain viewing direction for the cell.

Optionally, the total number of images is associated with multiple viewing directions for the cell.

Optionally, the camera system is configured to obtain multiple images, the multiple images including the image for which the score is determined, and wherein the processing unit is configured to determine the metric for one of the plurality of cells by: identifying a subset of the images that belong to a same range of viewing directions; determining respective scores for the images in the subset of the images; and summing the scores to obtain a total score.

Optionally, the processing unit is also configured to determine an average score by dividing the total score by a number of the images in the subset of the images.

Optionally, the average score is the metric.

Optionally, the average score represents an average expected number of co-visibility points for the range of viewing directions for the one of the plurality of cells.

Optionally, the processing unit is configured to determine the respective scores by accessing a co-visibility graph that associates reference points with the multiple images.

Optionally, the co-visibility graph indicates which of the reference points is visible in which of the multiple images.

Optionally, the processing unit is configured to determine each of the respective scores by determining a number of reference point(s) that is detected in the corresponding one of the images in the subset of images.

Optionally, the processing unit is also configured to determine an area score indicating a degree of coverage by the map.

Optionally, the area score is based on a spatial distribution of data points of the map.

Optionally, at least one of the cells has a footprint area that is 2 m by 2 m.

Optionally, the at least one of the cells also has a predetermined height.

Optionally, the processing unit is configured to determine the metric by: obtaining a plurality of images from the camera system, the plurality of images including the image for which the score is determined; and determining co-visibility values, wherein each of the co-visibility values indicating a number of reference points detected in a corresponding one of the plurality of images.

Optionally, the camera system comprises a plurality of cameras.

Optionally, the plurality of images comprises a first subset of images generated by the plurality of cameras when the camera system is at a first position.

Optionally, the plurality of images comprises a second subset of images generated by the plurality of cameras when the camera system is at a second position.

Optionally, the plurality of cameras comprises a first forward facing camera.

Optionally, the plurality of cameras comprises a second forward facing camera.

Optionally, the plurality of cameras comprises a first side facing camera.

Optionally, the plurality of cameras comprises a second side facing camera.

Optionally, the processing unit is configured to determine a desired viewing direction of the camera system for improving a value of the metric.

Optionally, the processing unit is configured to generate the graphics based on the determined desired viewing direction, the graphics configured to instruct the user to change a current viewing direction of the camera system to the desired viewing direction.

Optionally, the camera system is configured to obtain an additional image after the desired viewing direction of the camera system has been achieved.

Optionally, the processing unit is configured to update the map based on the additional image.

Optionally, the processing unit is configured to update the metric based on the updated map.

Optionally, the processing unit is configured to determine the metric before using the map to localize the user with respect to the environment.

Optionally, the processing unit is configured to determine the metric before allowing the apparatus to share content with another apparatus.

Optionally, the processing unit is configured to determine the metric during a map construction session in which the processing unit determines the map.

Optionally, the processing unit is configured to determine the metric retroactively by accessing the map that was previously determined from a non-transitory medium.

An apparatus configured to be worn on a head of a user, includes: a screen configured to present graphics to the user; a camera system configured to view an environment in which the user is located; and a processing unit configured to determine a map based at least in part on output(s) from the camera system, wherein the map is configured for use by the processing unit to localize the user with respect to the environment; wherein the processing unit is configured to obtain a score for an image obtained from the camera system, the score indicating how well the image is constrained with respect to a map segment for forming the map, and wherein the processing unit is configured to obtain the score by computing the score or by receiving the score.

A method performed by an apparatus that is configured to be worn on a head of a user, the apparatus having a screen configured to present graphics to the user, a camera system configured to view an environment in which the user is located, and a processing unit, includes: obtaining, by the processing unit, output(s) from the camera system; determining a map by the processing unit based at least in part on the output(s) from the camera system, wherein the map is configured for use by the processing unit to localize the user with respect to the environment; and determining, by the processing unit, a metric indicating a likelihood of success to localize the user using the map.

Optionally, the act of determining the metric comprises computing the metric.

Optionally, the act of determining the metric comprises receiving the metric.

Optionally, the metric is determined based on a co-visibility of a point of interest that is associated with different camera positions.

Optionally, the camera positions comprise a first camera position of a camera of the camera system, and a second camera position of the camera of the camera system.

Optionally, the camera positions comprise a first camera position of a first camera of the camera system, and a second camera position of a second camera position of the camera system.

Optionally, the metric indicates a number of reference points that are useable to localize the user with respect to the environment.

Optionally, the metric indicates the likelihood of success to localize the user in one or more viewing directions.

Optionally, the metric is determined based on a number of times a point of interest is detected from different camera positions.

Optionally, the metric is determined by the processing unit without determining any convex hull.

Optionally, the metric has a value that is based on directionality.

Optionally, the directionality is with respect to one or more vertical axes, and/or one or more horizontal axes.

Optionally, the directionality comprises a turn direction.

Optionally, the directionality comprises a tilt angle.

Optionally, the directionality comprises a roll angle.

Optionally, the metric has a first value associated with a first directionality, and a second value associated with a second directionality.

Optionally, the metric is for one of a plurality of cells, each of the cells representing a three dimensional space of a portion of the environment, and wherein the metric has a value that is based on a position within the one of the plurality of cells.

Optionally, the metric is for one of a plurality of cells, each of the cells representing a three dimensional space of a portion of the environment, wherein the metric has a first value associated with a first position within the one of the plurality of cells, and a second value associated with a second position within the one of the plurality of cells.

Optionally, the metric is for one of a plurality of cells, and each of the cells represents a three dimensional space of a portion of the environment.

Optionally, the act of determining the metric comprises determining a total number of images from the camera system that are associated with the one of the plurality of cells.

Optionally, the total number of images is associated with a certain viewing direction for the cell.

Optionally, the total number of images is associated with multiple viewing directions for the cell.

Optionally, the camera system is configured to obtain multiple images, and wherein the metric is determined for one of the plurality of cells by: identifying a subset of the images that belong to a same range of viewing directions; determining respective scores for the images in the subset of the images; and summing the scores to obtain a total score.

Optionally, the metric is determined by dividing the total score by a number of the images in the subset of the images to obtain an average score.

Optionally, the average score is the metric.

Optionally, the average score represents an average expected number of co-visibility points for the range of viewing directions for the one of the plurality of cells.

Optionally, the respective scores are determined by accessing a co-visibility graph that associates reference points with the multiple images.

Optionally, the co-visibility graph indicates which of the reference points is visible in which of the multiple images.

Optionally, each of the respective scores is determined by determining a number of reference point(s) that is detected in the corresponding one of the images in the subset of images.

Optionally, the method further includes determining an area score indicating a degree of coverage by the map.

Optionally, the area score is determined based on a spatial distribution of data points of the map.

Optionally, at least one of the cells has a footprint area that is 2 m by 2 m.

Optionally, the at least one of the cells also has a predetermined height.

Optionally, the metric is determined by: obtaining a plurality of images from the camera system; and determining co-visibility values, wherein each of the co-visibility values indicating a number of reference points detected in a corresponding one of the plurality of images.

Optionally, the camera system comprises a plurality of cameras.

Optionally, the plurality of images comprises a first subset of images generated by the plurality of cameras when the camera system is at a first position.

Optionally, the plurality of images comprises a second subset of images generated by the plurality of cameras when the camera system is at a second position.

Optionally, the plurality of cameras comprises a first forward facing camera.

Optionally, the plurality of cameras comprises a second forward facing camera.

Optionally, the plurality of cameras comprises a first side facing camera.

Optionally, the plurality of cameras comprises a second side facing camera.

Optionally, the method further includes determining by the processing unit a desired viewing direction of the camera system for improving a value of the metric.

Optionally, the method further includes generating the graphics based on the determined desired viewing direction, the graphics configured to instruct the user to change a current viewing direction of the camera system to the desired viewing direction.

Optionally, the method further includes obtaining an image of the environment from the camera system after the desired viewing direction of the camera system has been achieved.

Optionally, the method further includes updating the map based on the image.

Optionally, the method further includes updating the metric based on the updated map.

Optionally, the metric is determined before the map is used to localize the user with respect to the environment.

Optionally, the metric is determined before the apparatus shares content with another apparatus.

Optionally, the metric is determined during a map construction session in which the processing unit determines the map.

Optionally, the metric is determined retroactively by accessing the map that was previously determined from a non-transitory medium.

Optionally, the method further includes performing a sanitization to remove or to disregard data that would otherwise provide an undesirable contribution for the map if the data is used to determine the map.

Optionally, the data comprises an image from the camera system, and wherein the sanitization is performed by removing or disregarding the image.

Optionally, camera system comprises a plurality of cameras, wherein the data comprises a set of images generated by the respective cameras, and wherein the sanitization is performed by removing or disregarding the set of images.

Optionally, the data comprises an identification of a reference point in an image from the camera system, and wherein the sanitization is performed by disregarding the identification of the reference point.

Optionally, the data represents a ray or a line that is associated with an image from the camera system and a reference point, and wherein the sanitization is performed by disregarding the ray or the line that is associated with the image.

Optionally, the sanitization is performed as a part of a local optimization.

Optionally, the method further includes performing a bundle adjustment to adjust one or more rays associated with one or more images from the camera system, wherein the bundle adjustment is performed after the sanitization is performed to remove the data.

Optionally, the bundle adjustment is performed as a part of a global optimization.

Optionally, the global optimization is performed based on images from the camera system and three-dimensional reference points, Optionally, the global optimization is performed also based on a relative orientation between cameras of the camera system.

Optionally, the method further includes determining, by the processing unit, a score for an image obtained from the camera system.

Optionally, the score is a constraint score.

Optionally, the score indicates how well the image is constrained.

Optionally, the score is determined based on a Jacobian of reference points measurements.

Optionally, the score is determined based on an information matrix that is a diagonal matrix.

Optionally, the score is determined based on a number of reference points detected in the image.

Optionally, the method further includes performing data sanitization based on the score.

Optionally, the act of performing the data sanitization comprises removing a constraint of the image, or removing the image.

Optionally, the constraint of the image, or the image, is removed when the score is below a threshold.

Optionally, the map is determined by: determining multiple map segments; and connecting the map segments.

Optionally, the act of determining the multiple map segments comprises determining a first map segment of the map segments by obtaining images from the camera system, and linking the images, wherein the images are generated in sequence by the camera system.

Optionally, the method further includes determining respective scores of the images.

Optionally, the method further includes: obtaining an additional image from the camera system, determining a score for the additional image, and starting a second map segment of the map segments in response to the score of the additional image from the camera system meeting a criterion.

Optionally, the second map segment is started when the score indicates that the image has a degree of constraint with respect to the first map segment that is below a threshold.

Optionally, the output(s) comprises one or more images from the camera system.

A method performed by an apparatus that is configured to be worn on a head of a user, the apparatus having a screen configured to present graphics to the user, a camera system configured to view an environment in which the user is located, and a processing unit, includes: obtaining, by the processing unit, output(s) from the camera system; determining a map by the processing unit based at least in part on the output(s) from the camera system, wherein the map is configured for use by the processing unit to localize the user with respect to the environment; and obtaining, by the processing unit, a metric indicating a likelihood of success to localize the user using the map, wherein the act of obtaining comprises computing the metric or receiving the metric by the processing unit.

A method performed by an apparatus that is configured to be worn on a head of a user, the apparatus having a screen configured to present graphics to the user, a camera system configured to view an environment in which the user is located, and a processing unit, includes: obtaining, by the processing unit, output(s) from the camera system; determining a map by the processing unit based at least in part on the output(s) from the camera system, wherein the map is configured for use by the processing unit to localize the user with respect to the environment; and determining, by the processing unit, a score for an image obtained from the camera system, the score indicating how well the image is constrained with respect to a map segment for forming the map.

Optionally, the act of determining the score comprises computing the score.

Optionally, the act of determining the score comprises receiving the score.

Optionally, the score is determined based on a Jacobian of reference points measurements.

Optionally, the score is determined based on an information matrix that is a diagonal matrix.

Optionally, the score is determined based on a number of reference points detected in the image.

Optionally, the method further includes performing, by the processing unit, data sanitization based on the score.

Optionally, the act of performing the data sanitization comprises removing a constraint of the image, or removing the image.

Optionally, the act of performing the data sanitization comprises removing the constraint of the image, or removing the image, when the score is below a threshold.

Optionally, the sanitization is performed to remove or to disregard data that would otherwise provide an undesirable contribution for the map if the data is used to determine the map.

Optionally, the data comprises the image from the camera system, and wherein the sanitization is performed to remove or disregard the image.

Optionally, camera system comprises a plurality of cameras, wherein the data comprises a set of images generated by the respective cameras, and wherein the sanitization is performed to remove or disregard the set of images.

Optionally, the data comprises an identification of a reference point in the image from the camera system, and wherein the sanitization is performed to disregard the identification of the reference point.

Optionally, the data represents a ray or a line that is associated with the image from the camera system and a reference point, and wherein the sanitization is performed to disregard the ray or the line that is associated with the image.

Optionally, the sanitization is performed as a part of a local optimization.

Optionally, the method further includes performing a bundle adjustment to adjust one or more rays associated with one or more images from the camera system, wherein the bundle adjustment is performed after the sanitization is performed, wherein the image for which the score is determined is one of the one or more images, or is different from the one or more images.

Optionally, the bundle adjustment is performed as a part of a global optimization.

Optionally, the method further includes performing, by the processing unit, a the global optimization based on the one or more images from the camera system and three-dimensional reference points, Optionally, the global optimization is performed also based on a relative orientation between cameras of the camera system.

Optionally, the map is determined by: determining multiple map segments, wherein the multiple map segment comprise the map segment; and connecting the map segments; wherein the portion of the map comprises one of the map segments.

Optionally, the camera system is configured to provide additional images, the additional images generated by the camera system before the image for which the score is determined is generated, wherein the act of determining the map comprises determining a first map segment of the map segments by linking the additional images, and wherein the additional images are generated in sequence by the camera system.

Optionally, the method further includes determining respective scores of the additional images.

Optionally, the method further includes starting, by the processing unit, a second map segment of the map segments in response to the score of the image from the camera system meeting a criterion.

Optionally, the second map segment is started when the score indicates that the image has a degree of constraint with respect to the first map segment that is below a threshold.

Optionally, the method further includes determining a metric indicating a likelihood of success to localize the user using the map.

Optionally, the metric is determined based on a co-visibility of a point of interest that is associated with different camera positions.

Optionally, the camera positions comprise a first camera position of a camera of the camera system, and a second camera position of the camera of the camera system.

Optionally, the camera positions comprise a first camera position of a first camera of the camera system, and a second camera position of a second camera position of the camera system.

Optionally, the metric indicates a number of reference points that are useable to localize the user with respect to the environment.

Optionally, the metric indicates the likelihood of success to localize the user in one or more viewing directions.

Optionally, the metric is determined based on a number of times a point of interest is detected from different camera positions.

Optionally, the metric is determined by the processing unit without determining any convex hull.

Optionally, the metric has a value that is based on directionality.

Optionally, the directionality is with respect to one or more vertical axes, and/or one or more horizontal axes.

Optionally, the directionality comprises a turn direction.

Optionally, the directionality comprises a tilt angle.

Optionally, the directionality comprises a roll angle.

Optionally, the metric has a first value associated with a first directionality, and a second value associated with a second directionality.

Optionally, the metric is for one of a plurality of cells, each of the cells representing a three dimensional space of a portion of the environment, and wherein the metric has a value that is based on a position within the one of the plurality of cells.

Optionally, the metric is for one of a plurality of cells, each of the cells representing a three dimensional space of a portion of the environment, wherein the metric has a first value associated with a first position within the one of the plurality of cells, and a second value associated with a second position within the one of the plurality of cells.

Optionally, the metric is for one of a plurality of cells, and each of the cells represents a three dimensional space of a portion of the environment.

Optionally, the act of determining the metric comprises determining a total number of images from the camera system that are associated with the one of the plurality of cells.

Optionally, the total number of images is associated with a certain viewing direction for the cell.

Optionally, the total number of images is associated with multiple viewing directions for the cell.

Optionally, the camera system is configured to obtain multiple images, the multiple images including the image for which the score is determined, and wherein the metric is determined for one of the plurality of cells by: identifying a subset of the images that belong to a same range of viewing directions; determining respective scores for the images in the subset of the images; and summing the scores to obtain a total score.

Optionally, the method further includes dividing the total score by a number of the images in the subset of the images to obtain an average score.

Optionally, the average score is the metric.

Optionally, the average score represents an average expected number of co-visibility points for the range of viewing directions for the one of the plurality of cells.

Optionally, the respective scores are determined by accessing a co-visibility graph that associates reference points with the multiple images.

Optionally, the co-visibility graph indicates which of the reference points is visible in which of the multiple images.

Optionally, each of the respective scores is determined by determining a number of reference point(s) that is detected in the corresponding one of the images in the subset of images.

Optionally, the method further includes determining an area score indicating a degree of coverage by the map.

Optionally, the area score is based on a spatial distribution of data points of the map.

Optionally, at least one of the cells has a footprint area that is 2 m by 2 m.

Optionally, the at least one of the cells also has a predetermined height.

Optionally, the metric is determined by: obtaining a plurality of images from the camera system, the plurality of images including the image for which the score is determined; and determining co-visibility values, wherein each of the co-visibility values indicating a number of reference points detected in a corresponding one of the plurality of images.

Optionally, the camera system comprises a plurality of cameras.

Optionally, the plurality of images comprises a first subset of images generated by the plurality of cameras when the camera system is at a first position.

Optionally, the plurality of images comprises a second subset of images generated by the plurality of cameras when the camera system is at a second position.

Optionally, the plurality of cameras comprises a first forward facing camera.

Optionally, the plurality of cameras comprises a second forward facing camera.

Optionally, the plurality of cameras comprises a first side facing camera.

Optionally, the plurality of cameras comprises a second side facing camera.

Optionally, the method further includes determining, by the processing unit, a desired viewing direction of the camera system for improving a value of the metric.

Optionally, the method further includes generating the graphics based on the determined desired viewing direction, the graphics configured to instruct the user to change a current viewing direction of the camera system to the desired viewing direction.

Optionally, the method further includes obtaining an additional image from the camera system after the desired viewing direction of the camera system has been achieved.

Optionally, the method further includes updating the map based on the additional image.

Optionally, the method further includes updating the metric based on the updated map.

Optionally, the metric is determined before the processing unit uses the map to localize the user with respect to the environment.

Optionally, the metric is determined before the apparatus shares content with another apparatus.

Optionally, the metric is determined during a map construction session in which the processing unit determines the map.

Optionally, the metric is determined retroactively by accessing the map that was previously determined from a non-transitory medium.

A method performed by an apparatus that is configured to be worn on a head of a user, the apparatus having a screen configured to present graphics to the user, a camera system configured to view an environment in which the user is located, and a processing unit, includes: obtaining, by the processing unit, output(s) from the camera system; determining a map by the processing unit based at least in part on the output(s) from the camera system, wherein the map is configured for use by the processing unit to localize the user with respect to the environment; and obtaining, by the processing unit, a score for an image obtained from the camera system, the score indicating how well the image is constrained with respect to a map segment for forming the map, wherein the act of obtaining the score comprises computing the score or receiving the score.

Additional and other objects, features, and advantages of the disclosure are described in the detail description, figures and claims.

BRIEF DESCRIPTION OF THE DRAWINGS

The drawings illustrate the design and utility of various embodiments of the present disclosure. It should be noted that the figures are not drawn to scale and that elements of similar structures or functions are represented by like reference numerals throughout the figures. In order to better appreciate how to obtain the above-recited and other advantages and objects of various embodiments of the disclosure, a more detailed description of the present disclosures briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which.

DETAILED DESCRIPTION

Figure 1:
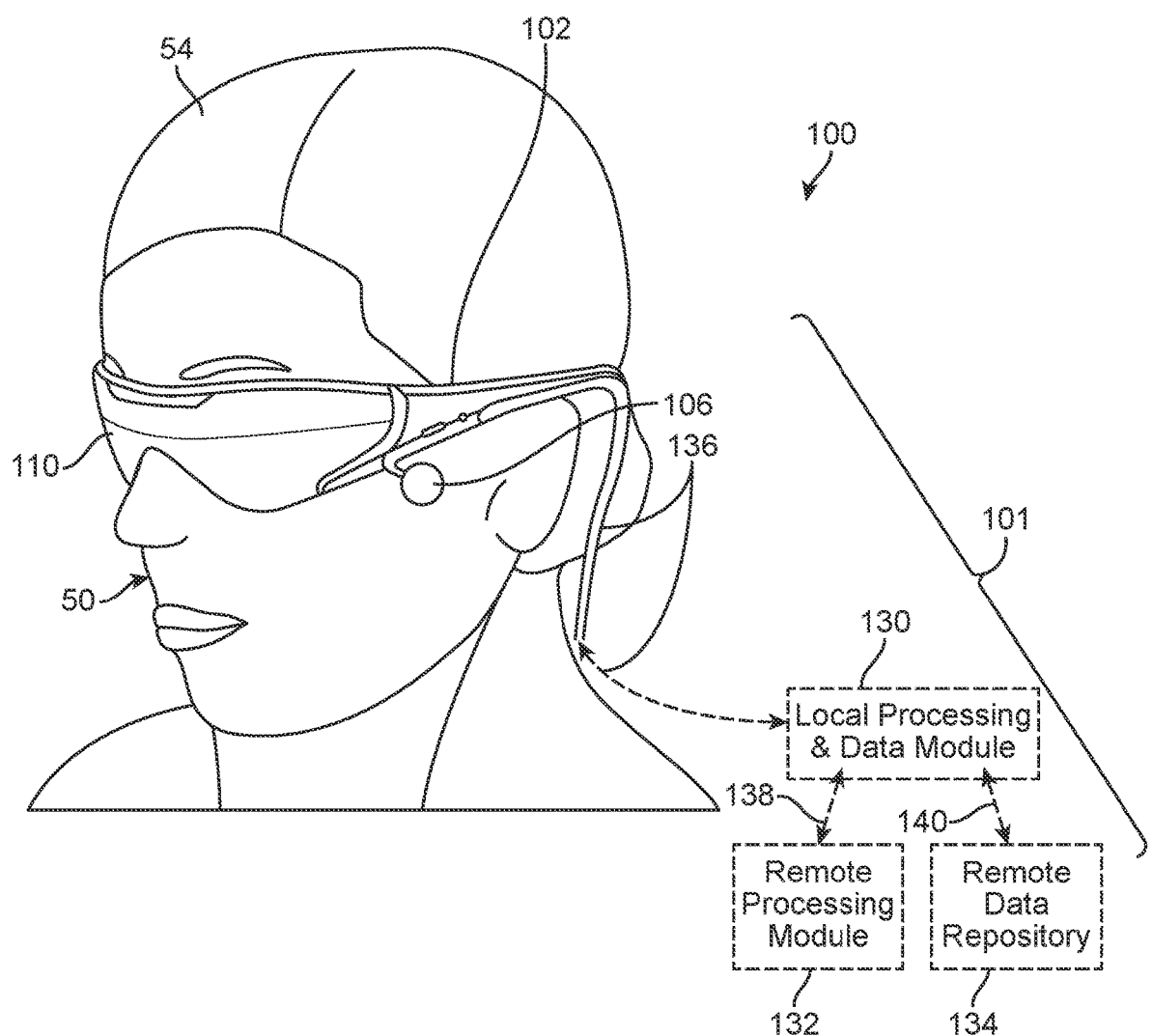
FIG. 1 illustrates another image display system having an image display device in accordance with some embodiments.
Figure 2:
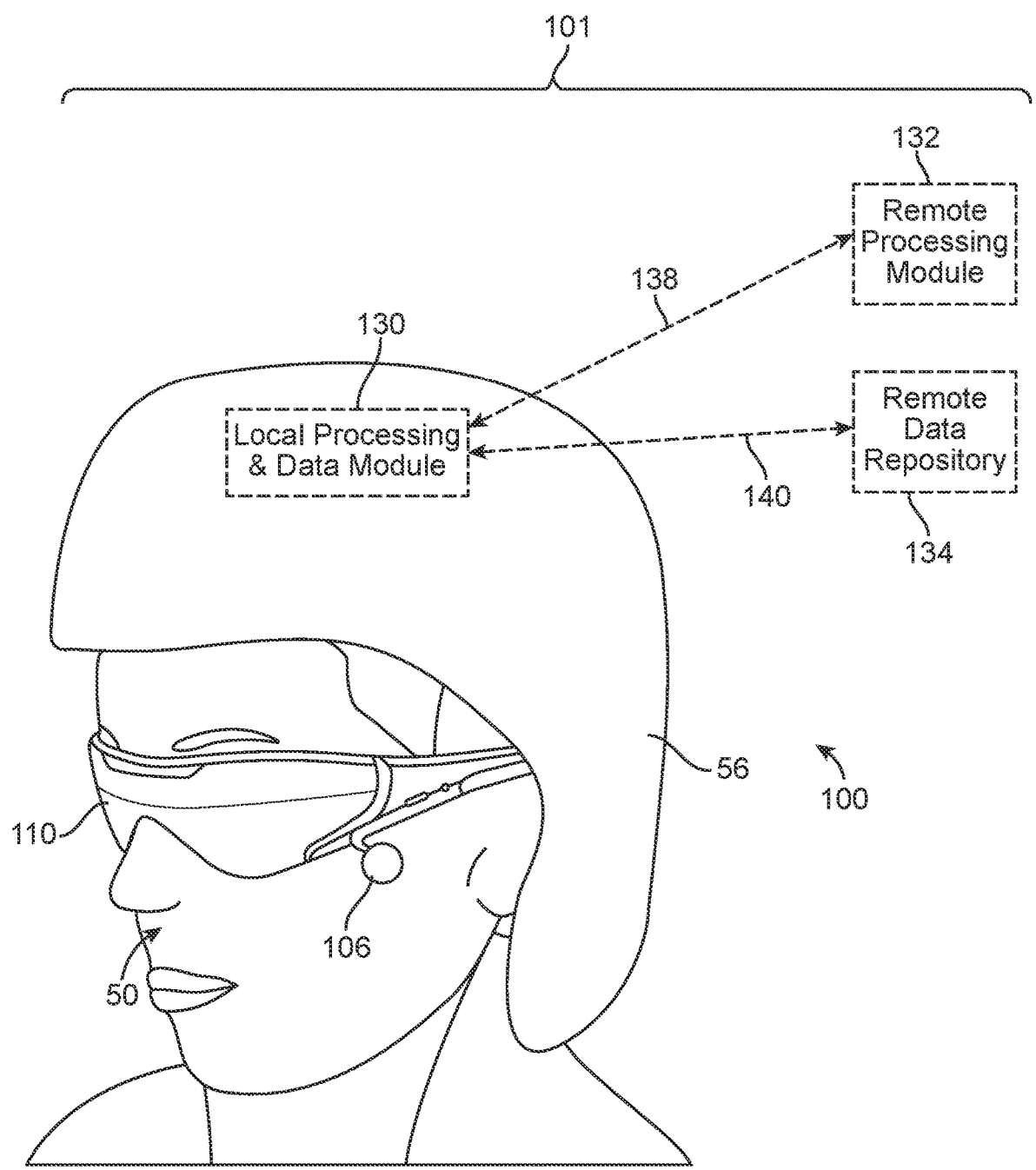
FIG. 2 illustrates another image display system having an image display device in accordance with other embodiments.
Figure 3:
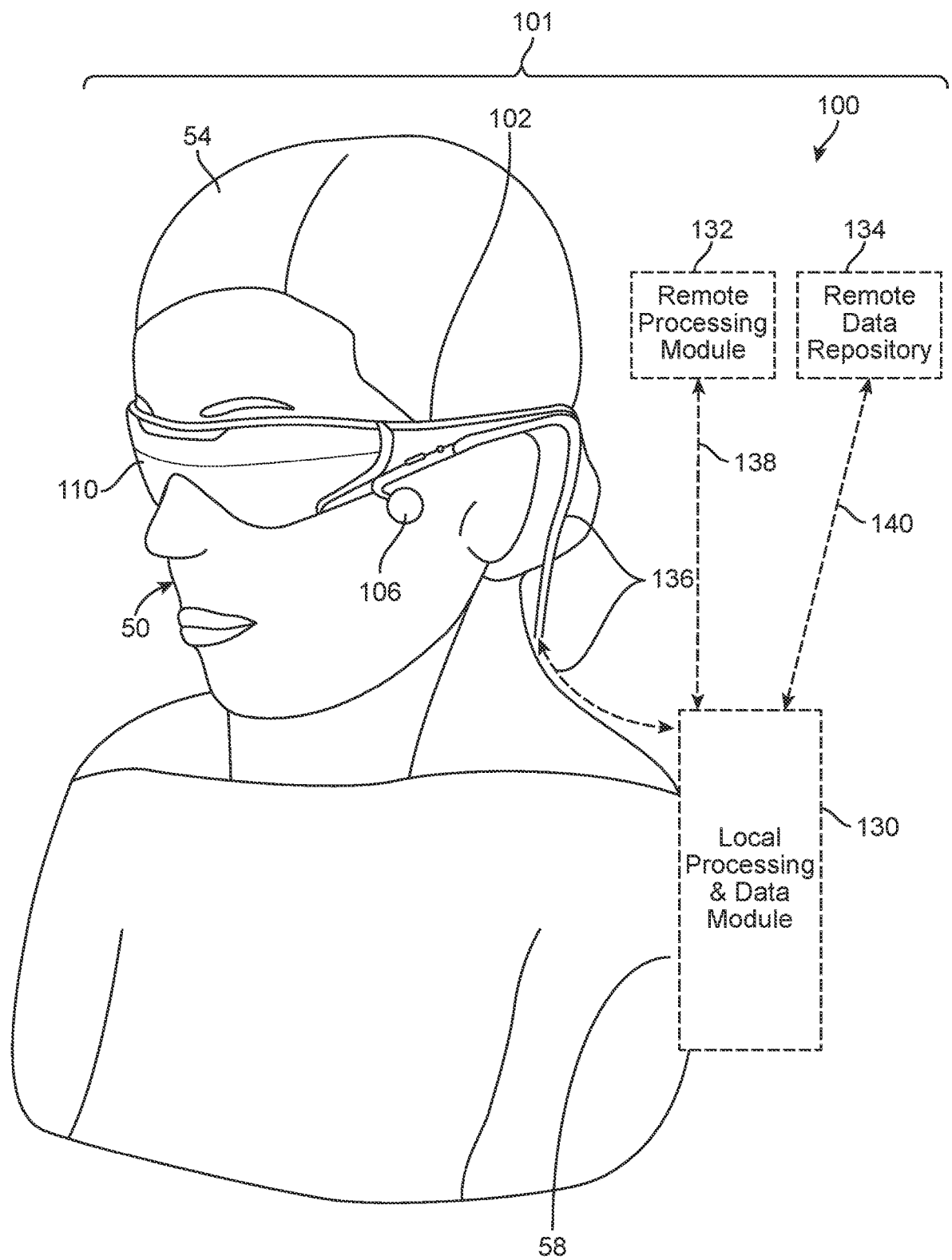
FIG. 3 illustrates another image display system having an image display device in accordance with other embodiments.

Various embodiments of the disclosure are directed to methods, apparatuses, and articles of manufacture for providing input for video image devices that are configured to be worn on users' heads. Other objects, features, and advantages of the disclosure are described in the detailed description, figures, and claims.

Various embodiments are described hereinafter with reference to the figures. It should be noted that the figures are not drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The description that follows pertains to an illustrative VR, AR, and/or MR system with which embodiments described herein may be practiced. However, it is to be understood that the embodiments also lends themselves to applications in other types of display systems (including other types of VR, AR, and/or MR systems), and therefore the embodiments are not to be limited to only the illustrative examples disclosed herein.

Summary of Problems and Solutions

In some cases, in order to localize a user of an image display device with respect to the user's environment, a localizing map of the environment is obtained. Then real-time tracking image from the camera system of the image display device is then matched against the localizing map to localize the user. The success of the localization depends on the quality of the localizing map. Accordingly, it would be advantageous to determine a metric for indicating a quality of the map, which indicates a likelihood of success for using the map for localization. Various techniques may be employed to determine the metric. In one implementation, the metric is determined based on co-visibility of reference points captured in different images. A reference point may be a map point representing a feature of interest, such as a corner, an edge, etc., wherein the feature of interest may be used to identify an object in an environment for localization purpose. After the user can be successfully localized with respect to the user's environment, the user can then use the image display device to place virtual content with respect to the environment, retrieve previous content from previous session, share content in the environment with other user(s), etc.

The localizing map may be created using camera system of the image display device. In particular, the user of the image display device performs different head poses (e.g., turning the head) to "scan" the environment. While doing so, the camera system captures images of the environment. The processing unit of the image display device then processes the images to create the map. In some embodiments, in order to improve the quality of the map, undesirable data that may contribute to the map may be removed and/or adjusted during the map creation process. In one example, undesirable data may be an image that is not well-constrained with respect to a map segment. As images are generated in a sequence for creating a map, the image are linked together to form a map segment. Each image may capture a certain number of reference point (e.g., map points). If an image has captures many reference points that are also captured by other image(s), then the image may be considered as well-constrained with respect to the segment being created. On the other hand, if the image has only a few reference points, and/or the reference points in the image are not detected by other images, then the image may be considered as poorly-constrained with respect to the segment being created. In some embodiments, images that are not well-constrained may be removed, and map segments with well-constrained images may be connected together to form a localizing map.

FIGS. 1-4 illustrate various components of an image display system 100 in various embodiments. The image display system 100 includes an image display device 101, and an apparatus 200 for providing input for the image display device 101. The apparatus 200 will be described in further detail below. The image display device 101 may be a VR device, an AR device, a MR device, or any of other types of display devices. The image display device 101 includes a frame structure 102 worn by an end user 50, a display subsystem 110 carried by the frame structure 102, such that the display subsystem 110 is positioned in front of the eyes of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 110 is designed to present the eyes of the end user 50 with light patterns that can be comfortably perceived as augmentations to physical reality, with high-levels of image quality and three-dimensional perception, as well as being capable of presenting two-dimensional content. The display subsystem 110 presents a sequence of frames at high frequency that provides the perception of a single coherent scene.

In the illustrated embodiments, the display subsystem 110 employs "optical see-through" display through which the user can directly view light from real objects via transparent (or semi-transparent) elements. The transparent element, often referred to as a "combiner," superimposes light from the display over the user's view of the real world. To this end, the display subsystem 110 comprises a partially transparent display. The display is positioned in the end user's 50 field of view between the eyes of the end user 50 and an ambient environment, such that direct light from the ambient environment is transmitted through the display to the eyes of the end user 50.

In the illustrated embodiments, an image projection assembly provides light to the partially transparent display, thereby combining with the direct light from the ambient environment, and being transmitted from the display to the eyes of the user 50. The projection subsystem may be an optical fiber scan-based projection device, and the display may be a waveguide-based display into which the scanned light from the projection subsystem is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 110 may be monocular or binocular.

The image display device 101 may also include one or more sensors (not shown) mounted to the frame structure 102 for detecting the position and movement of the head 54 of the end user 50 and/or the eye position and inter-ocular distance of the end user 50. Such sensors may include image capture devices (such as cameras), microphones, inertial measurement units, accelerometers, compasses, GPS units, radio devices, and/or gyros), or any combination of the foregoing. Many of these sensors operate on the assumption that the frame 102 on which they are affixed is in turn substantially fixed to the user's head, eyes, and ears.

The image display device 101 may also include a user orientation detection module. The user orientation module detects the instantaneous position of the head 54 of the end user 50 (e.g., via sensors coupled to the frame 102) and may predict the position of the head 54 of the end user 50 based on position data received from the sensors. Detecting the instantaneous position of the head 54 of the end user 50 facilitates determination of the specific actual object that the end user 50 is looking at, thereby providing an indication of the specific virtual object to be generated in relation to that actual object and further providing an indication of the position in which the virtual object is to be displayed. The user orientation module may also track the eyes of the end user 50 based on the tracking data received from the sensors.

The image display device 101 may also include a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of the image display device 101 may include a central processing unit (CPU), a graphics processing unit (GPU), one or more frame buffers, and a three-dimensional data base for storing three-dimensional scene data. The CPU may control overall operation, while the GPU may render frames (i.e., translating a three-dimensional scene into a two-dimensional image) from the three-dimensional data stored in the three-dimensional data base and store these frames in the frame buffers. One or more additional integrated circuits may control the reading into and/or reading out of frames from the frame buffers and operation of the image projection assembly of the display subsystem 110.

Figure 4:
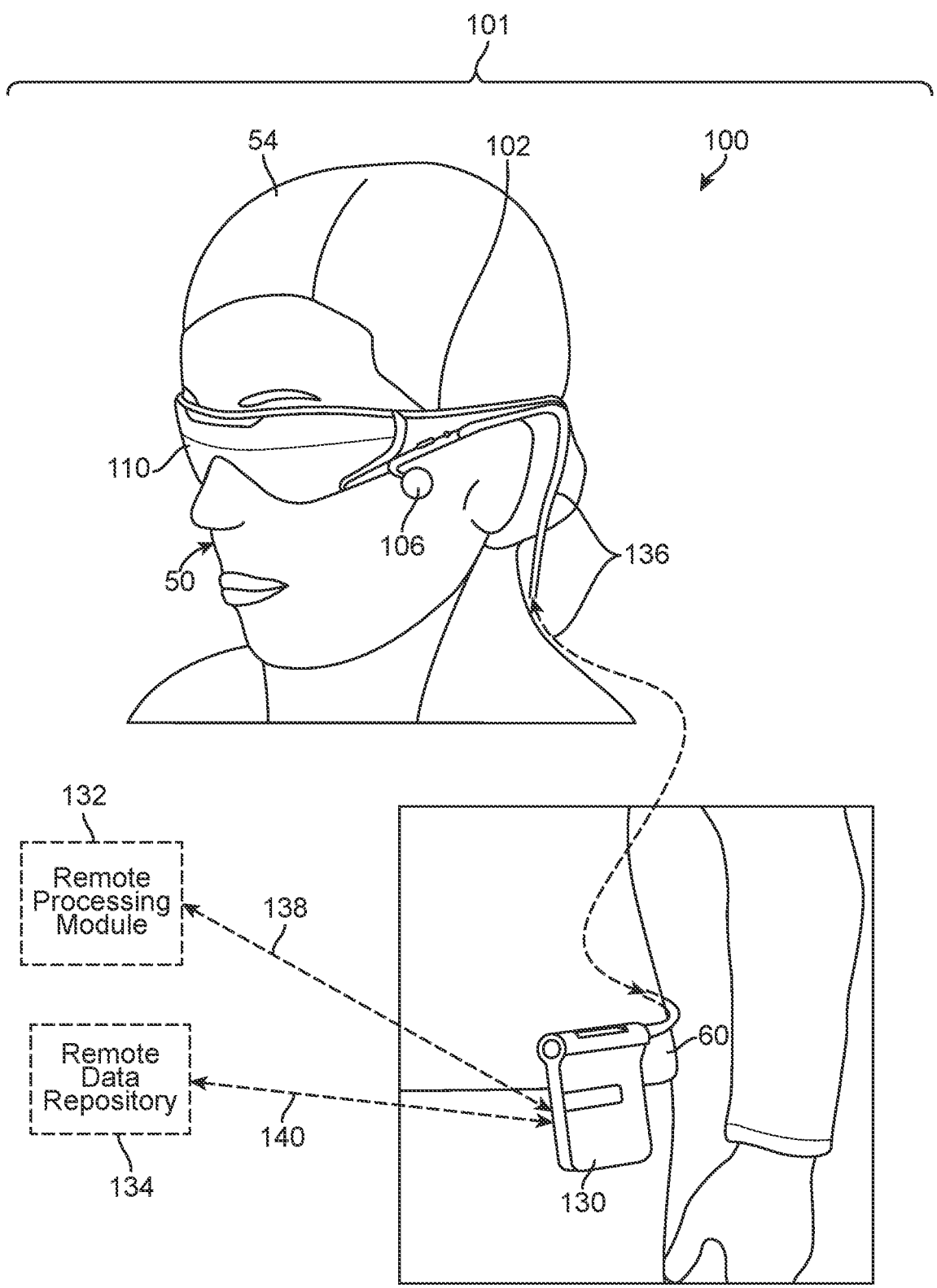
FIG. 4 illustrates another image display system having an image display device in accordance with other embodiments.

The various processing components of the image display device 101 may be physically contained in a distributed subsystem. For example, as illustrated in FIGS. 1-4, the image display device 101 may include a local processing and data module 130 operatively coupled, such as by a wired lead or wireless connectivity 136, to the display subsystem 110 and sensors. The local processing and data module 130 may be mounted in a variety of configurations, such as fixedly attached to the frame structure 102 (FIG. 1), fixedly attached to a helmet or hat 56 (FIG. 2), removably attached to the torso 58 of the end user 50 (FIG. 3), or removably attached to the hip 60 of the end user 50 in a belt-coupling style configuration (FIG. 4). The image display device 101 may also include a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 110 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In some embodiments, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 1-4. Thus, the particular choice of wired or wireless communications should not be considered limiting.

In some embodiments, the user orientation module is contained in the local processing and data module 130, while CPU and GPU are contained in the remote processing module. In alternative embodiments, the CPU, GPU, or portions thereof may be contained in the local processing and data module 130. The 3D database can be associated with the remote data repository 134 or disposed locally.

Some image display systems (e.g., VR system, AR system, MR system, etc.) use a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2 N or 3 N stacked LOEs may be used to generate RGB colored images at N depth planes.

In order to present 3-D virtual content to the user, the image display system 100 (e.g., VR system, AR system, MR system, etc.) projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 5:
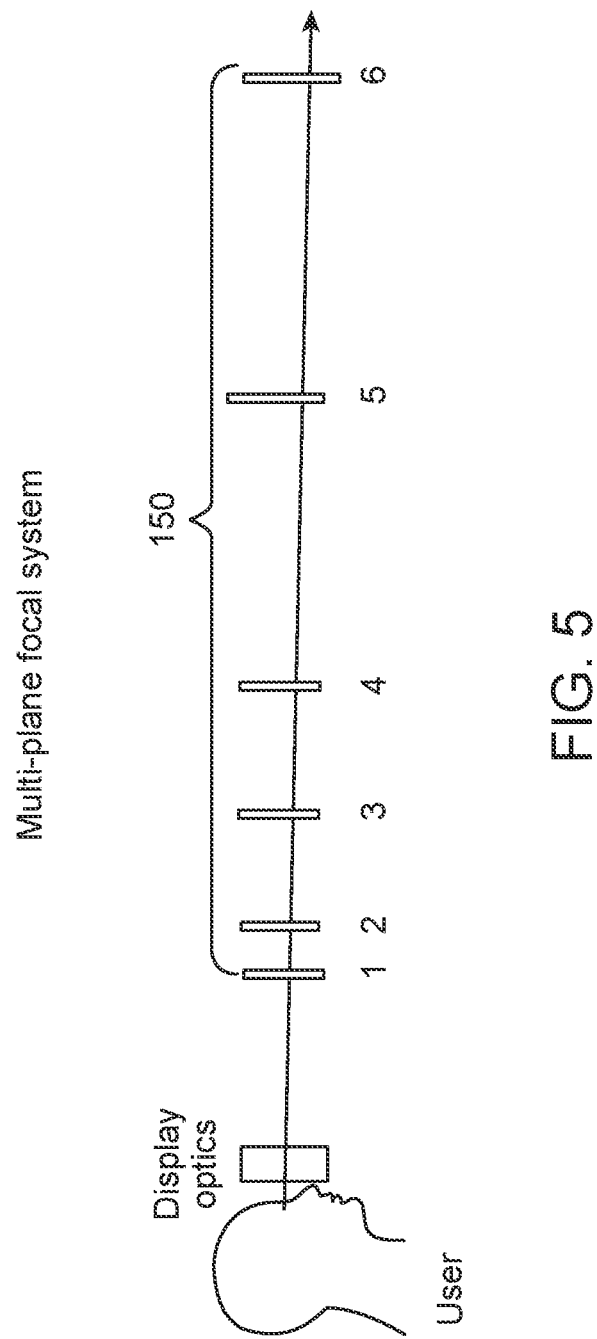
FIG. 5 illustrates an image display device displaying frames in multiple depth planes.

Multiple-plane focus systems create a perception of variable depth by projecting images on some or all of a plurality of depth planes located at respective fixed distances in the Z direction from the user's eye. Referring now to FIG. 5, it should be appreciated that multiple-plane focus systems may display frames at fixed depth planes 150 (e.g., the six depth planes 150 shown in FIG. 5). Although MR systems can include any number of depth planes 150, one exemplary multiple-plane focus system has six fixed depth planes 150 in the Z direction. In generating virtual content one or more of the six depth planes 150, 3-D perception is created such that the user perceives one or more virtual objects at varying distances from the user's eye. Given that the human eye is more sensitive to objects that are closer in distance than objects that appear to be far away, more depth planes 150 are generated closer to the eye, as shown in FIG. 5. In other embodiments, the depth planes 150 may be placed at equal distances away from each other.

Depth plane positions 150 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 150 at other distances/diopters. Thus, in generating virtual content at strategically placed depth planes 150, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the image display system 100 (e.g., VR system, AR system, MR system, etc.) may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE retaining collimation of light (e.g., depth plane 6 from FIG. 5) may be utilized. Then an image of a closer tree branch may be injected at time 2 and an LOE configured to create an image appearing to originate from a depth plane 10 meters away (e.g., depth plane 5 from FIG. 5) may be utilized; then an image of a pen may be injected at time 3 and an LOE configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

The image display system 100 may project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Localizing Map

Figure 6:
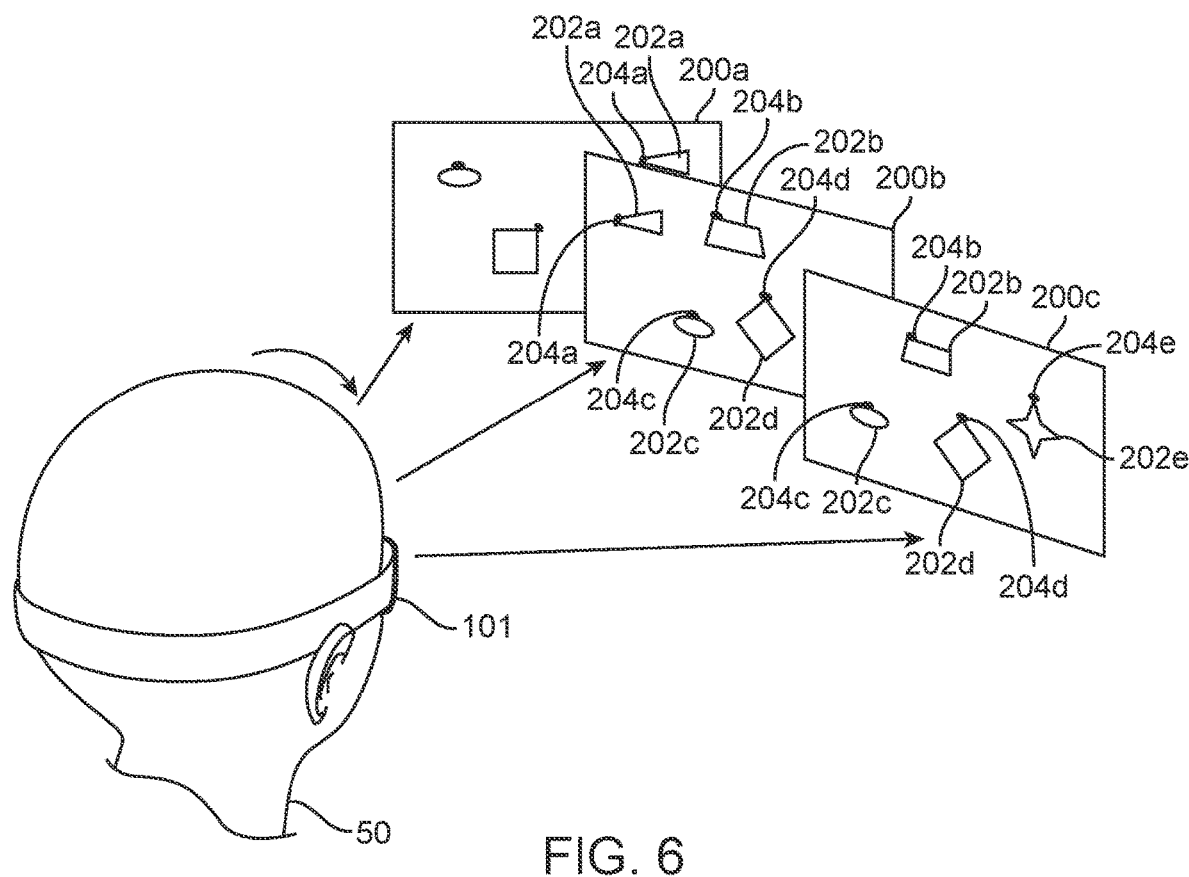
FIG. 6 illustrates a method for determining a map for allowing an image display device to localize a user of the image display device, and/or to perform other function(s).

FIG. 6 illustrates a method for determining a map for allowing the image display device 101 to localize the user 50 of the image display device 101. As shown in the figure, when the user 50 is using the image display device 101, the user 50 can move the image display device 101 to achieve different viewing locations and/or directions. For example, the user 50 may turn his/her head, turn his/her body, and/or walk to different locations. In some embodiments, the image display device 101 includes a forward facing camera. Thus, by moving the image display device 101, the field of view of the forward facing camera of the image display device 101 will change accordingly. While the user 50 is at different poses, the camera of the image display device 101 generates corresponding images. In the illustrated example, the user 50 achieves three different poses by turning his/her head, and the forward facing camera of the image display device 101 generates three images 200*a*-200*c* that correspond with the three poses. Each of the images 200*a*-200*c* captures certain objects 202 in the environment. For example, image 200*b* captures objects 202*a*-202*d*, and image 200*c* captures objects 202*b*-202*e*. Depending on the poses achieved by the user 50, a certain object in the environment may be captured in multiple images 202 of the camera, and certain other object may be captured in only one image 200. In some embodiments, the processing unit 130 of the image display device 101 is configured to obtain the images 200 from the camera of the image display device 101, and perform image processing to extract features from the images 200 to create a map 220. The map 220 may be stored in a non-transitory medium of the image display device 101, and may be used by the processing unit 130 to perform localization of the user 50. Thus, the map 220 functions as a localizing map. In the illustrated embodiments, the map 220 is a three dimensional representation of the environment detected by the different poses of the user 50.

Figure 7:
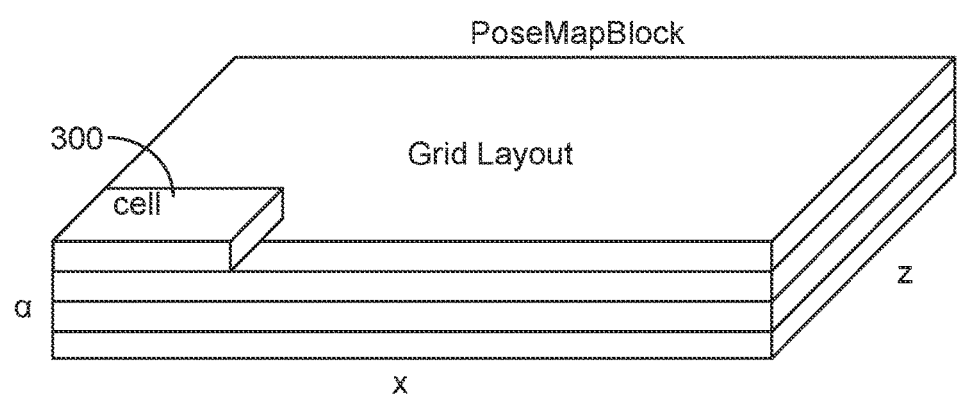
FIG. 7 illustrates an example of an environment being divided into multiple cells.

In some embodiments, the environment surrounding the user 50 may be divided into multiple cells. In such cases, the above map creation technique may be employed for the different cells of the environment. FIG. 7 illustrates an example of an environment being divided into multiple cells 300. Each cell 300 is a defined three-dimensional space representing a portion of the environment. Each cell 300 may have a pre-determined size and shape. For example, each cell 300 may have a footprint area that is 2 m×2 m, and a height that is 2 m. Each cell 300 may have other footprint dimensions and/or other heights in other embodiments. Also, in other embodiments, each cell 300 may not have a rectangular configuration shown, and may have other shapes. In the illustrated embodiments, the cells 300 all have the same shape and dimensions. In other embodiments, at least two of the cells 300 may have different respective dimensions and/or shapes.

In some embodiments, the user 50 of the image display device 101 may go to different locations in the environment corresponding to the different cells 300, and may scan the spaces in the corresponding cells using the camera of the image display device 101 to obtain different maps for the respective cells of the environment. The maps may be stored in the non-transitory medium of the image display device 101 for allowing the processing unit 130 of the image display device 101 to perform localization of the user 50.

During use of a map to localize the user 50, the camera of the image display device 101 obtains an image of the environment based on a certain position and orientation of the user 50. Such camera image serves as a tracking image (one or more images may be used to create a tracking map) for allowing the processing unit 130 of the image display device 101 to track a position and/or pose and/or orientation of the user 50. In particular, the processing unit 130 of the image display device 101 processes the image from the camera to determine if features in the image match with certain features in the map 220. If a match is found, the processing unit 130 may then determine the position and orientation of the user 50 based on the matched features. In some embodiments, the map 220 may contain less information (e.g., features) than the tracking image provided by the camera of the image display device 101, because certain features may be filtered out or removed when the map 220 was created. This is advantageous because it allows the processing unit 130 to efficiently match the tracking image with the map 220. Also, in some embodiments, the map 220 may be called a "canonical map". In some embodiments, there may be one or more canonical maps. More than one canonical map may be used e.g., to correspond to security settings or access permissions for certain locations or certain virtual content or applications. When performing localization, the processing unit 130 performs features extraction to extra features from camera image (tracking image), and matches the features with those in the canonical map. For example, the processing unit 130 may perform features extraction by identifying objects, corners, etc., in the image. In one implementation, the processing unit 130 is configured to find a six degree of freedom transformation between the tracking image and the canonical map to localize the user 50. Once the user 50 can be successfully localize with respect to his/her environment using the map, the processing unit 130 may then allow the user to place virtual content with respect to the environment using the map, retrieve the virtual content from previous session, share the virtual content with other user(s), etc.

In some embodiments, if there are multiple maps created for multiple cells (like those described with reference to FIG. 7), the processing unit 130 may be configured to determine which of the maps is applicable based on the current location of the user 50. For example, if the user 50 is at a location within cell No. 4, the processing unit 130 may then retrieve or access the map created for cell No. 4, and may then use such map for localization of the user 50 while the user is in the space corresponding to cell No. 4. When the user 50 has moved out of the space of cell No. 4, the processing unit 130 then stops using the map of the cell No. 4 for localization of the user. For example, the user 50 may move from cell No. 4 to cell No. 5. In such cases, the processing unit 130 may then use the retrieve or access the map created for cell No. 5, and may then use such map for localization of the user 50 while the user is in the space corresponding to cell No. 5.

Map Quality Scoring

As illustrated above, because the localization of the user 50 with respect to the environment is based on a matching of the features of the tracking camera image and features of the map 220, a quality of the map 220 may correlate with a successful localization of the user 50. In some embodiments, the processing unit 130 of the image display device 101 may be configured to determine a metric indicating a likelihood of success to localize the user using the map 220. In some embodiments, the processing unit 130 of the image display device 101 may be configured to determine such metric during a map construction session in which the user 50 uses the image display device 101 to scan the environment. Alternatively or additionally, the processing unit 130 may determine such metric retroactively after the map 220 has been constructed to evaluate the quality of the constructed map 220.

In some embodiments, the processing unit 130 may determine the metric by performing computation to obtain the metric. In other embodiments, the processing unit 130 may determine the metric by receiving the metric from another component or device to obtain the metric. By means of non-limiting examples, the other component or device providing the metric may be a module in the image display device 101, or an external device that is in communication with the image display device, wherein the external device may be worn by the user or may be physically decoupled from the user. For example, the external device may be a wireless transmitter, a computer, a handheld or body-worn device, a database, a server, a base station, etc.

Figure 8A:
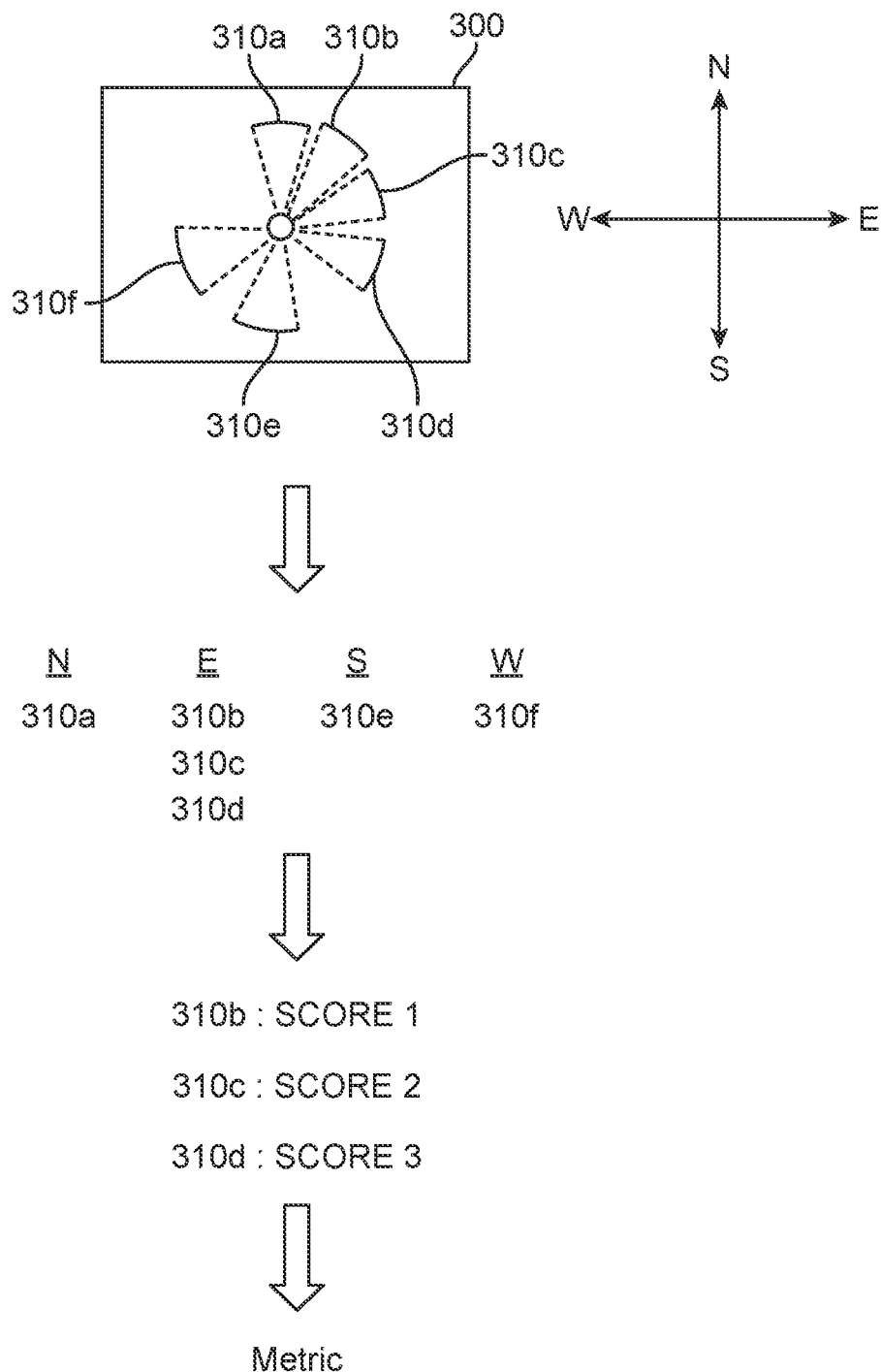
FIG. 8A illustrates a method of determining a metric indicating a likelihood of success to localize a user using a map.

FIG. 8A illustrates an example of a method for determining a metric indicating a likelihood of success to localize the user 50 using a map. The metric may be considered as a measure of a quality of the map. In the illustrated example, the metric is determined for a particular cell 300 of an environment. In some cases, there may be multiple cells 300 in an environment, and the metric may be determined for each of the multiple cells 300. As shown in the figure, while the user 50 is in the space of the cell 300, the user 50 may perform different poses to allow the camera of the image display device 101 to capture different images 310 corresponding with the respective poses. In the illustrated example, the user 50 has performed six poses, and the camera of the image display device 101 generates six corresponding images 310a-310f. The image 310a is generated while the user 50 is viewing generally in the north direction. The images 310b-310d are generated while the user 50 is viewing generally in the east direction. The image 310e is generated while the user is viewing generally in the south direction. The image 310f is generated while the user is viewing generally in the west direction.

In some embodiments, to determine the metric that measures a quality of the map, the processing unit 130 first quantizes poses by the user 50 so that images that belong to the same viewing direction or to the same range of viewing directions are grouped together. For example, in one implementation, images having corresponding viewing directions that do not vary by more than 30° from a given reference direction may be grouped together. Following the above example, with respect to the east direction (reference direction), the processing unit 130 may be configured to group all images 310 having corresponding viewing directions that are facing east (the reference direction)±30°. Accordingly, the processing unit 130 may group images 310b-310d because their corresponding viewing directions are within a range that is east direction±30°. Similar technique may be employed to group images for other reference directions (e.g., south direction, west direction, north direction, etc.).

After the processing unit 130 has quantized poses and has grouped the images 300 from the camera of the image display device 101 based on the quantized poses, the processing unit 130 may then determine a metric for a given reference direction based on the images 300 in the group. Following the above examples, the processing unit 130 may determine a score for each of the three images 310b-310d belong to the group for the east reference direction. As shown in the figure, the processing unit 130 may determine score 1 for the image 310b, score 2 for the image 310c, and score 3 for the image 310d. In some embodiments, the score for the image 310 represents a number of reference points captured in the image. By means of non-limiting examples, a reference point may be a part of a feature, a part of an object, a point in a three-dimensional space, etc., to be represented by or included with the map 220. The reference points of the map 220 allow a tracking image to be matched with the map 220. Accordingly, the more reference points there are for a given viewing direction in a cell 300, the higher the chance that a tracking image can be matched with the map 220 for that given viewing direction.

Figure 9:
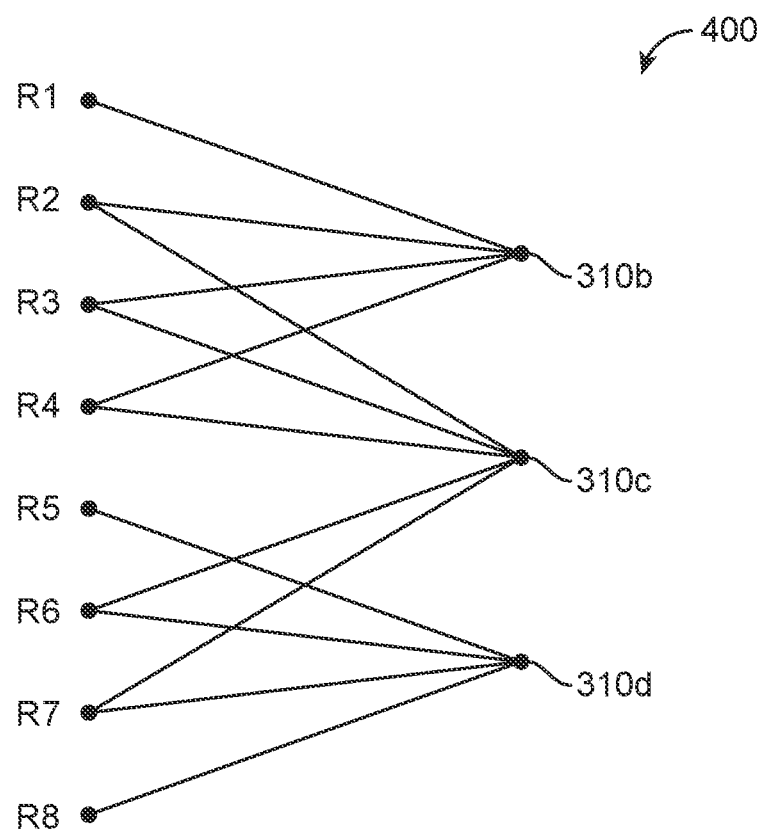
FIG. 9 illustrates an example of a co-visibility graph.

Various techniques may be employed to determine the scores for the images 310. In one technique, the processing unit 130 may utilizes a co-visibility graph to determine respective scores for the images 310. A co-visibility graph is a bi-parte graph that links reference points to images 310 based on which reference point(s) is visible in which of the images 310. FIG. 9 illustrates an example of a co-visibility graph 400. In the example, there are eight reference points R1-R8, and the identities of images 310b-310d that correspond with the reference direction (i.e., east in the example) are also shown. In the example of the co-visibility graph 400, the image 310b is linked with reference points R1-R4 because these reference points are captured in the image 310*b*. Also, the image 310*c* is linked with reference points R2-R4 and R6-R7 because these reference points are captured in the image 310*c*. The image 310*d* is linked with reference points R5-R8 because these reference points are captured in the image 310*d*. In the example shown, only the identities of the images 310*b*-310*d* and their associated reference points are included in the co-visibility graph 400 for illustrative purpose. It should be noted that the co-visibility graph 400 may include other reference points detected by other images, and other identities of images, such as images 310*a*, 310*e*, 310*f*, etc. In some embodiments, the co-visibility graph 400 may include identities of all of the images generated by the camera of the image display device 101 while the user is performing different poses in a certain cell 300 of an environment, all of the reference points captured in all of the images, and links associating the reference points with the images.

Returning to the above example, the scores for the images 310*b*-310*d* may be determined by the processing unit 130 as 4, 5, and 4, respectively. After the processing unit 130 determines the scores for the respective images belonging to the same reference direction (or range of reference directions), the processing unit 130 may then combine the scores to determine a composite score. For example, the processing unit 130 may add all of the scores to obtain a total score. Following the above example, the total score for the east reference direction will be 4+5+4=13. The processing unit 130 may also divide the total score with a number of the images 310 used to derive the total score in order to obtain an average score. Following the above example, the average score for the east reference direction will be 13/3=4.33. The score 4.33 in the above example indicates that there are, on average, 4.33 reference points detected in each image for the east reference direction.

In other embodiments, instead of including all of the reference points linked with each image 310 in the co-visibility graph 400 for determining the score for the corresponding image 310, the processing unit 130 may be configured to include only a subset of the reference points. For example, in other embodiments, the processing unit 130 may be configured to count only the reference points that are linked to two or more images 310 for determining the score. In particular, following the example of the co-visibility graph of FIG. 9, the processing unit 130 may determine the score for the image 310*b* as 3, because reference points R2-R4 captured in the image 310*b* are also captured in the image 310*c*. Reference point R1 is not counted as a part of the score because the reference point R1 is captured only in the image 310*b*, and not in other images 310. Similarly, the processing unit 130 may determine the score for the image 310*c* as 5, and the score for the image 310*d* as 3. The processing unit 130 may add all of the scores to obtain a total score. Following the above example, the total score for the east reference direction will be 3+5+3=11. The processing unit 130 may also divide the total score with a number of the images 310 used to derive the total score in order to obtain an average score. Following the above example, the average score for the east reference direction will be 11/3=3.67. The score 3.67 in the above example indicates that there are, on average, 3.67 reference points detected in each image that are captured in at least two of the images for the east reference direction.

In the above examples, the processing unit 130 is also configured to determine a total number of images 310 from the camera for one of a plurality of cells 300, wherein the total number of images is associated with a certain reference (viewing) direction (e.g., east direction±30°) for the cell 300. In other embodiments, the reference direction may be other directions, such as the north direction, south direction, west direction, etc. Also, in other embodiments, the reference direction may have a range that is different from 60° (±30°). For example, in other embodiments, the reference direction may have a range that is less than 60°, such as 50° (e.g., ±25°), 40° (e.g., ±20°), 30° (e.g. ±15°), 20° (e.g., ±10°), 10° (e.g., ±5°), 0°, etc. In other embodiments, the processing unit 130 may be configured to determine a total number of images 310 that are associated with multiple viewing directions for the cell 300. For example, if the images 310*a*-310*f* are all of the images generated for the cell 300, the processing unit 130 may determine the total number of images 310 as 6.

In some embodiments, the metric for indicating the quality of the map 220 may be, or may comprise a total score or an average score for a certain reference direction (e.g., north, east, south, west, etc.). In other embodiments, the metric for indicating the quality of the map 220 may be, or may comprise total scores or average scores for different respective reference directions (e.g., north, east, south west, etc.). In further embodiments, the processing unit 130 may combine the scores for the different directions to determine a cell score for a certain cell 300. For example, the processing unit 130 may add the total scores, or may add the average scores, for the north, east, south, and west direction to determine the cell score for the cell 300. In such cases, the metric comprises the cell score for the cell 300.

In further embodiments, the metric for indicating the quality of the map 220 may be an array or a set of values. For example, the metric may include different values for different viewing directions. In such cases, the metric may have a first value associated with a first directionality, and a second value associated with a second directionality.

As shown in the above embodiments, the metric for indicating the quality of the map 220 may have a value that is based on directionality. In some embodiments, the directionality is with respect to one or more vertical axes, and/or one or more horizontal axes. Also, in some embodiments, the directionality may comprise a turn direction (like that shown in FIG. 6), a tilt angle (e.g., resulted from the user tilting his/her head to change viewing direction), a roll angle (e.g., resulted from the user rolling his/her head to change viewing direction), or any combination of the foregoing.

Also, in some embodiments, the metric may have a value that is based on a position of the user 50 with respect to a coordinate of a cell 300. For example, if the user 50 is standing close to the eastern boundary of the cell 300, and is facing east, the camera will detect fewer reference points compared to the scenario in which the user 50 is standing close to the western boundary of the cell 300 and is facing east (because there will be more objects within the cell 300 to view in this later scenario). Accordingly, in some embodiments, the metric may have a first value associated with a first position within the cell 300, and a second value associated with a second position within the cell 300.

In some embodiments, the processing unit 130 may also be configured to determine an area score indicating a degree of coverage by the map. In some cases, the area score is based on a spatial distribution of data points of the map. The area score is advantageous in that it may ensure that the map covers different parts of the environment.

As shown in the above examples, the processing unit 130 is configured to determine the metric based on a co-visibility of a point of interest that is associated with different camera positions. The metric is advantageous because it indicates a number of reference points that are useable to localize the user 50 with respect to the environment. Accordingly, the metric indicates a likelihood of success to localize the user 50 in one or more viewing directions. Also, as shown in the above example, the processing unit is configured to determine the metric based on a number of times a point of interest is detected from different camera positions. Therefore, the metric can be easily and efficiently determined without involving complex calculation and without consuming significant computational resources.

In the above embodiments, the metric has been described as being determined based on different viewing orientations of the user 50 wearing the image display device 101, wherein the different viewing orientations are achieved by changing a directionality of the field of view of the camera. In the above examples, the change of directionality to achieve different view orientations for determining the metric is achieved by the user turning his/her head or body about a vertical axis or multiple vertical axes. Alternatively, or additionally, the change of directionality to achieve different view orientations for determining the metric may be achieved by the user turning his/her head or body about a horizontal axis or multiple horizontal axes. For examples, the change in the directionality may comprise a change in a turn angle (like that shown in FIG. 6), a change in a tilt angle (e.g., resulted from the user tilting his/her head or body to change viewing direction), a change in a roll angle (e.g., resulted from the user rolling his/her head or body to change viewing direction), or any combination of the foregoing.

As discussed, in some embodiments, the processing unit 130 is configured to determine the metric during a map construction session in which the processing unit 130 determines the map 220. In some cases, the processing unit 130 may be configured to determine or update the metric as additional image(s) from the camera of the image display device 101 is generated during the map construction session. For example, the processing unit 130 may initially determine the map 220 based on the images 310a, 310b provided by the camera of the image display device 101 during a map construction session in which the user 50 uses the camera to scan the environment. During the map construction session, the processing unit 130 may also determine the metric for indicating the quality of the map 220 (initially based on the images 310a, 310b). As the user 50 continues to scan the environment using the camera, the camera generates additional images based on the user's poses. For example, the camera may next generate the image 310c. The processing unit 130 may then determine (e.g., update) the map 220 based on the new image 310c. Thus, the updated map 220 will be based on images 310a-310c. In some cases, the updated map 220 may be considered as a new map that is built from the previous map. The processing unit 130 may also determine the metric for indicating the quality of the updated map 220. For example, the processing unit 130 may update the previously determined metric by changing one or more values for the metric, adding one or more values for the metric, and/or deleting one or more values for the metric, based on the updated map 220. Alternatively, the processing unit 130 may determine an additional metric (i.e., in addition to the previously determined metric) based on the updated map 220.

In other embodiments, instead of updating the map 220 based on every newly generated image, the processing unit 130 may be configured to update the map 220 after the camera has generated a certain pre-determined number (e.g., 2, 3, 4, 10, 20, or any arbitrary number) of images. In such cases, the processing unit 130 may be configured to determine a metric (e.g., update a previous metric, or determine an additional metric) whenever the map 220 is updated.

In further embodiments, the processing unit 130 may be configured to update the map 220 after one or more criteria are achieved, wherein the one or more criteria may or may not involve the number of images generated. For example, a criterion may be a user's command to determine the map 220. In such cases, the image display device 101 may include a user control for allowing the user 50 to input map construction command. When the processing unit 130 receives such command from the user 50, the processing unit 130 then uses the latest newly generated images to construct the map 220. If a previous map 220 was already determined, then the processing unit 130 may update the map 220 using the newest images in response to the user's command. Whenever the map 220 is updated, the processing unit 130 may also determine the metric for the updated map 220. Thus, the determination of the metric may be performed in response to the user's input.

As another example, a criterion may be a change in an orientation of the user's pose (corresponding with image orientation) that is within a certain threshold. In such cases, the processing unit 130 may be configured to update the map 220 using newly generated image(s) as long as the user's pose(s) for which the new image(s) was generated does not deviate from the previous pose by more than a certain threshold. In one implementation, images 310 are stored in a non-transitory medium as they are generated. The processing unit 130 keeps track of the relative orientation between adjacent images. If a newly generated image 310 has an orientation relative to the previous image 310 that exceeds the threshold, the processing unit 130 then uses the last set of generated images 310 to update the map 220. For example, assuming the image 310c has an orientation relative to the image 310b that is 20°, the image 310d has an orientation relative to the image 310c that is 15°, the image 310e has an orientation relative to the image 310d that is 55°, and the threshold is 25°, in such cases, when the processing unit 130 determines that the relative orientation between images 310d and 310e exceeds the threshold, the processing unit 130 then use images 310b-310d to determine (e.g., update) a map. This technique allows the processing unit 130 to do a map update using a set of images that are closely constrained with respect to each other.

In further embodiments, instead of updating the previous map 220 based on one or more newly generated images from the camera of the image display device 101, the processing unit 130 may be configured to determine an additional map based on one or more newly generated images. For example, referring to FIG. 8A, assuming a first map (map portion) has been determined based on images 310b-310d, after the camera generates image 310e, the processing unit 130 may determine that a new and additional map is desired that is based on the newly generated image 310e. In such cases, the processing unit 130 may determine a second map (map portion) based on the image 310e. In some embodiments, the processing unit 130 may be configured to combine the first map and the second map after they are generated to obtain a final map for the cell 300. For example, the processing unit 130 may be configured to link features associated with the first and second maps to form the final map. In some embodiments, during the map construction session, the processing unit 130 may be configured to generate a first metric for the first map, and a second metric for the second map. In such cases, the first metric and the second metric may be considered as separate values (or sets of values) of a metric. Also, in some embodiments, the processing unit 130 may combine the first metric and the second metric to determine a combined metric. Thus, as used in this specification, the term "metric" may refer to one or more values, one or more sets of values, one or more quantifications, any information for quantification purposes, or any information derived from any of the foregoing.

In still further embodiments, the processing unit 130 may be configured to determine the map 220 after the user 50 has finished scanning the environment using the camera of the image display device 101. In such cases, all of the images 310 generated while the user 50 is in the cell 300 are stored in a non-transitory medium. After the scanning is completed, the processing unit 130 then retrieves the stored images 310, and processes the images 310 to create the map 220. In such cases, the processing unit 130 also determines the metric after the map 220 is created. Thus, instead of determining the metric during construction of the map 220, the metric is determined after the final map 220 is completed.

As illustrated in the above examples, the term "map" as used in this specification may refer to an initially created map, an updated map, a final map, one or more map portions, a combined map resulted from combining map portions, or any combination of the foregoing. Also, the term "map" may refer to any type of map derived from an initially created map, from an updated map, from a final map, from one or more map portions, from a combined map, etc. Furthermore, the term "map" may refer to any data structure, any three dimensional representation, or any type of information derived from features of one or more images, wherein such data structure, three dimensional representation, or type of information may be form at least a part of a map, or may be any data entity for obtaining the map.

In any of the examples described above, the processing unit 130 may operate the screen of the image display device 101 to display the metric, so that the user 50 can see the metric as the user is using the camera of the image display device 101 to scan the environment. Alternatively, or additionally, the processing unit 130 may also present the metric on the screen for informing the user 50 the quality of the map 220 being used while the processing unit 130 is using the map 220 for localizing the user 50 with respect to the user's environment. This way, the user 50 may selectively decide whether to continue using the map 220 for localization, or to initiate a map construction session to adjust the map 220 (e.g., if the value of the metric indicates that the map has a low quality).

In some embodiments, during a map construction session, the processing unit 130 may be configured to determine a desired viewing direction of the camera based on the metric value. For example, the processing unit 130 may be configured to determine the desired viewing direction of the camera for improving a value of the metric. In such cases, the processing unit 130 may be configured to generate graphics based on the determined desired viewing direction, and transmit the graphics for display by the screen of the image display device 101. The graphics are configured to instruct the user 50 to change a current viewing direction of the camera system to the desired viewing direction. For example, the graphics map direct the user 50 to turn to a certain direction. In one implementation, the graphics may include a target object, and instruction for instructing the user 50 to move (e.g., to turn the head) to follow the target object. The processing unit 130 is configured to place the target object at a certain location in the screen of the image display device 101, wherein the location of the target object in the screen corresponds with a desired viewing direction to be achieved by the user. The processing unit 130 may also display a fixed object that is fixed in position with respect to the display of the image display device 101. For example, the fixed object may be a cross, a circle, a dot, etc., that is positioned in a middle of the screen, and such fixed object does not move in response to movement by the user (i.e., if the user 50 turns his/her head, the fixed object's position in the screen does not change). The processing unit may also instruct the user to move the image display device 101 so that the fixed object will align or intercept the target object. In some cases, after the user 50 has moved the image display device 101 so that the fixed object has aligned or has intercepted the target object, the camera system of the image display device 101 may then captured one or more images of the environment while the image display device 101 is at the achieved desired orientation. If no map has been generated, the processing unit 130 may utilize the image(s) to create the map, and may calculate the metric based on the map. If an initial map has already been created, the processing unit 130 may then update the map based on the newly acquired image(s), and may update the metric based on the updated map.

The above process may be repeated, with the processing unit 130 placing the target object at different positions, inducing the user 50 to move the image display device to view the environment at different viewing orientation in order to build up the map. As the map being updated based on newly generated image(s) for the new viewing direction(s), the processing unit 130 calculates the metric based on the current state of the map. In some embodiments, the processing unit 130 is configured to use a value of the metric for the current state of the map to determine the next desired viewing direction. For example, if the metric indicates that the map has a weak point in a certain direction, the processing unit 130 may then determine such direction, and determines the position for placement of the target object in the screen so that it will induce the user 50 to turn to the desired viewing direction. In other embodiments, instead of determining positions of the target object for placement in the screen of the image display device 101, the positions of the target object may be pre-determined. For example, a desired trajectory for the image display device 101 may be predetermined, and data representative of such desired trajectory may be stored in a non-transitory medium of the image display device 101. In such cases, regardless of whether the user 50 successfully moves the fixed object in the screen to the target object, the camera system of the image display device 101 will capture images during movement of the user 50. Also, in such cases, because the positioning of the target object in the screen is not based on values of the metric, the processing unit 130 does not need to calculate the metric while the map is being generated. Instead, the processing unit 130 may calculate the metric after the map is completed (e.g., after the map generation session has ended).

In other embodiments, the processing unit 130 is configured to determine the metric retroactively by accessing the map 220 that was previously determined from a non-transitory medium. The non-transitory medium may be a part of the image display device 101. Alternatively, the non-transitory medium may be stored in a database, such as in a cloud network. In some cases, the processing unit 130 may determine a desired viewing direction of the camera for improving a value of the metric for the previously determined map 220, and map obtain images from the camera of the image display device 101 for improving the map 220, like that previously described. The improved map 220 may then be stored in the non-transitory medium.

In the above embodiments, the processing unit 130 has been described with reference to providing a target object for display on the screen of the image display device 101, and instructing the user 50 to follow the target object for improving a value of the metric. In other embodiments, instead of the above technique, the processing unit 130 may instruct the user 50 to move to a certain location and/or to change a viewing direction by presenting textual instruction for display on the screen, and/or by presenting an audio instruction using a speaker. For example, the processing unit 130 may instruct the user 50 to turn to the right by 30°, etc. In some embodiments, the desired viewing orientation may be determined by the processing unit 130 in order to maximize the metric value for a particular cell. Also, in some embodiments, when determining the desired viewing orientation, the processing unit 130 may consider the shortest path and/or the quickest time to get a good map.

Figure 8B:
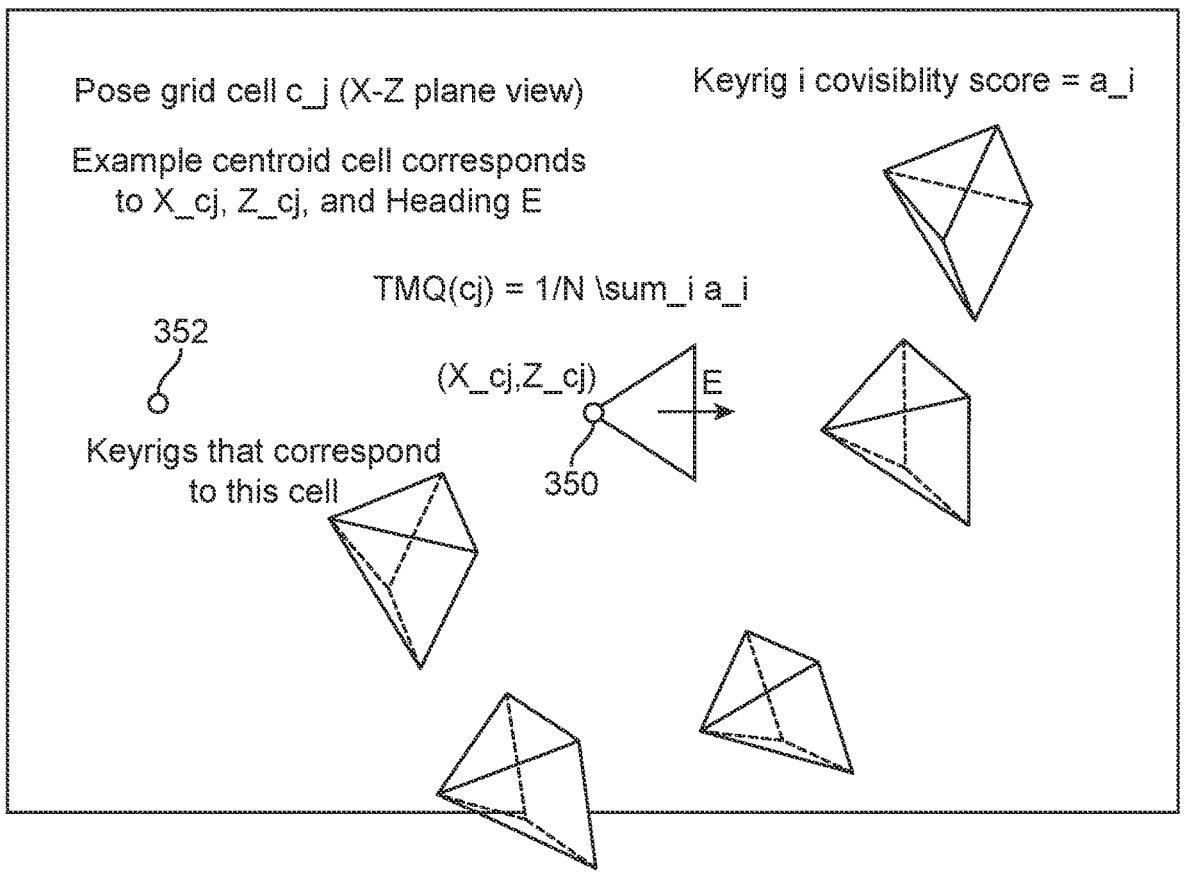
FIG. 8B illustrates a graphical representation of the method of FIG. 8A.

FIG. 8B illustrates a graphical representation of the method of FIG. 8A. As shown in the figure, for a given cell, the camera system of the image display device 101 may capture a number of images. Each of the images is captured when the image display device 101 is at a certain position and orientation (as represented by the pyramid object, with the tip representing the camera position, and the base representing an orientation of a captured image). In the illustrated example, the metric is being determined for an eastward viewing direction. Accordingly, the processing unit 130 quantizes poses and selects those images that correspond with the eastward viewing direction for determining the metric. It should be noted that there may be more images captured for the particular cell 300, but in the illustrated figure, only a subset of the images are shown (i.e., only those images that are captured while the user is viewing generally in the eastward direction are shown). For each of the eastward looking image, a score $a\_i$ is determined. The metric for the particular cell 300 may be determined by summing all of the scores $a\_i$ to obtain a sum. In some embodiments, the metric for the particular cell 300 may also be determined by dividing the sum by a number N of images to obtain an average score. The metric determined may then be stored in a non-transitory medium in association with (1) an identity of the cell 300 for which it is determined, and (2) a viewing direction (e.g., "East" in the above example). In some embodiments, the metric may also be stored in association with a certain reference location (e.g., (x, z)). The metric for a particular cell 300 may have different values, depending on the reference location. For example, if the reference location is selected to be at location 350 (the centroid of the cell 300) in the illustrated example, there are only three images that are to the east of the reference location 350. Accordingly, only those three images are selected for calculating the metric for the east direction and for the location 350. On the other hand, if the reference location is selected to be at location 352 in the illustrated example, there are five images that are to the east of the reference location 352. Accordingly, the five images are selected for calculating the metric for the east direction and for the location 352.

The above techniques for determining the metric for indicating the quality of the map 220 are advantageous. This is because the above techniques do not require the processing unit 130 of the image display device 101 to determine any convex hull, which may be computationally complex and may consume a lot of processing resources. Also, in some embodiments, the metric may be used to ensure that the map created for localization is sufficiently good before using the map to localize the user 10. In some cases, having a good quality localizating map may not only improve the accuracy of the localization, but it may also improve localization speed. For example, with a good localizing map, localization may be performed within 100 ms, and more preferably, within 50 ms, or less.

In other embodiments, the metric may be used by the processing unit 130 of the image display device 101 to select the best map (from among a plurality of available maps) for localization of the user 50. For example, in some embodiments, there may be multiple maps created for the same environment (e.g., for a particular cell 300). In such cases, the processing unit 130 may select the map with the highest value of the metric for use to localize the user 50.

In the above embodiments, the map creation process has been described with reference to a camera system that captures images of the environment, and the processing unit is configured to determine the metric based on co-visibility of point(s) of interest that is associated with different camera positions. In some embodiments, the camera system may include only a single camera (e.g., a forward facing camera) to capture images for map construction. In other embodiments, the camera system may include two cameras (e.g., two forward facing cameras) to capture images for map construction. In further embodiments, the camera system of the image display device 101 may include four cameras (e.g., two forward facing cameras, a first side facing camera (e.g., facing left), and a second side facing camera (e.g., facing right)). Accordingly, in some cases, the camera positions with which the co-visibility of point(s) of interest is associated, may comprise a first camera position of a camera of the camera system, and a second camera position of the camera of the camera system. In other cases, the camera positions may comprise a first camera position of a first camera of the camera system, and a second camera position of a second camera position of the camera system.

Also, as discussed, in some embodiments, the camera system may comprise a plurality of cameras for generating a plurality of images for creating the map. In such cases, the plurality of images may comprise a first subset of images generated by the plurality of cameras when the camera system of the image display device 101 is at a first position. The plurality of images may also comprise a second subset of images generated by the plurality of cameras when the camera system of the image display device 101 is at a second position. Thus, each subset of images is generated by the camera system of the image display device 101 when the image display device 101 is at a certain orientation. In some cases, the processing unit 130 is configured to keep track of the images in each of the subset of the images. For example, all images in each subset may be grouped together as a "keyrig" that is associated with a certain orientation of the image display device 101.

Figure 10:
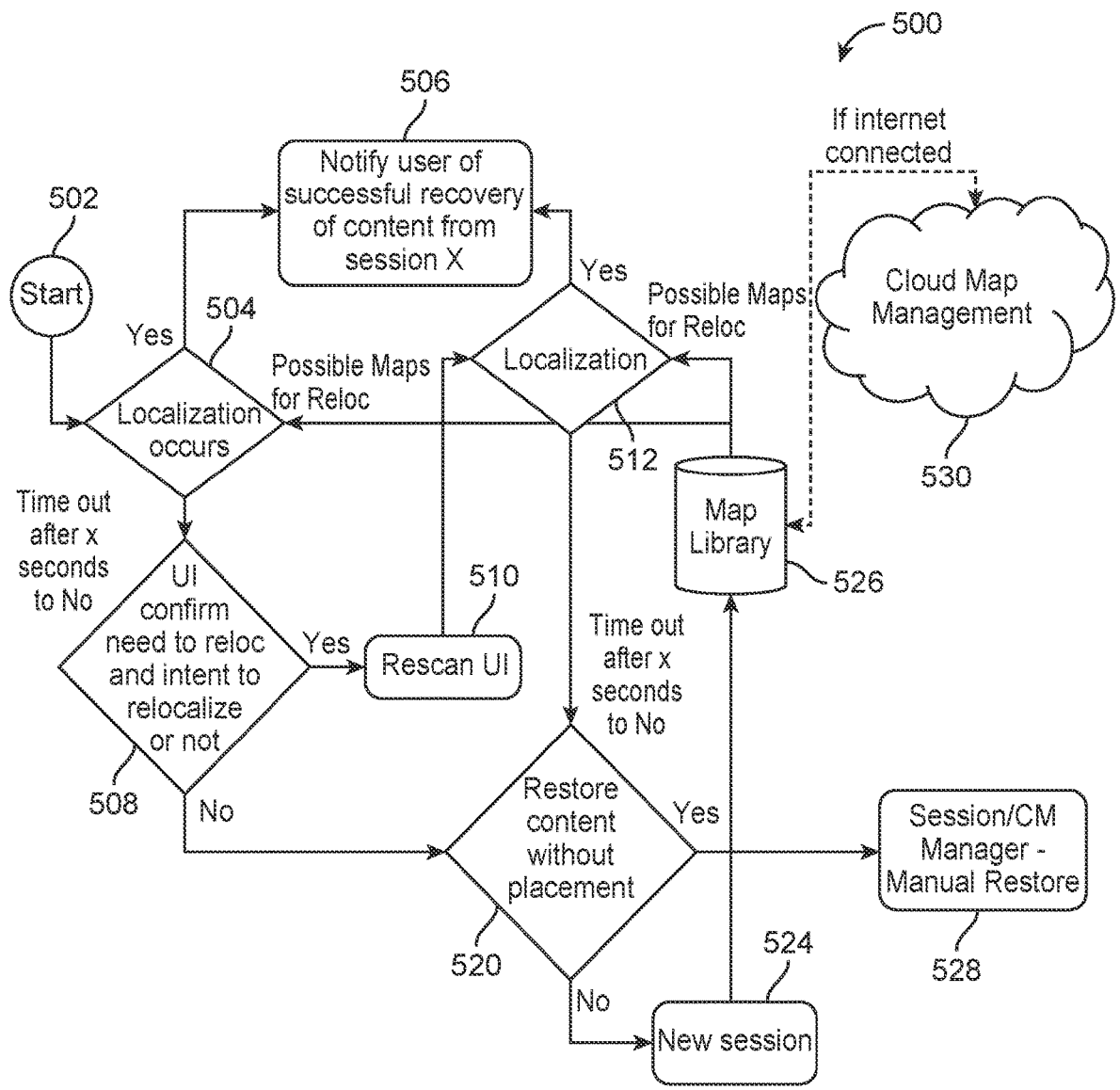
FIG. 10 illustrates a map-and-localization management method.

Also, in some embodiments, the features regarding determining a metric for indicating a quality of a map may be incorporated into a map-and-localization management method. FIG. 10 illustrates an example of a map-and-localization management method 500, for managing creation of localizing map(s) and use of such map(s). In some embodiments, localizing maps may be tracking maps tied to headpose and specific to a single session, and/or may be a canonical map that the tracking map can localize into. In some embodiments, a tracking map may become a canonical map if a quality metric associated with the tracking map is above a threshold. The method 500 begins at item 502. First, the processing unit 130 of the image display device 101 attempts to localize the user 50 of the image display device 101 using an already created map while the user 50 is in an environment that corresponds with the created map (item 504). If the processing unit 130 successfully localizes the user 50 with respect to the environment using the map, the processing unit 130 may generate a signal to notify the user 50 that the localization is successful (item 506). If the processing unit 130 can successfully localize the user 50 with respect to the environment using the map, that means the user 50 can place virtual content with respect to the environment using the map, and/or may recover content that was previously placed with respect to the environment. In some embodiments, content that was in the space from the previous session would be presented in the screen of the image display device 101 for presentation to the user in response to a successful localization. If the localization is for the purpose of allowing the user 50 to recover virtual content from previous session, the processing unit 130 may also inform the user 50 that the recovery of content is successful. For example, the processing unit 130 may generate a signal to operate the screen and/or a speaker to provide the notification to the user 50. In some embodiments, localization may be a coordinate system transform between the tracking map coordinate system and the canonical map 220 coordinate system, such that the tracking and canonical maps are aligned (e.g. the same) with each other after the coordinate system transform is applied.

On the other hand, if the processing unit 130 is unable to localize the user 50 after certain number of attempts, or after a prescribed time duration, the processing unit 130 may then ask the user 50 (through a user interface) whether to perform a map generation to create the map (item 508). In some embodiments, the map may be a tracking map. The tracking map may be used as a canonical map 220 in subsequent sessions. In some embodiments, a session may be a single user turning the device on and off one time, such that two sessions may be two users each turning their respective device on and off once, or one user turning the user's device on and off two times. Localization may fail for a number of reasons. For example, localization may fail if the user 50 is in a new space so that a map has not yet been built before, if there is a lighting change, if there is a change in environment (e.g., a furniture has been moved), if there is a dynamic change (e.g., people moving), if the user 50 is not in same view point as that for the previously built map, if a correct map cannot be identified, if a user's pose cannot be identified, or any combination of the foregoing. In item 508, if the user decides to generate a new map, the processing unit 130 then starts a map creation session to generate the map (item 510). In the map creation session, the user 50 performs different head poses to place camera(s) of the image display device 101 in different viewing direction to view different parts of an environment. The camera(s) captures images of the environment while the image display device 101 is at the different head poses. The processing unit 130 then processes these images to create a map for localization purpose. During the creation of the map, or after the creation of the map, the processing unit 130 may calculate value(s) of the metric to indicate the quality of the map using examples of the techniques described herein. In some embodiments, the processing unit 130 may calculate value(s) of the metric to indicate the quality of the map when it is a tracking map, and/or may be calculated when the map is a canonical map. If a value of the metric is above a certain threshold, the processing unit 130 may then determine that the quality of the map is sufficient for localizing the user 50 (in which cases, the image display device 101 may successfully recover content from previous session). After the map is generated, the map may be stored in one or more non-transitory medium (e.g., in a non-transitory medium of the image display device 101 and/or a map database 530 that is remote from the image display device 101). The value(s) of the metric may also be stored in association with the created map. The processing unit 130 then utilizes the newly created map to localize the user 50 (item 512).

Returning to item 508, if the user 50 decides not to start a map creation session to create a new map, the processing unit 130 may then ask the user 50 (via a user interface) whether to restore the content from the previous session without placing the content (item 520). If the user 50 decides to restore the content without placement of the content, the processing unit 130 may then provide a user interface for allowing the user 50 to manually restore the content (item 528). On the other hand, if the user 50 decides not to restore the previous content from the previous session, the processing unit 130 may then start a new session (item 524). In the new session, the user 50 may operate the image display device 101 to retrieve another map from a non-transitory medium 526, and/or may create a new map. The obtained map may then be used for localization of the user (item 512). In some embodiments, the maps stored in the non-transitory medium 526 have respective metric values associated with them. In such cases, when the processing unit 130 selects one of the maps for localization, the processing unit 130 takes the metric values into consideration. For example, the processing unit 130 may be configured to select a map that has a metric value above a prescribed threshold. In some embodiments, if the image display device 101 is connected to the Internet, the processing unit 130 may retrieve one or more maps from a map database 530 for storage in the non-transitory medium 526.

In some embodiments, besides storing maps for localization in the non-transitory medium 526, the non-transitory medium 526 may also store content attached to the map, identity of content attached to the map, meta data (e.g., when map was created, who created the map, etc.), metric indicating a quality of the map, or any combination of the foregoing.

As illustrated in the above embodiments, the metric for indicating the quality of the map is determined before allowing the image display device 101 to use the map to localize the user 50 with respect to the environment. This is advantageous because it ensures that localization of the user 50 will be successful. If the processing unit 130 can successfully localize the user 50 with respect to the environment using the map, then the user 50 can place virtual content with respect to the environment using the map, and/or restore content from the previous session (e.g., virtual content placed in the environment) using the map.

Figure 11:
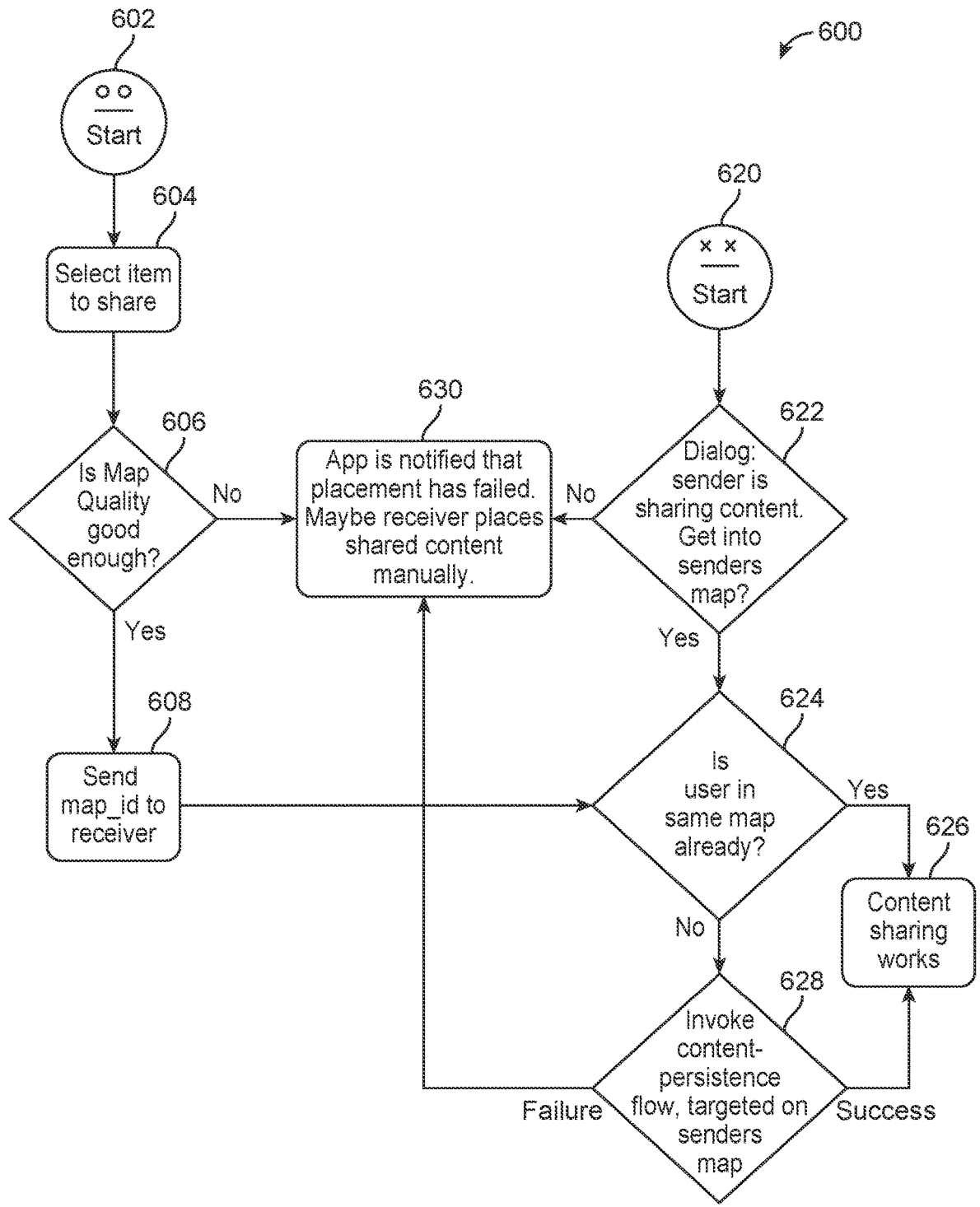
FIG. 11 illustrates a method of sharing content between users of image display devices.

Also, in some embodiments, the features regarding determining a metric for indicating a quality of a map may be incorporated into a content sharing scenario. FIG. 11 illustrates a method 600 of sharing content between users of image display devices 101. The method performed by the sending device begins at item 602. First the user (sender) of the sending device (e.g., first image display device 101) selects an item for sharing with another user (item 604). By means of non-limiting examples, the item may be one or more objects, one or more applications, or any content the user likes to share with another user with respect to a map. As a more specific example, the user of the first image display device 101 may be in a room with a table, and may select a content (e.g., a picture of an apple) for placement on the table for virtually sharing with another user. In such cases, the processing unit 130 of the first image display device 101 first determines a map of the environment (e.g.

a tracking map) using the technique described herein, or any known technique for creating a map using camera images. The map allows the user to place the content with respect to the actual environment. The map may be stored in a non-transitory medium (e.g., in the first image display device 101 and/or a map database). The processing unit 130 also calculates a metric for the map to determine whether the map has a sufficiently good quality (item 606). The determination of the metric may be performed using examples of the techniques described herein. If a value of the metric is above a certain threshold, the processing unit 130 may then determine that the quality of the map is sufficient for allowing the user to share content. In such cases, the processing unit 130 of the first image display device 101 may send information regarding the map to a recipient with a second image display device 101 (item 608). By means of non-limiting examples, the information regarding the map may be an identification of the map, a storage location of the map, an invitation to use the map, data regarding the map, data of the map itself, etc., or any combination of the foregoing.

On the other hand, if the value of the metric is below a certain threshold, the processing unit 130 may then determine that the quality of the map is not sufficient. In such cases, the processing unit 130 may generate a notification signal to inform the user that the content cannot be placed using the map (item 630). In such cases, the user of the first image display device 101 may start a map generation session to attempt to create a better map so that the content can be shared using the better map. Alternatively, the user may operate the first image display device 101 to share the content with a recipient without using any map. In such cases, the recipient of the content may manually place the content. For example, after the recipient with a second image display device 101 has received the content, the recipient may manually place the content with respect to the environment in which the recipient is in. Following the above example, if the recipient is in the same room as the sender, the recipient of the content (e.g., an image of an apple) may place such content on the table in the room.

The method performed by the receiving device begins at item 620. First the user (recipient) of the receiving device (e.g., second image display device 101) receives a notification that another user wants to share a content (item 622). The second image display device 101 may allow the user to decide whether to use the sender's map to retrieve the shared content. If the recipient decides to use the sender's map, the second image display device 101 may retrieve the map from a non-transitory medium (e.g., a map database) based on the information transmitted by the first image display device 101 in item 608. Alternatively, the second image display device 101 may obtain the map transmitted by the first image display device 101. The second image display device 101 then checks to see if the recipient is in the same map as that of the sender (item 624). If the recipient is using the same map being used, or was used, by the sender, then the second image display device 101 determines that content sharing is working (item 626). Since the recipient is using the same map associated with the sender, the recipient can obtain the shared content with the content being in the same location as that selected by the sender when the sender virtually placed the content. If the recipient is not using the same map as that for the sender, then the second image display device 101 may determine that content sharing fails, and may proceed to perform other action(s) (such as any of those described with reference to FIG. 10) to attempt to obtain a map for content sharing (item 628). If the other action(s) fails, then content sharing is unsuccessful, and the recipient may need to manually place the content, as similarly discussed with reference to item 630.

In some embodiments, a first user may share an item with a second user. In some embodiments, the sharing may only occur if the first user and second user have localized into the same space (e.g. a shared coordinate system). In some embodiments, localization may occur when both the first user's tracking map localizes into a canonical map and the second user's tracking map localizes into the same canonical map, resulting in both systems accessing virtual content relative to the same coordinate system (e.g. the canonical map coordinate system). In some embodiments, localization may occur when the first user's tracking map localizes into a first canonical map and the second user's tracking map localizes into a second canonical map, where both canonical maps share the same coordinate system, resulting in both systems accessing virtual content relative to the same coordinate system. Any other method of localization may be used as long as the first user and second user are able to access a shared coordinate system through one or more maps. In some embodiments, the maps (e.g. tracking maps, canonical maps) may only be used for localization if a minimum quality metric threshold is met or exceeded. The maps may be stored on the local user device, or in a shared cloud, for example.

It should be noted that the sharing of the content may be performed in real time (e.g., while both the sender and the recipient are in the same environment). Alternatively, the sharing of the content may be performed not in real time. For example, the sender of the first image display device 101 may virtually place a content in a room for sharing with a recipient. The recipient may not be in the room at the time when the sender is placing the content. In such cases, the first image display device 101 may send a message to the second image display device 101 to inform the recipient that the sender has shared a content in the room. The recipient with the second image display device 101 may then go to the room at a later time, and may retrieve the shared content.

As shown in the above example, the metric for measuring the quality of the map is advantageous in content sharing because it ensures that the map for content sharing is of sufficient quality before allowing the image display devices 101 to share content using the map.

Map Sanitization

As discussed, the map for localization of the user 50 may be created using images captured by the camera system of the image display device 101. In some embodiments, during the map creation process, the processing unit 130 of the image display device 101 may be configured to perform map sanitization to remove undesirable data, and/or to mitigate an effect of undesirable data, that may negatively contribute to the map being created. By means of non-limiting examples, undesirable data may include incorrect observations of reference points, poorly constrained image(s), undesirable map point(s), or any combination of the foregoing.

Poorly-constrained image(s), if used to form a localizing map, will cause error in the map, which in turn, will cause localization error. An image may be poorly-constrained due to the image not having enough observations of reference points, and/or due to the image having noise that may be mischaracterized as reference point(s). Once a poorly-constrained image gets into the map, subsequent images may only observe stereo points generated from this image instead of the rest of the "good" map, which may lead to drift.

Figure 12:
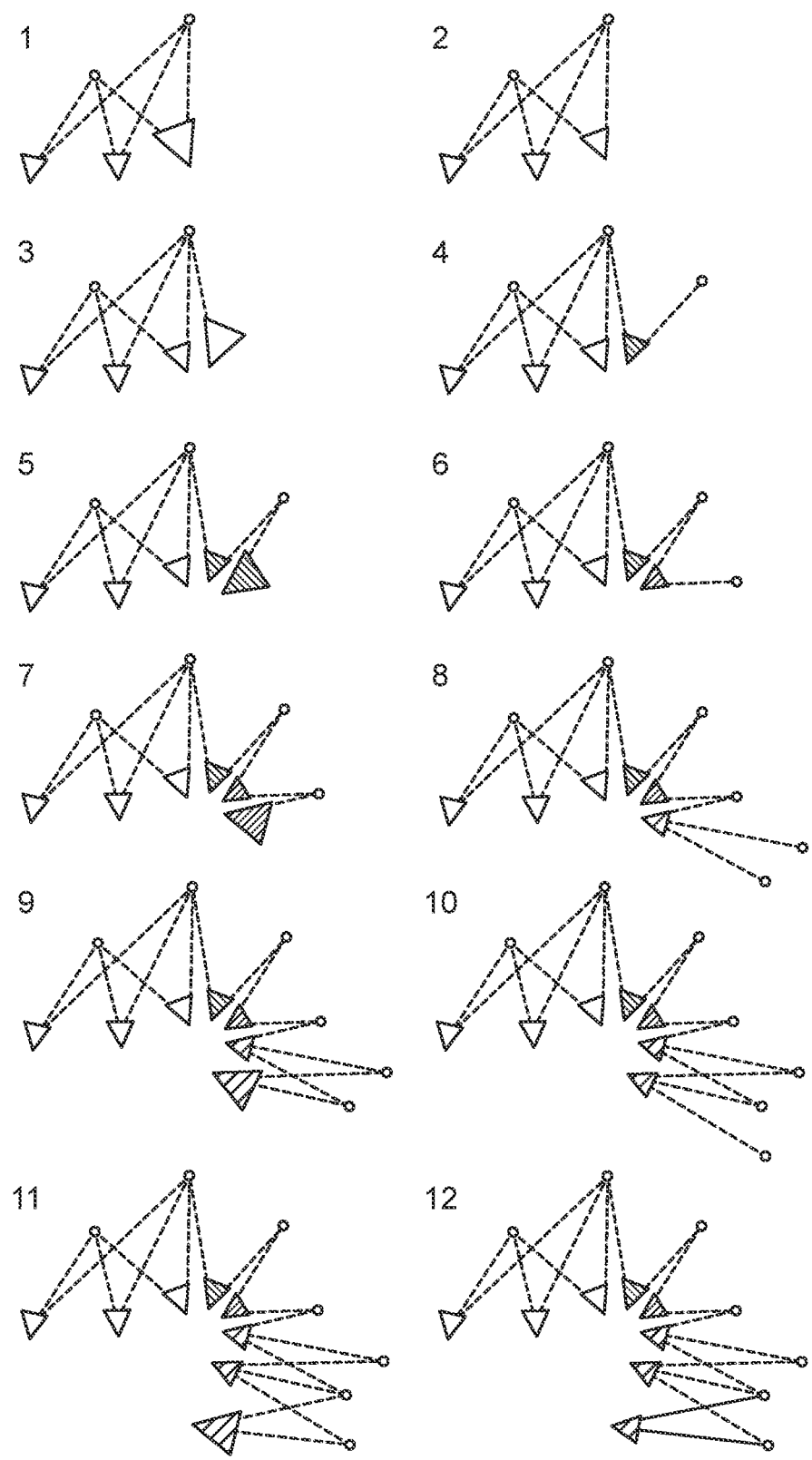
FIG. 12 illustrates a technique for determining a map for allowing an image display device to localize a user of the image display device, and/or to perform other function(s).

FIG. 12 illustrates an example of a sequence of images obtained by the camera system of the image display device 101. The sequence of the images is obtained by the camera system during a map creation process to create a localizing map. In the example, some of the images are well-constrained in that they form a well-connected part of the map. In some embodiments, an image may be considered as "well-constrained" if it has a certain number of reference points that are also present in adjacent image(s), wherein the number may be any user-defined threshold, such as two, three, four, ten, twenty, one hundred, etc. The well-constrained part of the map is followed by poorly constrained image(s) (which may be due to rapid head rotation). In the example, the small triangles represent images obtained for forming the map, and the large triangles represent the current image being considered. Each dot represents a reference point or point of interest. The left column shows a sequence of images forming a track map, while the right column shows the map after the current image (track image) from the left column has been assigned to a map segment. Different map segments are shown with different respective colors/greyscales. As used in this specification, a "segment" of a map may refer to a portion of a map. In some cases, a portion of a map may be formed by two or more images that are logically associated with each other.

In the example of FIG. 12, the first row shows three images obtained in a sequence that are well-constrained. The three images are well-constrained in the sense that each image captures multiple map points (reference points) that are also captured by one or more other images. Accordingly, the three images are well-connected to each other based on the commonly observed map points. It should be noted that a map point may be any feature of interest captured in an image that can be used for tracking purpose. For example, a map point may be a feature associated with a corner of an object that can be used to identify the same object in different images. Because the first three images are well-constrained, they are all assigned to the first segment of the map so that they form the first segment of the map. In the illustrated embodiments, the processing unit 130 may be configured to determine a quality score for each image, wherein the quality score represents, indicates, or is based on, a number of map points captured in the image.

The second row in the illustrated figure shows a fourth image being acquired. In the illustrated example, the fourth image only sees a few map points, and is poorly constrained with respect to the first segment. The poorly constrained fourth image may have a corresponding quality score that is low due to the poorly constrained nature of the fourth image. Accordingly, the fourth image is assigned to a new segment (a second segment) due to the poor quality score arising from the few map point observations. In the illustrated example, the fourth image is poorly constrained due to rapid rotation of the user's head, which results in blurring of the fourth image. Because the fourth image is blurred, only a few map points can be detected. In other embodiments, the blur in the image may be due to other factors that are different from head rotation.

The third row shows a fifth image being acquired. Again, the fifth image only sees a few map points, and is poorly constrained with respect to the second segment. The poorly constrained fifth image may have a corresponding quality score that is low due to the poorly constrained nature of the fifth image. Accordingly, the fifth image is assigned to a new segment (a third segment). In the example, the fifth image is poorly constrained also due to the continued rapid rotation of the user's head. In other embodiments, the blur in the image may be due to other factors.

The fourth row shows a sixth image being acquired. The sixth image is also poorly constrained with respect to the third segment, and therefore it is assigned to a new segment (a fourth segment). However, the rotation contributing to the motion blur has stopped, and so the fifth image contains more map points that can be observed by the processing unit 130.

The fifth row shows a seventh image being acquired. The seventh image is well-constrained with respect to the current segment, and so the seventh image is assigned to the same segment (the fourth segment) as the sixth image.

Finally, the sixth row shows an eighth image being acquired. The eighth image is also well-constrained with respect to the current segment (the fourth segment), and therefore the eighth image is assigned to the fourth segment. Accordingly, the last three images form parts of the fourth segment of the map.

In the above embodiments, each of the images and map points has a segment label attached to them, which is assigned after the map points are identified and after the quality score for the respective image has been determined. A well-constrained image is assigned the latest segment number (as will all map points created from that image) by the processing unit 130, while a poorly constrained image and its map points will be assigned the next segment number by the processing unit 130.

As discussed, how well an image is constrained is accomplished through a quality score, which is computed by the processing unit 130 based on identified map points associated with the image. In some cases, the quality score may indicate how well the image is constrained by the map points. In one implementation, the quality score may be calculated by the processing unit 130 as $J^T \Sigma^{(-1)} J$, where $J$ is the Jacobian of map points measurements with respect to a pose, and $\Sigma^{(-1)}$ is the information matrix of the measurements (assuming block diagonal due to independence of the measurements). In other embodiments, the quality score may be determined based on other factors, and/or may be calculated using other algorithms.

In some embodiments, the different map segments may be combined by the processing unit 130 to form a map. In some cases, a "bad" segment (like the second and third segments in the above example) may be deleted, and not used to form the map. In one implementation, a bad segment may be identified based on a number of image(s) assigned to the segment. If the number of image(s) assigned to the segment is below a certain value (e.g., one, two, three, etc.), then the segment may be considered "bad", and may be excluded from being used to form the map. In one implementation, joining of map segments may be performed using a loop closure algorithm. In the loop closure algorithm, loop closure is performed based on images that are in sufficiently large map segments. Following the above example, the loop closure is performed based on images in the first and fourth segments, while excluding the second and third segments due to the poorly constrained images in these segments. Accordingly, poorly constrained entities that were created between two well-connected map segments joined by loop closure may be deleted and removed so that they do not contribute to the final map.

In some embodiments, the processing unit 130 may be configured to keep track of the map segments that are well-constrained, and treat them as if they were separate maps. Accordingly, a map segment itself may be considered as an example of a map. For example, the processing unit 130 may be configured to perform local bundle adjustment on one or more map segments, perform global bundle adjustment on one or more map segments, compute metrics for one or more map segments, perform tracking against points in a map segment, or any combination of the foregoing.

In some embodiments, the created map may be further adjusted by the processing unit 130 during normal use of the image display device 101. For example, in some embodiments, after the map has been created, the processing unit 130 may use such map to perform localization and/or other functions. However, during such use of the image display device 101, the camera system continues to obtain images of the environment. Accordingly, in some embodiments, the processing unit 130 may continue to periodically update the created map based on the newly acquired images to attempt to improve the map. In one implementation, the processing unit 130 may determine metric based on the newly acquired image, and may determine whether to update the map based on the new image. For example, the processing unit 130 may determine what the metric would be for the map if the new image is used to update the map. If the metric is higher than that of the existing map, then the processing unit 130 may determine that updating of the map based on the new image is desirable. On the other hand, if the metric is lower than that of the existing map, then the processing unit 130 may determine that updating of the map based on the new image is not desirable, and will continue to use the existing map without updating it using the new image.

In the above embodiments, the map is described as being created for use to perform localization. In other embodiments, the created map may be utilized by the processing unit 130 to perform other functions. For example, in other embodiments, the created map may be used by the processing unit 130 as a reference frame to place virtual content.

In some embodiments, multiple images from the camera system of the image display device 101 captured during tracking mode to track a position of the user 50 may be used to form a tracking map. When performing localization, the processing unit 130 finds a six degree of freedom transformation between the tracking map and the canonical map to localize the user 50. Once the user 50 can be successfully localize with respect to his/her environment using the map, the processing unit 130 may then allow the user to place virtual content with respect to the environment using the map, retrieve the virtual content from previous session, share the virtual content with other user(s), etc.

Figure 13:
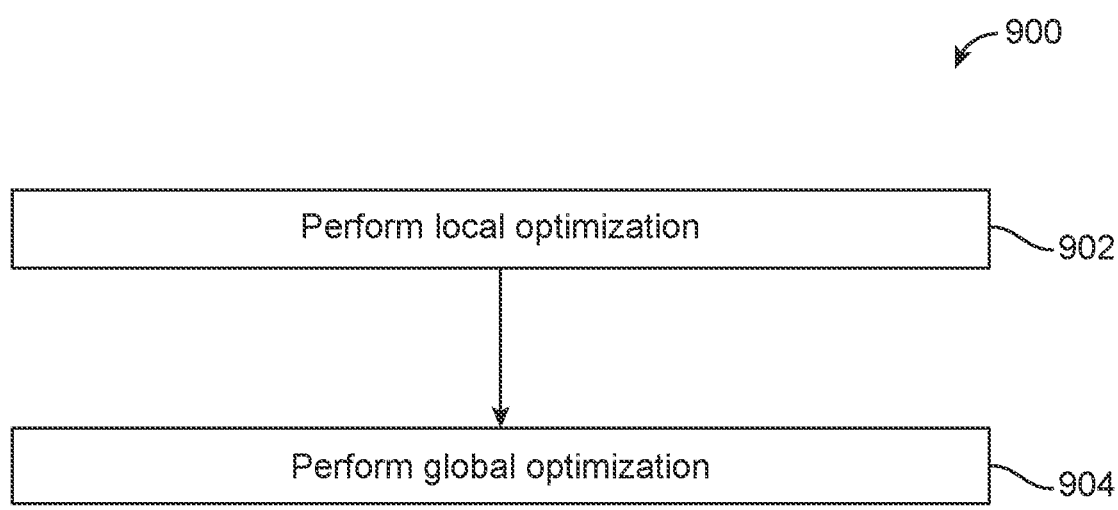
FIG. 13 illustrates a method for determining a map for allowing an image display device to localize a user of the image display device, and/or to perform other function(s).

FIG. 13 illustrates a method 900 for determining a map for allowing an image display device to localize a user of the image display device. The method 900 includes performing local optimization (item 902), and performing global optimization (item 904), to determine a map. The determined map may then be later used by the image display device to localize a user of the image display device. In some embodiments, both the local and global optimizations may be performed by the processing unit 130 of the image display device 101. In other embodiments, one or both of the local and global optimizations may be performed by an external device, such as a server in a cloud network.

In some embodiments, the act of performing the local optimization in item 902 includes removing undesirable data so that they do not contribute to the map being created. By means of non-limiting examples, undesirable data may be an image that is not well-constrained with respect to a map segment, or any data associated with such image. It is desirable to use good data for the global optimization. So during the local optimization, the processing unit 130 gets rid of the undesirable data.

In some embodiments, the act of performing global optimization in item 904 comprises performing bundle adjustment, in which one or more rays from images are adjusted so they have consensus. Also, in some embodiments, the global optimization may be performed based on images obtained by the camera system of the image display device 101, orientation of image planes associated with the images, and 3D reference points. In further embodiments, the global optimization may be performed also based on relative orientation of cameras with respect to each other.

Optionally, in the method 900, performing the local optimization includes performing a sanitization by the processing unit 130 to remove or to disregard data that would otherwise provide an undesirable contribution for the map if the data is used to determine the map.

Optionally, in the method 900, the data comprises an image from the camera system of the image display device 101. In such cases, during the local optimization, the processing unit performs the sanitization by removing or disregarding the image.

Optionally, the method 900 is performed by the image display device 101 that includes a plurality of cameras. In such cases, the data comprises a set of images generated by the respective cameras, and the processing unit 130 performs the sanitization by removing or disregarding the set of images.

Optionally, in the method 900, the data comprises an identification of a reference point in an image from the camera system, and the processing unit 130 performs the sanitization by disregarding the identification of the reference point.

Optionally, in the method 900, the data represents a ray or a line that is associated with an image from the camera system and a reference point, and the processing unit 130 performs the sanitization by disregarding the ray or the line that is associated with the image.

Optionally, in the method 900, the processing unit 130 performs a bundle adjustment during the global optimization to adjust one or more rays associated with one or more images from the camera system, wherein the processing unit 130 performs the bundle adjustment after performing the sanitization to remove the data.

Optionally, in the method 900, the processing unit 130 performs the global optimization based on images from the camera system and three-dimensional reference points.

Optionally, in the method 900, the processing unit 130 performs the global optimization based on a relative orientation between cameras of the camera system.

Optionally, in the method 900, the processing unit 130 determines a score for an image obtained from the camera system during the local optimization. In some embodiments, the score may be a constraint score. Also, in some embodiments, the score indicates how well the image is constrained. In some embodiments, the score may be determined by the processing unit 130 based on a Jacobian of reference points measurements. Also, in some embodiments, the score may be determined by the processing unit 130 based on an information matrix that is a diagonal matrix. In addition, in some embodiments, the score may be determined by the processing unit 130 based on a number of reference points detected in the image.

Optionally, in the method 900, the processing unit 130 may perform data sanitization based on the score.

Optionally, in the method 900, the processing unit 130 may remove a constraint of the image, or to remove the image, when performing the data sanitization.

Optionally, in the method 900, the processing unit may remove the constraint of the image, or to remove the image, when the score is below a threshold.

Optionally, in the method 900, the processing unit 130 may determine the map by: determining multiple map segments; and connecting the map segments.

Optionally, in the method 900, the processing unit 130 may determine a first map segment of the map segments by obtaining images from the camera system, and linking the images, wherein the images are generated in sequence by the camera system.

Optionally, in the method 900, the processing unit 130 determines respective scores of the images.

Optionally, in the method 900, the processing unit 130 obtains an additional image from the camera system, determines a score for the additional image, and starts a second map segment of the map segments in response to the score of the additional image from the camera system meeting a criterion.

Optionally, in the method 900, the processing unit 130 may start the second map segment when the score indicates that the image has a degree of constraint with respect to the first map segment that is below a threshold.

Figure 14:
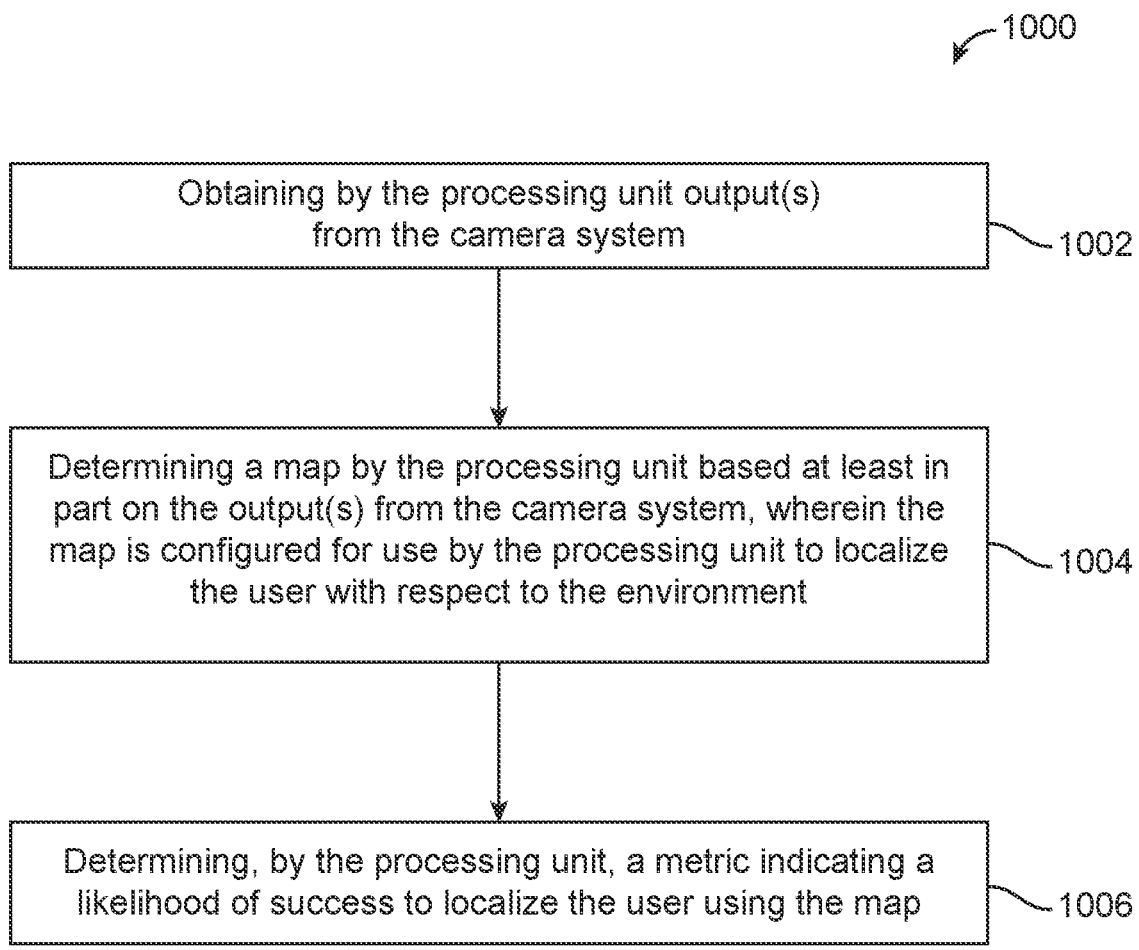
FIG. 14 illustrates a method performed by an image display device in accordance with some embodiments.

Method Performed by the Processing Unit and/or Application in the Processing Unit FIG. 14 illustrates a method 1000 in accordance with some embodiments. The method 1000 may be performed by an apparatus that is configured to be worn on a head of a user, the apparatus having a screen configured to present graphics to the user, a camera system configured to view an environment in which the user is located, and a processing unit. In some embodiments, the method 1000 may be performed by any of the image display devices 101 shown in FIGS. 1-4. For example, the method 1000 may be performed by the processing unit 130 of the image display device 101. The method 1000 includes: obtaining, by the processing unit, output(s) from the camera system (item 1002); determining a map by the processing unit based at least in part on the output(s) from the camera system, wherein the map is configured for use by the processing unit to localize the user with respect to the environment (item 1004); and determining, by the processing unit, a metric indicating a likelihood of success to localize the user using the map (item 1006).

In some embodiments, in the method 1000, the processing unit may determine the metric by performing computation to obtain the metric. In other embodiments, the processing unit may determine the metric by receiving the metric from another component or device to obtain the metric. By means of non-limiting examples, the other component or device providing the metric may be a module in the image display device 101, or an external device that is in communication with the image display device, wherein the external device may be worn by the user or may be physically decoupled from the user. For example, the external device may be a wireless transmitter, a computer, a handheld or body-worn device, a database, a server, a base station, etc.

Optionally, in the method 1000, the act of determining the metric comprises computing the metric by the processing unit.

Optionally, in the method 1000, the act of determining the metric comprises receiving the metric by the processing unit.

Optionally, in the method 1000, the metric is determined based on a co-visibility of a point of interest that is associated with different camera positions.

Optionally, in the method 1000, the camera positions comprise a first camera position of a camera of the camera system, and a second camera position of the camera of the camera system.

Optionally, in the method 1000, the camera positions comprise a first camera position of a first camera of the camera system, and a second camera position of a second camera position of the camera system.

Optionally, in the method 1000, the metric indicates a number of reference points that are useable to localize the user with respect to the environment.

Optionally, in the method 1000, the metric indicates the likelihood of success to localize the user in one or more viewing directions.

Optionally, in the method 1000, the metric is determined based on a number of times a point of interest is detected from different camera positions.

Optionally, in the method 1000, the metric is determined by the processing unit without determining any convex hull.

Optionally, in the method 1000, the metric has a value that is based on directionality.

Optionally, in the method 1000, the directionality is with respect to one or more vertical axes, and/or one or more horizontal axes.

Optionally, in the method 1000, the directionality comprises a turn direction.

Optionally, in the method 1000, the directionality comprises a tilt angle.

Optionally, in the method 1000, the directionality comprises a roll angle.

Optionally, in the method 1000, the metric has a first value associated with a first directionality, and a second value associated with a second directionality.

Optionally, in the method 1000, the metric is for one of a plurality of cells, each of the cells representing a three dimensional space of a portion of the environment, and wherein the metric has a value that is based on a position within the one of the plurality of cells.

Optionally, in the method 1000, the metric is for one of a plurality of cells, each of the cells representing a three dimensional space of a portion of the environment, wherein the metric has a first value associated with a first position within the one of the plurality of cells, and a second value associated with a second position within the one of the plurality of cells.

Optionally, in the method 1000, the metric is for one of a plurality of cells, and each of the cells represents a three dimensional space of a portion of the environment.

Optionally, in the method 1000, the act of determining the metric comprises determining a total number of images from the camera system that are associated with the one of the plurality of cells.

Optionally, in the method 1000, the total number of images is associated with a certain viewing direction for the cell.

Optionally, in the method 1000, the total number of images is associated with multiple viewing directions for the cell.

Optionally, in the method 1000, the camera system is configured to obtain multiple images, and wherein the metric is determined for one of the plurality of cells by: identifying a subset of the images that belong to a same range of viewing directions; determining respective scores for the images in the subset of the images; and summing the scores to obtain a total score.

Optionally, in the method 1000, the metric is determined by dividing the total score by a number of the images in the subset of the images to obtain an average score.

Optionally, in the method 1000, the average score is the metric.

Optionally, in the method 1000, the average score represents an average expected number of co-visibility points for the range of viewing directions for the one of the plurality of cells.

Optionally, in the method 1000, the respective scores are determined by accessing a co-visibility graph that associates reference points with the multiple images.

Optionally, in the method 1000, the co-visibility graph indicates which of the reference points is visible in which of the multiple images.

Optionally, in the method 1000, each of the respective scores is determined by determining a number of reference point(s) that is detected in the corresponding one of the images in the subset of images.

Optionally, the method 1000 further includes determining an area score indicating a degree of coverage by the map.

Optionally, in the method 1000, the area score is determined based on a spatial distribution of data points of the map.

Optionally, in the method 1000, at least one of the cells has a footprint area that is 2 m by 2 m.

Optionally, in the method 1000, the at least one of the cells also has a pre-determined height.

Optionally, in the method 1000, the metric is determined by: obtaining a plurality of images from the camera system; and determining co-visibility values, wherein each of the co-visibility values indicating a number of reference points detected in a corresponding one of the plurality of images.

Optionally, in the method 1000, the camera system comprises a plurality of cameras.

Optionally, in the method 1000, the plurality of images comprises a first subset of images generated by the plurality of cameras when the camera system is at a first position.

Optionally, in the method 1000, the plurality of images comprises a second subset of images generated by the plurality of cameras when the camera system is at a second position.

Optionally, in the method 1000, the plurality of cameras comprises a first forward facing camera.

Optionally, in the method 1000, the plurality of cameras comprises a second forward facing camera.

Optionally, in the method 1000, the plurality of cameras comprises a first side facing camera.

Optionally, in the method 1000, the plurality of cameras comprises a second side facing camera.

Optionally, the method 1000 further includes determining by the processing unit a desired viewing direction of the camera system for improving a value of the metric.

Optionally, the method 1000 further includes generating the graphics based on the determined desired viewing direction, the graphics configured to instruct the user to change a current viewing direction of the camera system to the desired viewing direction.

Optionally, the method 1000 further includes obtaining an image of the environment from the camera system after the desired viewing direction of the camera system has been achieved.

Optionally, the method 1000 further includes updating the map based on the image.

Optionally, the method 1000 further includes updating the metric based on the updated map.

Optionally, in the method 1000, the metric is determined before the map is used to localize the user with respect to the environment.

Optionally, in the method 1000, the metric is determined before the apparatus shares content with another apparatus.

Optionally, in the method 1000, the metric is determined during a map construction session in which the processing unit determines the map.

Optionally, in the method 1000, the metric is determined retroactively by accessing the map that was previously determined from a non-transitory medium.

Optionally, the method 1000 further includes performing a sanitization to remove or to disregard data that would otherwise provide an undesirable contribution for the map if the data is used to determine the map.

Optionally, in the method 1000, the data comprises an image from the camera system, and wherein the sanitization is performed by removing or disregarding the image.

Optionally, in the method 1000, camera system comprises a plurality of cameras, wherein the data comprises a set of images generated by the respective cameras, and wherein the sanitization is performed by removing or disregarding the set of images.

Optionally, in the method 1000, the data comprises an identification of a reference point in an image from the camera system, and wherein the sanitization is performed by disregarding the identification of the reference point.

Optionally, in the method 1000, the data represents a ray or a line that is associated with an image from the camera system and a reference point, and wherein the sanitization is performed by disregarding the ray or the line that is associated with the image.

Optionally, in the method 1000, the sanitization is performed as a part of a local optimization.

Optionally, the method 1000 further includes performing a bundle adjustment to adjust one or more rays associated with one or more images from the camera system, wherein the bundle adjustment is performed after the sanitization is performed to remove the data.

Optionally, in the method 1000, the bundle adjustment is performed as a part of a global optimization.

Optionally, in the method 1000, the global optimization is performed based on images from the camera system and three-dimensional reference points, Optionally, in the method 1000, the global optimization is performed also based on a relative orientation between cameras of the camera system.

Optionally, the method 1000 further includes determining, by the processing unit, a score for an image obtained from the camera system.

Optionally, in the method 1000, the score is a constraint score.

Optionally, in the method 1000, the score indicates how well the image is constrained.

Optionally, in the method 1000, the score is determined based on a Jacobian of reference points measurements.

Optionally, in the method 1000, the score is determined based on an information matrix that is a diagonal matrix.

Optionally, in the method 1000, the score is determined based on a number of reference points detected in the image.

Optionally, the method 1000 further includes performing data sanitization based on the score.

Optionally, in the method 1000, the act of performing the data sanitization comprises removing a constraint of the image, or removing the image.

Optionally, in the method 1000, the constraint of the image, or the image, is removed when the score is below a threshold.

Optionally, in the method 1000, the map is determined by: determining multiple map segments; and connecting the map segments.

Optionally, in the method 1000, the act of determining the multiple map segments comprises determining a first map segment of the map segments by obtaining images from the camera system, and linking the images, wherein the images are generated in sequence by the camera system.

Optionally, the method 1000 further includes determining respective scores of the images.

Optionally, the method 1000 further includes: obtaining an additional image from the camera system, determining a score for the additional image, and starting a second map segment of the map segments in response to the score of the additional image from the camera system meeting a criterion.

Optionally, in the method 1000, the second map segment is started when the score indicates that the image has a degree of constraint with respect to the first map segment that is below a threshold.

Optionally, in the method 1000, the output(s) comprises one or more images from the camera system.

Figure 15:
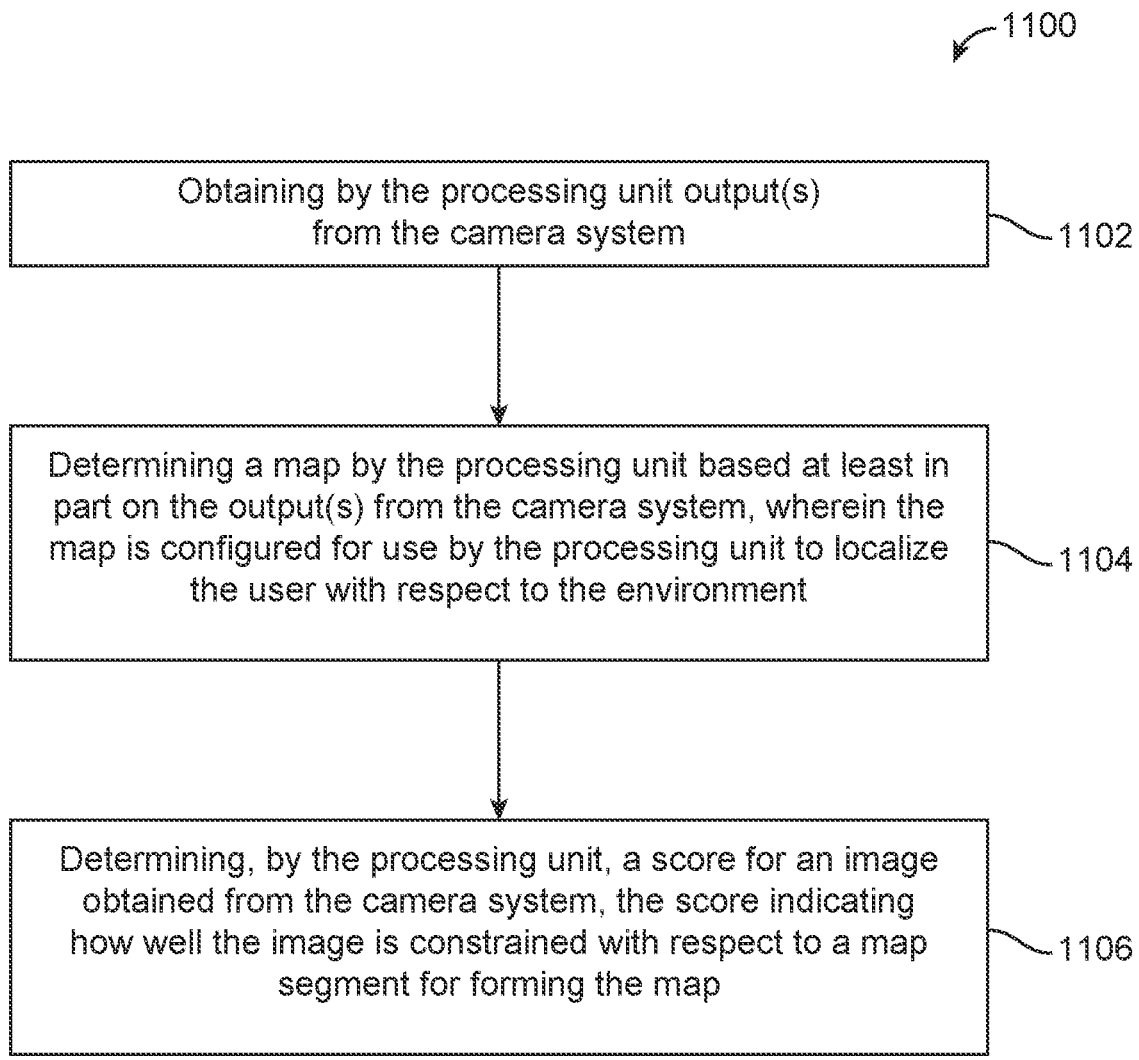
FIG. 15 illustrates another method performed by an image display device in accordance with some embodiments.

FIG. 15 illustrates a method 1100 in accordance with some embodiments. The method 1100 may be performed by an apparatus that is configured to be worn on a head of a user, the apparatus having a screen configured to present graphics to the user, a camera system configured to view an environment in which the user is located, and a processing unit. In some embodiments, the method 1100 may be performed by any of the image display devices 101 shown in FIGS. 1-4. For example, the method 1100 may be performed by the processing unit 130 of the image display device 101. The method 1100 includes: obtaining, by the processing unit, output(s) from the camera system (item 1102); determining a map by the processing unit based at least in part on the output(s) from the camera system, wherein the map is configured for use by the processing unit to localize the user with respect to the environment (item 1104); and determining, by the processing unit, a score for an image obtained from the camera system, the score indicating how well the image is constrained with respect to a map segment for forming the map (item 1106).

In some embodiments, in the method 1100, the processing unit may determine the score by performing computation to obtain the score. In other embodiments, the processing unit may determine the score by receiving the score from another component or device to obtain the score. By means of non-limiting examples, the other component or device providing the metric may be a module in the image display device 101, or an external device that is in communication with the image display device, wherein the external device may be worn by the user or may be physically decoupled from the user. For example, the external device may be a wireless transmitter, a computer, a handheld or body-worn device, a database, a server, a base station, etc.

Optionally, in the method 1100, the act of determining the score comprises computing the score by the processing unit.

Optionally, in the method 1100, the act of determining the score comprises receiving the score by the processing unit.

Optionally, in the method 1100, the score is determined based on a Jacobian of reference points measurements.

Optionally, in the method 1100, the score is determined based on an information matrix that is a diagonal matrix.

Optionally, in the method 1100, the score is determined based on a number of reference points detected in the image.

Optionally, the method 1100 further includes performing, by the processing unit, data sanitization based on the score.

Optionally, in the method 1100, the act of performing the data sanitization comprises removing a constraint of the image, or removing the image.

Optionally, in the method 1100, the act of performing the data sanitization comprises removing the constraint of the image, or removing the image, when the score is below a threshold.

Optionally, in the method 1100, the sanitization is performed to remove or to disregard data that would otherwise provide an undesirable contribution for the map if the data is used to determine the map.

Optionally, in the method 1100, the data comprises the image from the camera system, and wherein the sanitization is performed to remove or disregard the image.

Optionally, in the method 1100, the camera system comprises a plurality of cameras, wherein the data comprises a set of images generated by the respective cameras, and wherein the sanitization is performed to remove or disregard the set of images.

Optionally, in the method 1100, the data comprises an identification of a reference point in the image from the camera system, and wherein the sanitization is performed to disregard the identification of the reference point.

Optionally, in the method 1100, the data represents a ray or a line that is associated with the image from the camera system and a reference point, and wherein the sanitization is performed to disregard the ray or the line that is associated with the image.

Optionally, in the method 1100, the sanitization is performed as a part of a local optimization.

Optionally, the method 1100 further includes performing a bundle adjustment to adjust one or more rays associated with one or more images from the camera system, wherein the bundle adjustment is performed after the sanitization is performed, wherein the image for which the score is determined is one of the one or more images, or is different from the one or more images.

Optionally, in the method 1100, the bundle adjustment is performed as a part of a global optimization.

Optionally, the method 1100 further includes performing, by the processing unit, a the global optimization based on the one or more images from the camera system and three-dimensional reference points, Optionally, in the method 1100, the global optimization is performed also based on a relative orientation between cameras of the camera system.

Optionally, in the method 1100, the map is determined by: determining multiple map segments, wherein the multiple map segment comprise the map segment; and connecting the map segments; wherein the portion of the map comprises one of the map segments.

Optionally, in the method 1100, the camera system is configured to provide additional images, the additional images generated by the camera system before the image for which the score is determined is generated, wherein the act of determining the map comprises determining a first map segment of the map segments by linking the additional images, and wherein the additional images are generated in sequence by the camera system.

Optionally, the method 1100 further includes determining respective scores of the additional images.

Optionally, the method 1100 further includes starting, by the processing unit, a second map segment of the map segments in response to the score of the image from the camera system meeting a criterion.

Optionally, in the method 1100, the second map segment is started when the score indicates that the image has a degree of constraint with respect to the first map segment that is below a threshold.

Optionally, the method 1100 further includes determining a metric indicating a likelihood of success to localize the user using the map.

Optionally, in the method 1100, the metric is determined based on a co-visibility of a point of interest that is associated with different camera positions.

Optionally, in the method 1100, the camera positions comprise a first camera position of a camera of the camera system, and a second camera position of the camera of the camera system.

Optionally, in the method 1100, the camera positions comprise a first camera position of a first camera of the camera system, and a second camera position of a second camera position of the camera system.

Optionally, in the method 1100, the metric indicates a number of reference points that are useable to localize the user with respect to the environment.

Optionally, in the method 1100, the metric indicates the likelihood of success to localize the user in one or more viewing directions.

Optionally, in the method 1100, the metric is determined based on a number of times a point of interest is detected from different camera positions.

Optionally, in the method 1100, the metric is determined by the processing unit without determining any convex hull.

Optionally, in the method 1100, the metric has a value that is based on directionality.

Optionally, in the method 1100, the directionality is with respect to one or more vertical axes, and/or one or more horizontal axes.

Optionally, in the method 1100, the directionality comprises a turn direction.

Optionally, in the method 1100, the directionality comprises a tilt angle.

Optionally, in the method 1100, the directionality comprises a roll angle.

Optionally, in the method 1100, the metric has a first value associated with a first directionality, and a second value associated with a second directionality.

Optionally, in the method 1100, the metric is for one of a plurality of cells, each of the cells representing a three dimensional space of a portion of the environment, and wherein the metric has a value that is based on a position within the one of the plurality of cells.

Optionally, in the method 1100, the metric is for one of a plurality of cells, each of the cells representing a three dimensional space of a portion of the environment, wherein the metric has a first value associated with a first position within the one of the plurality of cells, and a second value associated with a second position within the one of the plurality of cells.

Optionally, in the method 1100, the metric is for one of a plurality of cells, and each of the cells represents a three dimensional space of a portion of the environment.

Optionally, in the method 1100, the act of determining the metric comprises determining a total number of images from the camera system that are associated with the one of the plurality of cells.

Optionally, in the method 1100, the total number of images is associated with a certain viewing direction for the cell.

Optionally, in the method 1100, the total number of images is associated with multiple viewing directions for the cell.

Optionally, in the method 1100, the camera system is configured to obtain multiple images, the multiple images including the image for which the score is determined, and wherein the metric is determined for one of the plurality of cells by: identifying a subset of the images that belong to a same range of viewing directions; determining respective scores for the images in the subset of the images; and summing the scores to obtain a total score.

Optionally, the method 1100 further includes dividing the total score by a number of the images in the subset of the images to obtain an average score.

Optionally, in the method 1100, the average score is the metric.

Optionally, in the method 1100, the average score represents an average expected number of co-visibility points for the range of viewing directions for the one of the plurality of cells.

Optionally, in the method 1100, the respective scores are determined by accessing a co-visibility graph that associates reference points with the multiple images.

Optionally, in the method 1100, the co-visibility graph indicates which of the reference points is visible in which of the multiple images.

Optionally, in the method 1100, each of the respective scores is determined by determining a number of reference point(s) that is detected in the corresponding one of the images in the subset of images.

Optionally, the method 1100 further includes determining an area score indicating a degree of coverage by the map.

Optionally, in the method 1100, the area score is based on a spatial distribution of data points of the map.

Optionally, in the method 1100, at least one of the cells has a footprint area that is 2 m by 2 m.

Optionally, in the method 1100, the at least one of the cells also has a pre-determined height.

Optionally, in the method 1100, the metric is determined by: obtaining a plurality of images from the camera system, the plurality of images including the image for which the score is determined; and determining co-visibility values, wherein each of the co-visibility values indicating a number of reference points detected in a corresponding one of the plurality of images.

Optionally, in the method 1100, the camera system comprises a plurality of cameras.

Optionally, in the method 1100, the plurality of images comprises a first subset of images generated by the plurality of cameras when the camera system is at a first position.

Optionally, in the method 1100, the plurality of images comprises a second subset of images generated by the plurality of cameras when the camera system is at a second position.

Optionally, in the method 1100, the plurality of cameras comprises a first forward facing camera.

Optionally, in the method 1100, the plurality of cameras comprises a second forward facing camera.

Optionally, in the method 1100, the plurality of cameras comprises a first side facing camera.

Optionally, in the method 1100, the plurality of cameras comprises a second side facing camera.

Optionally, the method 1100 further includes determining, by the processing unit, a desired viewing direction of the camera system for improving a value of the metric.

Optionally, the method 1100 further includes generating the graphics based on the determined desired viewing direction, the graphics configured to instruct the user to change a current viewing direction of the camera system to the desired viewing direction.

Optionally, the method 1100 further includes obtaining an additional image from the camera system after the desired viewing direction of the camera system has been achieved.

Optionally, the method 1100 further includes updating the map based on the additional image.

Optionally, the method 1100 further includes updating the metric based on the updated map.

Optionally, in the method 1100, the metric is determined before the processing unit uses the map to localize the user with respect to the environment.

Optionally, in the method 1100, the metric is determined before the apparatus shares content with another apparatus.

Optionally, in the method 1100, the metric is determined during a map construction session in which the processing unit determines the map.

Optionally, in the method 1100, the metric is determined retroactively by accessing the map that was previously determined from a non-transitory medium.

Specialized Processing System

In some embodiments, the method 500, the method 900, the method 1000, and/or the method 1100 described herein may be performed by the processing unit 130 executing an application, or by the application. The application may contain a set of instruction. In one implementation, a specialized processing system having a non-transitory medium storing the set of instruction for the application may be provided. The execution of the instruction by the processing unit 130 of the image display device 101 will cause the processing unit 130 to perform the features described herein.

In some embodiments, the image display device 101 may also be considered as a specialized processing system. In particular, the image display device 101 is a specialized processing system in that it contains instruction stored in its non-transitory medium for execution by the processing unit 130 to provide unique tangible effects in a real world. The features provided by the image display device 101 (as a result of the processing unit 130 executing the instruction) provide improvements in the technological field of localizing map creation, image-based localization, and quality control for localizing map, as described herein.

By means of non-limiting examples, the instruction provided may include instruction for: determining a map based at least in part on output(s) from the camera system; localizing a user with respect to the environment based on the map; determining a metric indicating a likelihood of success to localize the user using the map; determining the metric based on a co-visibility of a point of interest that is associated with different camera positions; determining a number of reference points that are useable to localize the user with respect to the environment; determining a metric indicating the likelihood of success to localize the user in one or more viewing directions; determining a metric based on a number of times a point of interest is detected from different camera positions; determining the metric without determining any convex hull; determining a metric based on directionality, wherein the directionality is with respect to one or more vertical axes, and/or one or more horizontal axes; determining the metric without determining any convex hull; determining a metric based on directionality, wherein the directionality comprises a turn direction, a tilt angle, a roll angle, or any combination of the foregoing; determining a metric having a first value associated with a first directionality, and a second value associated with a second directionality; determining a metric for one of a plurality of cells, each of the cells representing a three dimensional space of a portion of the environment, and wherein the metric has a value that is based on a position within the one of the plurality of cells; determining a metric for one of a plurality of cells, each of the cells representing a three dimensional space of a portion of the environment, wherein the metric has a first value associated with a first position within the one of the plurality of cells, and a second value associated with a second position within the one of the plurality of cells; determining a metric for one of a plurality of cells, and each of the cells represents a three dimensional space of a portion of the environment; determining a total number of images from the camera system for the one of the plurality of cells, wherein, the total number of images is associated with a certain viewing direction for the cell, or is associated with multiple viewing directions for the cell; generating a control signal to cause the camera system to obtain multiple images; determining the metric for one of the plurality of cells by: identifying a subset of the images that belong to a same range of viewing directions; determining respective scores for the images in the subset of the images; and summing the scores to obtain a total score; determining an average score by dividing the total score by a number of the images in the subset of the images; determining an average score representing an average expected number of co-visibility points for the range of viewing directions for the one of the plurality of cells; determining respective scores by accessing a co-visibility graph that associates reference points with the multiple images, wherein the co-visibility graph indicates which of the reference points is visible in which of the multiple images; determining each of the respective scores by determining a number of reference point(s) that is detected in the corresponding one of the images in the subset of images; determining an area score indicating a degree of coverage by the map; determining an area score based on a spatial distribution of data points of the map; determining the metric by: obtaining a plurality of images from the camera system; and determining co-visibility values, wherein each of the co-visibility values indicating a number of reference points detected in a corresponding one of the plurality of images; generating control signal to operate a plurality of cameras, wherein the plurality of cameras comprises a first forward facing camera, a second forward facing camera, a first side facing camera, and a second side facing camera; determining a desired viewing direction of the camera system for improving a value of the metric; generating graphics based on the determined desired viewing direction, the graphics configured to instruct the user to change a current viewing direction of the camera system to the desired viewing direction; generating a control signal to operate the camera system to obtain an image of the environment after the desired viewing direction of the camera system has been achieved; updating the map based on the image; updating the metric based on the updated map; determining a metric for the map before using the map to localize the user with respect to the environment; determining a metric for a map before allowing the apparatus to share content with another apparatus; determining the metric during a map construction session in which the processing unit determines the map; determine the metric retroactively by accessing the map that was previously determined from a non-transitory medium; performing a sanitization to remove or to disregard data that would otherwise provide an undesirable contribution for the map if the data is used to determine the map, wherein the data comprises an image from the camera system, comprises a set of images generated by the respective cameras, comprises an identification of a reference point in an image from the camera system, or represents a ray or a line that is associated with an image from the camera system and a reference point; performing the sanitization as a part of a local optimization; performing a bundle adjustment to adjust one or more rays associated with one or more images from the camera system; performing a bundle adjustment after performing the sanitization to remove the data; performing the bundle adjustment as a part of a global optimization; performing the global optimization based on images from the camera system and three-dimensional reference points; performing the global optimization also based on a relative orientation between cameras of the camera system; determining a score for an image obtained from the camera system, wherein the score is a constraint score, and/or indicates how well the image is constrained; determining a score based on a Jacobian of reference points measurements; determining a score based on an information matrix that is a diagonal matrix; determining a score based on a number of reference points detected in the image; performing a data sanitization based on the score; removing a constraint of the image, or removing the image, when performing the data sanitization; removing the constraint of the image, or to remove the image, when a score is below a threshold; determining a map by: determining multiple map segments, and connecting the map segments; determining a first map segment of the map segments by obtaining images from the camera system, and linking the images, wherein the images are generated in sequence by the camera system; determining respective scores of the images; obtaining an additional image from the camera system, determining a score for the additional image, and starting a second map segment of the map segments in response to the score of the additional image from the camera system meeting a criterion; starting the second map segment when the score indicates that the image has a degree of constraint with respect to the first map segment that is below a threshold.

Figure 16:
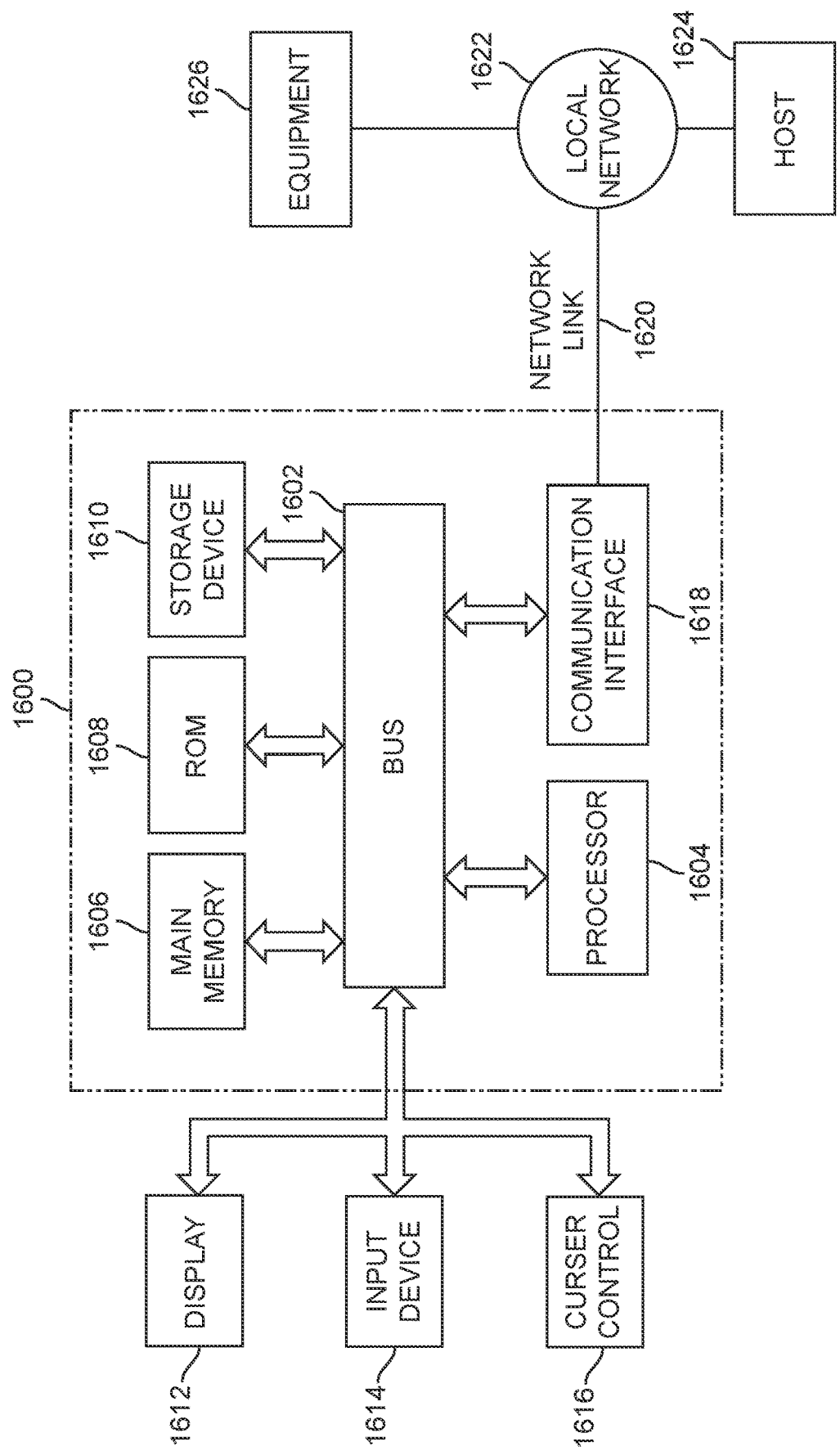
FIG. 16 illustrates a specialized processing system in accordance with some embodiments.

FIG. 16 is a block diagram illustrating an embodiment of a specialized processing system 1600 that can be used to implement various features described herein. For example, in some embodiments, the processing system 1600 may be used to implement the image display device 101. Processing system 1600 includes a bus 1602 or other communication mechanism for communicating information, and a processor 1604 coupled with the bus 1602 for processing information. The processor system 1600 also includes a main memory 1606, such as a random access memory (RAM) or other dynamic storage device, coupled to the bus 1602 for storing information and instructions to be executed by the processor 1604. The main memory 1606 also may be used for storing temporary variables or other intermediate information during execution of instructions to be executed by the processor 1604. The processor system 1600 further includes a read only memory (ROM) 1608 or other static storage device coupled to the bus 1602 for storing static information and instructions for the processor 1604. A data storage device 1610, such as a magnetic disk, solid state disk, or optical disk, is provided and coupled to the bus 1602 for storing information and instructions.

The processor system 1600 may be coupled via the bus 1602 to a display 1612, such as a screen, for displaying information to a user. In some cases, if the processing system 1600 is part of the apparatus that includes a touch-screen, the display 1612 may be the touch-screen. An input device 1614, including alphanumeric and other keys, is coupled to the bus 1602 for communicating information and command selections to processor 1604. Another type of user input device is cursor control 1616, such as a mouse, a trackball, or cursor direction keys for communicating direction information and command selections to processor 1604 and for controlling cursor movement on display 1612. This input device typically has two degrees of freedom in two axes, a first axis (e.g., x) and a second axis (e.g., y), that allows the device to specify positions in a plane. In some cases, if the processing system 1600 is part of the apparatus that includes a touch-screen, the input device 1614 and the curser control may be the touch-screen.

In some embodiments, the processor system 1600 can be used to perform various functions described herein. According to some embodiments, such use is provided by processor system 1600 in response to processor 1604 executing one or more sequences of one or more instructions contained in the main memory 1606. Those skilled in the art will know how to prepare such instructions based on the functions and methods described herein. Such instructions may be read into the main memory 1606 from another processor-readable medium, such as storage device 1610. Execution of the sequences of instructions contained in the main memory 1606 causes the processor 1604 to perform the process steps described herein. One or more processors in a multi-processing arrangement may also be employed to execute the sequences of instructions contained in the main memory 1606. In alternative embodiments, hard-wired circuitry may be used in place of or in combination with software instructions to implement the various embodiments described herein. Thus, embodiments are not limited to any specific combination of hardware circuitry and software.

The term "processor-readable medium" as used herein refers to any medium that participates in providing instructions to the processor 1604 for execution. Such a medium may take many forms, including but not limited to, non-volatile media, volatile media, and transmission media. Non-volatile media includes, for example, optical, solid state or magnetic disks, such as the storage device 1610. A non-volatile medium may be considered an example of non-transitory medium. Volatile media includes dynamic memory, such as the main memory 1606. A volatile medium may be considered an example of non-transitory medium. Transmission media includes coaxial cables, copper wire and fiber optics, including the wires that comprise the bus 1602. Transmission media can also take the form of acoustic or light waves, such as those generated during radio wave and infrared data communications.

Common forms of processor-readable media include, for example, a flexible disk, hard disk, magnetic tape, or any other magnetic medium, a CD-ROM, any other optical medium, any other physical medium with patterns of holes, a RAM, a PROM, and EPROM, a FLASH-EPROM, solid state disks any other memory chip or cartridge, a carrier wave as described hereinafter, or any other medium from which a processor can read.

Various forms of processor-readable media may be involved in carrying one or more sequences of one or more instructions to the processor 1604 for execution. For example, the instructions may initially be carried on a magnetic disk or solid state disk of a remote computer. The remote computer can load the instructions into its dynamic memory and send the instructions over a network, such as the Internet. The processing system 1600 can receive the data on a network line. The bus 1602 carries the data to the main memory 1606, from which the processor 1604 retrieves and executes the instructions. The instructions received by the main memory 1606 may optionally be stored on the storage device 1610 either before or after execution by the processor 1604.

The processing system 1600 also includes a communication interface 1618 coupled to the bus 1602. The communication interface 1618 provides a two-way data communication coupling to a network link 1620 that is connected to a local network 1622. For example, the communication interface 1618 may be a local area network (LAN) card to provide a data communication connection to a compatible LAN. Wireless links may also be implemented. In any such implementation, the communication interface 1618 sends and receives electrical, electromagnetic or optical signals that carry data streams representing various types of information.

The network link 1620 typically provides data communication through one or more networks to other devices. For example, the network link 1620 may provide a connection through local network 1622 to a host computer 1624 or to equipment 1626. The data streams transported over the network link 1620 can comprise electrical, electromagnetic or optical signals. The signals through the various networks and the signals on the network link 1620 and through the communication interface 1618, which carry data to and from the processing system 1600, are exemplary forms of carrier waves transporting the information. The processing system 1600 can send messages and receive data, including program code, through the network(s), the network link 1620, and the communication interface 1618.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. It is further noted that any claim may be drafted to exclude any optional element. As such, this statement is intended to serve as antecedent basis for use of such exclusive terminology as "solely," "only" and the like in connection with the recitation of claim elements, or use of a "negative" limitation.

The breadth of the present disclosure is not to be limited to the examples provided and/or the subject specification, but rather only by the scope of claim language associated with this disclosure.

The following are exemplary features. One or more of the below features may be combined in one or more embodiments.

Feature 1. An apparatus configured to be worn on a head of a user includes: a screen configured to present graphics to the user; a camera system configured to view an environment in which the user is located; and a processing unit configured to determine a map based at least in part on output(s) from the camera system, wherein the map is configured for use by the processing unit to localize the user with respect to the environment; wherein the processing unit of the apparatus is also configured to obtain a metric indicating a likelihood of success to localize the user using the map, and wherein the processing unit is configured to obtain the metric by computing the metric or by receiving the metric.

Feature 2. In some embodiments, the processing unit is configured to determine the metric based on a co-visibility of a point of interest that is associated with different camera positions.

Feature 3. In some embodiments, the metric indicates a number of reference points that are useable to localize the user with respect to the environment.

Feature 4. In some embodiments, the metric indicates the likelihood of success to localize the user in one or more viewing directions.

Feature 5. In some embodiments, the processing unit is configured to determine the metric based on a number of times a point of interest is detected from different camera positions.

Feature 6. In some embodiments, the processing unit is configured to determine the metric without determining any convex hull.

Feature 7. In some embodiments, the metric has a value that is based on directionality.

Feature 8. In some embodiments, the metric is for one of a plurality of cells, each of the cells representing a three dimensional space of a portion of the environment, and wherein the metric has a value that is based on a position within the one of the plurality of cells.

Feature 9. In some embodiments, the metric is for one of a plurality of cells, and each of the cells represents a three dimensional space of a portion of the environment.

Feature 10. In some embodiments, the camera system is configured to obtain multiple images, and wherein the processing unit is configured to determine the metric for one of the plurality of cells by: identifying a subset of the images that belong to a same range of viewing directions; determining respective scores for the images in the subset of the images; and summing the scores to obtain a total score.

Feature 11. In some embodiments, the processing unit is also configured to determine an average score by dividing the total score by a number of the images in the subset of the images.

Feature 12. In some embodiments, the processing unit is configured to determine the respective scores by accessing a co-visibility graph that associates reference points with the multiple images.

Feature 13. In some embodiments, the co-visibility graph indicates which of the reference points is visible in which of the multiple images.

Feature 14. In some embodiments, the processing unit is configured to determine each of the respective scores by determining a number of reference point(s) that is detected in the corresponding one of the images in the subset of images.

Feature 15. In some embodiments, the processing unit is also configured to determine an area score indicating a degree of coverage by the map.

Feature 16. In some embodiments, the processing unit is configured to determine the metric by: obtaining a plurality of images from the camera system; and determining co-visibility values, wherein each of the co-visibility values indicating a number of reference points detected in a corresponding one of the plurality of images.

Feature 17. In some embodiments, the processing unit is configured to determine a desired viewing direction of the camera system for improving a value of the metric.

Feature 18. In some embodiments, the processing unit is configured to generate the graphics based on the determined desired viewing direction, the graphics configured to instruct the user to change a current viewing direction of the camera system to the desired viewing direction.

Feature 19. In some embodiments, the processing unit is configured to update the metric after the desired viewing direction is achieved.

Feature 20. In some embodiments, the processing unit is configured to perform a sanitization to remove or to disregard data that would otherwise provide an undesirable contribution for the map if the data is used to determine the map.

Feature 21. In some embodiments, the data comprises an image from the camera system, and wherein the processing unit is configured to perform the sanitization by (1) removing or disregarding the image, (2) disregarding an identification of a reference point in the image, and/or (3) disregarding a ray or a line that is associated with the image.

Feature 22. In some embodiments, the processing unit is configured to perform a bundle adjustment to adjust one or more rays associated with one or more images from the camera system, wherein the processing unit is configured to perform the bundle adjustment after performing the sanitization to remove the data.

Feature 23. In some embodiments, the processing unit is configured to perform an optimization based on images from the camera system, three-dimensional reference points, and a relative orientation between cameras of the camera system.

Feature 24. In some embodiments, the processing unit is configured to determine a score for an image obtained from the camera system.

Feature 25. In some embodiments, the score indicates how well the image is constrained.

Feature 26. In some embodiments, the processing unit is configured to determine the score based on a Jacobian of reference points measurements.

Feature 27. In some embodiments, the processing unit is configured to perform data sanitization based on the score; and wherein the processing unit is configured to remove a constraint of the image, or to remove the image, when performing the data sanitization.

Feature 28. In some embodiments, the processing unit is configured to determine the map by: determining multiple map segments; and connecting the map segments.

Feature 29. In some embodiments, the processing unit is configured to determine a first map segment of the map segments by obtaining images from the camera system, and linking the images, wherein the images are generated in sequence by the camera system.

Feature 30. In some embodiments, the processing unit is configured to: obtain an additional image from the camera system, determine a score for the additional image, and start a second map segment of the map segments in response to the score of the additional image from the camera system meeting a criterion.

Feature 31. In some embodiments, the processing unit is configured to start the second map segment when the score indicates that the image has a degree of constraint with respect to the first map segment that is below a threshold.

Feature 32. A method performed by an apparatus that is configured to be worn on a head of a user, the apparatus having a screen configured to present graphics to the user, a camera system configured to view an environment in which the user is located, and a processing unit, includes: obtaining, by the processing unit, output(s) from the camera system; determining a map by the processing unit based at least in part on the output(s) from the camera system, wherein the map is configured for use by the processing unit to localize the user with respect to the environment; and obtaining, by the processing unit, a metric indicating a likelihood of success to localize the user using the map, wherein the act of obtaining comprises computing the metric or receiving the metric by the processing unit.

Feature 33. In some embodiments, the metric is determined based on a co-visibility of a point of interest that is associated with different camera positions.

Feature 34. In some embodiments, the metric indicates a number of reference points that are useable to localize the user with respect to the environment.

Feature 35. In some embodiments, the metric indicates the likelihood of success to localize the user in one or more viewing directions.

Feature 36. In some embodiments, the metric is determined based on a number of times a point of interest is detected from different camera positions.

Feature 37. In some embodiments, the metric is determined by the processing unit without determining any convex hull.

Feature 38. In some embodiments, the metric has a value that is based on directionality.

Feature 39. In some embodiments, the metric is for one of a plurality of cells, each of the cells representing a three dimensional space of a portion of the environment, and wherein the metric has a value that is based on a position within the one of the plurality of cells.

Feature 40. In some embodiments, the metric is for one of a plurality of cells, and each of the cells represents a three dimensional space of a portion of the environment.

Feature 41. In some embodiments, the camera system is configured to obtain multiple images, and wherein the metric is determined for one of the plurality of cells by: identifying a subset of the images that belong to a same range of viewing directions; determining respective scores for the images in the subset of the images; and summing the scores to obtain a total score.

Feature 42. In some embodiments, the metric is determined by dividing the total score by a number of the images in the subset of the images to obtain an average score.

Feature 43. In some embodiments, the respective scores are determined by accessing a co-visibility graph that associates reference points with the multiple images.

Feature 44. In some embodiments, the co-visibility graph indicates which of the reference points is visible in which of the multiple images.

Feature 45. In some embodiments, each of the respective scores is determined by determining a number of reference point(s) that is detected in the corresponding one of the images in the subset of images.

Feature 46. In some embodiments, the method also includes determining an area score indicating a degree of coverage by the map.

Feature 47. In some embodiments, the metric is determined by: obtaining a plurality of images from the camera system; and determining co-visibility values, wherein each of the co-visibility values indicating a number of reference points detected in a corresponding one of the plurality of images.

Feature 48. In some embodiments, the method also includes determining by the processing unit a desired viewing direction of the camera system for improving a value of the metric.

Feature 49. In some embodiments, the method also includes generating the graphics based on the determined desired viewing direction, the graphics configured to instruct the user to change a current viewing direction of the camera system to the desired viewing direction.

Feature 50. In some embodiments, the method also includes updating the metric after the desired viewing direction is achieved.

Feature 51. In some embodiments, the method also includes performing a sanitization to remove or to disregard data that would otherwise provide an undesirable contribution for the map if the data is used to determine the map.

Feature 52. In some embodiments, the data comprises an image from the camera system, and wherein the sanitization is performed by (1) removing or disregarding the image, disregarding an identification of a reference point in the image, and/or (3) disregarding a ray or a line that is associated with the image.

Feature 53. In some embodiments, the method also includes performing a bundle adjustment to adjust one or more rays associated with one or more images from the camera system, wherein the bundle adjustment is performed after the sanitization is performed to remove the data.

Feature 54. In some embodiments, the processing unit is configured to perform an optimization based on images from the camera system, three-dimensional reference points, and a relative orientation between cameras of the camera system.

Feature 55. In some embodiments, the method also includes determining, by the processing unit, a score for an image obtained from the camera system.

Feature 56. In some embodiments, the score indicates how well the image is constrained.

Feature 57. In some embodiments, the score is determined based on a Jacobian of reference points measurements.

Feature 58. In some embodiments, the method also includes performing data sanitization based on the score; and wherein the data sanitization is performed to remove a constraint of the image, or to remove the image.

Feature 59. In some embodiments, the map is determined by: determining multiple map segments; and connecting the map segments.

Feature 60. In some embodiments, the act of determining the multiple map segments comprises determining a first map segment of the map segments by obtaining images from the camera system, and linking the images, wherein the images are generated in sequence by the camera system.

Feature 61. In some embodiments, the method also includes: obtaining an additional image from the camera system, determining a score for the additional image, and starting a second map segment of the map segments in response to the score of the additional image from the camera system meeting a criterion.

Feature 62. In some embodiments, the second map segment is started when the score indicates that the image has a degree of constraint with respect to the first map segment that is below a threshold.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

The invention claimed is:

1. An apparatus configured to be worn on a head of a user, comprising:
    a screen configured to present graphics to the user;
    a camera system configured to view an environment in which the user is located; and
    a processing unit configured to determine a map based at least in part on output(s) from the camera system, wherein the map is configured for use by the processing unit to localize the user with respect to the environment;
    wherein the processing unit of the apparatus is also configured to obtain a metric indicating a likelihood of success to localize the user using the map, and wherein the processing unit is configured to obtain the metric by computing the metric or by receiving the metric.

2. The apparatus of claim 1, wherein the processing unit is configured to determine the metric based on a co-visibility of a point of interest that is associated with different camera positions.

3. The apparatus of claim 1, wherein the metric indicates a number of reference points that are useable to localize the user with respect to the environment.

4. The apparatus of claim 1, wherein the metric indicates the likelihood of success to localize the user in one or more viewing directions.

5. The apparatus of claim 1, wherein the processing unit is configured to determine the metric based on a number of times a point of interest is detected from different camera positions.

6. The apparatus of claim 1, wherein the processing unit is configured to determine the metric without determining any convex hull.

7. The apparatus of claim 1, wherein the metric has a value that is based on directionality.

8. The apparatus of claim 1, wherein the metric is for one of a plurality of cells, each of the cells representing a three dimensional space of a portion of the environment, and wherein the metric has a value that is based on a position within the one of the plurality of cells.

9. The apparatus of claim 1, wherein the processing unit is also configured to determine an area score indicating a degree of coverage by the map.

10. The apparatus of claim 1, wherein the processing unit is configured to determine a desired viewing direction of the camera system for improving a value of the metric.

11. The apparatus of claim 10, wherein the processing unit is configured to generate the graphics based on the determined desired viewing direction, the graphics configured to instruct the user to change a current viewing direction of the camera system to the desired viewing direction.

12. The apparatus of claim 11, wherein the processing unit is configured to update the metric after the desired viewing direction is achieved.

13. The apparatus of claim 1, wherein the processing unit is configured to perform an optimization based on images from the camera system, three-dimensional reference points, and a relative orientation between cameras of the camera system.

14. The apparatus of claim 1, wherein the processing unit is configured to determine a score for an image obtained from the camera system.

15. The apparatus of claim 14, wherein the score indicates how well the image is constrained.

16. The apparatus of claim 14, wherein the processing unit is configured to determine the score based on a Jacobian of reference points measurements.

17. An apparatus configured to be worn on a head of a user, comprising:
- a screen configured to present graphics to the user;
- a camera system configured to view an environment in which the user is located; and
- a processing unit configured to determine a map based at least in part on output(s) from the camera system, wherein the map is configured for use by the processing unit to localize the user with respect to the environment;
- wherein the processing unit of the apparatus is also configured to obtain a metric indicating a likelihood of success to localize the user using the map, and wherein the processing unit is configured to obtain the metric by computing the metric or by receiving the metric; and
- wherein the metric is for one of a plurality of cells, and each of the cells represents a three dimensional space of a portion of the environment.

18. The apparatus of claim 17, wherein the camera system is configured to obtain multiple images, and wherein the processing unit is configured to determine the metric for one of the plurality of cells by:
- identifying a subset of the images that belong to a same range of viewing directions;
- determining respective scores for the images in the subset of the images; and
- summing the scores to obtain a total score.

19. The apparatus of claim 18, wherein the processing unit is also configured to determine an average score by dividing the total score by a number of the images in the subset of the images.

20. The apparatus of claim 18, wherein the processing unit is configured to determine the respective scores by accessing a co-visibility graph that associates reference points with the multiple images.

21. The apparatus of claim 20, wherein the co-visibility graph indicates which of the reference points is visible in which of the multiple images.

22. The apparatus of claim 18, wherein the processing unit is configured to determine each of the respective scores by determining a number of reference point(s) that is detected in the corresponding one of the images in the subset of images.

23. An apparatus configured to be worn on a head of a user, comprising:
- a screen configured to present graphics to the user;
- a camera system configured to view an environment in which the user is located; and
- a processing unit configured to determine a map based at least in part on output(s) from the camera system, wherein the map is configured for use by the processing unit to localize the user with respect to the environment;
- wherein the processing unit of the apparatus is also configured to obtain a metric indicating a likelihood of success to localize the user using the map, and wherein the processing unit is configured to obtain the metric by computing the metric or by receiving the metric; and
- wherein the processing unit is configured to determine the metric by:
  - obtaining a plurality of images from the camera system; and
  - determining co-visibility values, wherein each of the co-visibility values indicating a number of reference points detected in a corresponding one of the plurality of images.

24. An apparatus configured to be worn on a head of a user, comprising:
- a screen configured to present graphics to the user;
- a camera system configured to view an environment in which the user is located; and
- a processing unit configured to determine a map based at least in part on output(s) from the camera system, wherein the map is configured for use by the processing unit to localize the user with respect to the environment;
- wherein the processing unit of the apparatus is also configured to obtain a metric indicating a likelihood of success to localize the user using the map, and wherein the processing unit is configured to obtain the metric by computing the metric or by receiving the metric; and
- wherein the processing unit is configured to perform a sanitization to remove or to disregard data that would otherwise provide an undesirable contribution for the map if the data is used to determine the map.

25. The apparatus of claim 24, wherein the data comprises an image from the camera system, and wherein the processing unit is configured to perform the sanitization by (1) removing or disregarding the image, (2) disregarding an identification of a reference point in the image, and/or (3) disregarding a ray or a line that is associated with the image.

26. The apparatus of claim 24, wherein the processing unit is configured to perform a bundle adjustment to adjust one or more rays associated with one or more images from the camera system, wherein the processing unit is configured to perform the bundle adjustment after performing the sanitization to remove the data.

27. An apparatus configured to be worn on a head of a user, comprising:
- a screen configured to present graphics to the user;
- a camera system configured to view an environment in which the user is located; and
- a processing unit configured to determine a map based at least in part on output(s) from the camera system, wherein the map is configured for use by the processing unit to localize the user with respect to the environment;
- wherein the processing unit of the apparatus is also configured to obtain a metric indicating a likelihood of success to localize the user using the map, and wherein the processing unit is configured to obtain the metric by computing the metric or by receiving the metric;
- wherein the processing unit is configured to determine a score for an image obtained from the camera system;
- wherein the processing unit is configured to perform data sanitization based on the score; and wherein the processing unit is configured to remove a constraint of the image, or to remove the image, when performing the data sanitization.

28. An apparatus configured to be worn on a head of a user, comprising:
   a screen configured to present graphics to the user;
   a camera system configured to view an environment in which the user is located; and
   a processing unit configured to determine a map based at least in part on output(s) from the camera system, wherein the map is configured for use by the processing unit to localize the user with respect to the environment;
   wherein the processing unit of the apparatus is also configured to obtain a metric indicating a likelihood of success to localize the user using the map, and wherein the processing unit is configured to obtain the metric by computing the metric or by receiving the metric; and
   wherein the processing unit is configured to determine the map by:
      determining multiple map segments; and
      connecting the map segments.

29. The apparatus of claim 28, wherein the processing unit is configured to determine a first map segment of the map segments by obtaining images from the camera system, and linking the images, wherein the images are generated in sequence by the camera system.

30. The apparatus of claim 29, wherein the processing unit is configured to:
   obtain an additional image from the camera system,
   determine a score for the additional image, and
   start a second map segment of the map segments in response to the score of the additional image from the camera system meeting a criterion.

31. The apparatus of claim 30, wherein the processing unit is configured to start the second map segment when the score indicates that the image has a degree of constraint with respect to the first map segment that is below a threshold.

32. A method performed by an apparatus that is configured to be worn on a head of a user, the apparatus having a screen configured to present graphics to the user, a camera system configured to view an environment in which the user is located, and a processing unit, the method comprising:
   obtaining, by the processing unit, output(s) from the camera system;
   determining a map by the processing unit based at least in part on the output(s) from the camera system, wherein the map is configured for use by the processing unit to localize the user with respect to the environment; and
   obtaining, by the processing unit, a metric indicating a likelihood of success to localize the user using the map, wherein the act of obtaining comprises computing the metric or receiving the metric by the processing unit.

* * * * *

(12) EX PARTE REEXAMINATION CERTIFICATE (13145th)
United States Patent
Sharma et al.

(10) Number: US 11,182,614 C1
(45) Certificate Issued: Jan. 20, 2026

(54) METHODS AND APPARATUSES FOR DETERMINING AND/OR EVALUATING LOCALIZING MAPS OF IMAGE DISPLAY DEVICES

(71) Applicant: MAGIC LEAP, INC., Plantation, FL (US)

(72) Inventors: Divya Sharma, San Jose, CA (US); Ali Shahrokni, San Jose, CA (US); Anush Mohan, Mountain View, CA (US); Prateek Singhal, Mountain View, CA (US); Xuan Zhao, San Jose, CA (US); Sergiu Sima, Plantation, FL (US); Benjamin Langmann, Plantation, FL (US)

(73) Assignee: MAGIC LEAP, INC., Plantation, FL (US)

Reexamination Request:
No. 90/019,657, Sep. 12, 2024

Reexamination Certificate for:
Patent No.: 11,182,614
Issued: Nov. 23, 2021
Appl. No.: 16/520,582
Filed: Jul. 24, 2019

Related U.S. Application Data

(60) Provisional application No. 62/702,829, filed on Jul. 24, 2018.

(51) Int. Cl.
*G06V 20/20* (2022.01)
*G06F 1/16* (2006.01)
*G06F 3/01* (2006.01)
*G06T 15/00* (2011.01)
*G06T 19/00* (2011.01)

(52) U.S. Cl.
CPC .............. *G06F 3/011* (2013.01); *G06F 1/163* (2013.01); *G06T 15/005* (2013.01); *G06T 19/006* (2013.01); *G06V 20/20* (2022.01)

(58) Field of Classification Search
None
See application file for complete search history.

(56) References Cited

To view the complete listing of prior art documents cited during the proceeding for Reexamination Control Number 90/019,657, please refer to the USPTO's Patent Electronic System.

*Primary Examiner* — David E England

(57) ABSTRACT

An apparatus configured to be worn on a head of a user, includes: a screen configured to present graphics to the user; a camera system configured to view an environment in which the user is located; and a processing unit configured to determine a map based at least in part on output(s) from the camera system, wherein the map is configured for use by the processing unit to localize the user with respect to the environment; wherein the processing unit of the apparatus is also configured to obtain a metric indicating a likelihood of success to localize the user using the map, and wherein the processing unit is configured to obtain the metric by computing the metric or by receiving the metric.

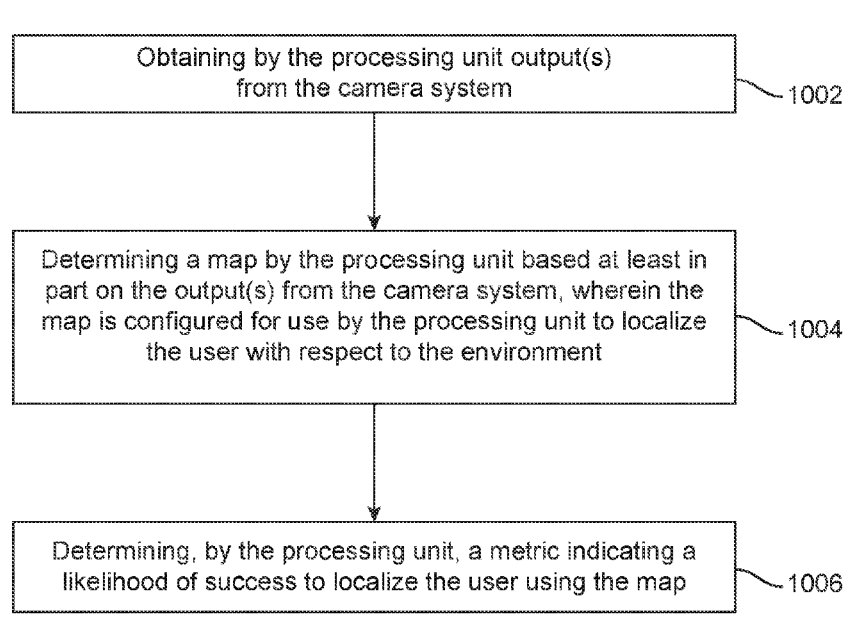

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 13, 14, 17-19, 22-29, 31 and 32 are determined to be patentable as amended.

Claims 2-12, 15, 16, 20, 21 and 30, dependent on an amended claim, are determined to be patentable.

New claims 33-39 are added and determined to be patentable.

1. An apparatus configured to be worn on a head of a user, comprising:
   a screen configured to present graphics to the user;
   a camera system configured to view an environment in which the user is located; and
   a processing unit configured to determine a map [based at least in part on output(s) from the camera system], wherein the map is configured for use by the processing unit to localize the user with respect to the environment;
   wherein the processing unit of the apparatus is also configured to obtain a metric indicating a likelihood of success to localize the user using the map, and wherein the processing unit is configured to obtain the metric by computing the metric or by receiving the metric;
   *wherein the processing unit is configured to determine the map based on multiple images from the camera system, and wherein the metric is based on respective scores of the images and is a measure of a quality of the map, the metric being a separate data item and different from the respective scores of the images.*

13. The apparatus of claim 1, wherein the processing unit is configured to perform an optimization based on *the* images from the camera system, three-dimensional reference points, and a relative orientation between cameras of the camera system.

14. The apparatus of claim 1, wherein the processing unit is configured to determine [a score for an image] *one of the scores for one of the images* obtained from the camera system.

17. An apparatus configured to be worn on a head of a user, comprising:
   a screen configured to present graphics to the user;
   a camera system configured to view an environment in which the user is located; and
   a processing unit configured to determine a map [based at least in part on output(s) from the camera system], wherein the map is configured for use by the processing unit to localize the user with respect to the environment;
   wherein the processing unit of the apparatus is also configured to obtain a metric indicating a likelihood of success to localize the user using the map, and wherein the processing unit is configured to obtain the metric by computing the metric or by receiving the metric; [and]
   wherein the metric is for one of a plurality of cells, and each of the cells represents a three dimensional space of a portion of the environment*; and*
   *wherein the processing unit is configured to determine the map based on multiple images from the camera system, and wherein the metric is based on respective scores of the images and is a measure of a quality of the map, the metric being a separate data item and different from the respective scores of the images.*

18. The apparatus of claim 17, [wherein the camera system is configured to obtain multiple images, and] *wherein the metric is for one of the plurality of cells, and* wherein the processing unit is configured to determine the metric for *the* one of the plurality of cells by:
   identifying [a subset of] the images that belong to a same range of viewing directions;
   determining *the* respective scores for the images [in the subset of the images]; and
   summing the scores to obtain a total score.

19. The apparatus of claim 18, wherein the processing unit is also configured to determine [an average score] *the metric for the one of the plurality of cells* by dividing the total score by a number of the images [in the subset of the images] *to obtain an average score*.

22. The apparatus of claim 18, wherein the processing unit is configured to determine each of the respective scores by determining a number of reference point(s) that is detected in the corresponding one of the images [in the subset of images].

23. An apparatus configured to be worn on a head of a user, comprising:
   a screen configured to present graphics to the user;
   a camera system configured to view an environment in which the user is located; and
   a processing unit configured to determine a map [based at least in part on output(s) from the camera system], wherein the map is configured for use by the processing unit to localize the user with respect to the environment;
   wherein the processing unit of the apparatus is also configured to obtain a metric indicating a likelihood of success to localize the user using the map, and wherein the processing unit is configured to obtain the metric by computing the metric [or by receiving the metric];
   [and]
   wherein the processing unit is configured to determine the metric by:
      obtaining a plurality of images from the camera system; and
      determining co-visibility values *respectively for the images*, wherein each of the co-visibility values indicating a number of reference points detected in a corresponding one of the plurality of images*; and*
   *wherein the processing unit is configured to determine the map based on the images from the camera system, and wherein the metric is based on the co-visibility values respectively for the images and is a measure of a quality of the map, the metric being a separate data item and different from the co-visibility values.*

24. An apparatus configured to be worn on a head of a user, comprising:
   a screen configured to present graphics to the user;
   a camera system configured to view an environment in which the user is located; and
   a processing unit configured to determine a map [based at least in part on output(s) from the camera system], wherein the map is configured for use by the processing unit to localize the user with respect to the environment;

wherein the processing unit of the apparatus is also configured to obtain a metric indicating a likelihood of success to localize the user using the map, and wherein the processing unit is configured to obtain the metric by computing the metric or by receiving the metric; [and]

wherein the processing unit is configured to perform a sanitization to remove or to disregard data that would otherwise provide an undesirable contribution for the map if the data is used to determine the map; *and*

*wherein the processing unit is configured to determine the map based on multiple images from the camera system, and wherein the metric is based on respective scores of the images and is a measure of a quality of the map, the metric being a separate data item and different from the respective scores of the images.*

25. The apparatus of claim 24, [wherein the data comprises an image from the camera system, and] wherein the processing unit is configured to perform the sanitization by (1) removing or disregarding [the image] *one of the images*, (2) disregarding an identification of a reference point in the [image] *one of the images*, and/or (3) disregarding a ray or a line that is associated with the [image] *one of the images*.

26. The apparatus of claim 24, wherein the processing unit is configured to perform a bundle adjustment to adjust one or more rays associated with one or more *of the* images from the camera system, wherein the processing unit is configured to perform the bundle adjustment after performing the sanitization to remove the data.

27. An apparatus configured to be worn on a head of a user, comprising:
a screen configured to present graphics to the user;
a camera system configured to view an environment in which the user is located; and
a processing unit configured to determine a map [based at least in part on output(s) from the camera system], wherein the map is configured for use by the processing unit to localize the user with respect to the environment;
wherein the processing unit of the apparatus is also configured to obtain a metric indicating a likelihood of success to localize the user using the map, and wherein the processing unit is configured to obtain the metric by computing the metric or by receiving the metric;
*wherein the processing unit is configured to determine the map based on multiple images from the camera system, and wherein the metric is based on respective scores of the images and is a measure of a quality of the map, the metric being a separate data item and different from the respective scores of the images;*
wherein the processing unit is configured to determine [a score for an image] *one of the scores for one of the images* obtained from the camera system;
wherein the processing unit is configured to perform data sanitization based on the [score] *one of the scores*; and
wherein the processing unit is configured to remove a constraint of the [image] *one of the images*, or to remove the [image] *one of the images*, when performing the data sanitization.

28. An apparatus configured to be worn on a head of a user, comprising:
a screen configured to present graphics to the user;
a camera system configured to view an environment in which the user is located; and
a processing unit configured to determine a map [based at least in part on output(s) from the camera system], wherein the map is configured for use by the processing unit to localize the user with respect to the environment;
wherein the processing unit of the apparatus is also configured to obtain a metric indicating a likelihood of success to localize the user using the map, and wherein the processing unit is configured to obtain the metric by computing the metric or by receiving the metric; [and]
wherein the processing unit is configured to determine the map by:
determining multiple map segments; and
connecting the map segments; *and*
*wherein the processing unit is configured to determine the map based on images from the camera system, and wherein the metric is based on respective scores of the images and is a measure of a quality of the map, the metric being a separate data item and different from the respective scores of the images.*

29. The apparatus of claim 28, wherein the processing unit is configured to determine a first map segment of the map segments by [obtaining images from the camera system, and] linking the images, wherein the images are generated in sequence by the camera system.

31. The apparatus of claim 30, wherein the processing unit is configured to start the second map segment when the score *of the additional image* indicates that the *additional* image has a degree of constraint with respect to the first map segment that is below a threshold.

32. A method performed by an apparatus that is configured to be worn on a head of a user, the apparatus having a screen configured to present graphics to the user, a camera system configured to view an environment in which the user is located, and a processing unit, the method comprising:
obtaining, by the processing unit, [output(s)] *images* from the camera system;
determining a map by the processing unit [based at least in part on the output(s) from the camera system], wherein the map is configured for use by the processing unit to localize the user with respect to the environment; and
obtaining, by the processing unit, a metric indicating a likelihood of success to localize the user using the map, wherein the act of obtaining comprises computing the metric or receiving the metric by the processing unit;
*wherein the map is determined by the processing unit based on the images from the camera system, and wherein the metric is based on respective scores of the images and is a measure of a quality of the map, the metric being a separate data item and different from the respective scores of the images.*

33. *The apparatus of claim 1, wherein the apparatus is configured to inform the user of the metric, and wherein the apparatus is configured to receive an input from the user to initiate a map generation session after the apparatus informs the user of the metric.*

34. *The apparatus of claim 17, wherein the apparatus is configured to inform the user of the metric, and wherein the apparatus is configured to receive an input from the user to initiate a map generation session after the apparatus informs the user of the metric.*

35. *The apparatus of claim 23, wherein the apparatus is configured to inform the user of the metric, and wherein the apparatus is configured to receive an input from the user to initiate a map generation session after the apparatus informs the user of the metric.*

36. The apparatus of claim 24, wherein the apparatus is configured to inform the user of the metric, and wherein the apparatus is configured to receive an input from the user to initiate a map generation session after the apparatus informs the user of the metric.

37. The apparatus of claim 27, wherein the apparatus is configured to inform the user of the metric, and wherein the apparatus is configured to receive an input from the user to initiate a map generation session after the apparatus informs the user of the metric.

38. The apparatus of claim 28, wherein the apparatus is configured to inform the user of the metric, and wherein the apparatus is configured to receive an input from the user to initiate a map generation session after the apparatus informs the user of the metric.

39. The method of claim 32, further comprising informing the user of the metric, and receiving an input from the user to initiate a map generation session after the user is informed of the metric.

\* \* \* \* \*